(12) United States Patent
Shu et al.

(10) Patent No.: US 9,167,151 B2
(45) Date of Patent: Oct. 20, 2015

(54) FOCUS DETECTION APPARATUS, FOCUS DETECTION METHOD, AND IMAGE CAPTURING APPARATUS

(71) Applicant: CANON KABUSHIKI KAISHA, Tokyo (JP)

(72) Inventors: Takayuki Shu, Kawasaki (JP); Tomokuni Hirosawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 14/196,468

(22) Filed: Mar. 4, 2014

(65) Prior Publication Data
US 2014/0253787 A1    Sep. 11, 2014

(30) Foreign Application Priority Data

| Mar. 7, 2013 | (JP) | 2013-045905 |
| Mar. 7, 2013 | (JP) | 2013-045906 |
| Mar. 7, 2013 | (JP) | 2013-045907 |
| Jun. 28, 2013 | (JP) | 2013-137475 |

(51) Int. Cl.
*H04N 5/232* (2006.01)
*H04N 9/04* (2006.01)
*G02B 7/34* (2006.01)

(52) U.S. Cl.
CPC ............ *H04N 5/23212* (2013.01); *G02B 7/34* (2013.01)

(58) Field of Classification Search
CPC .................................................. H04N 5/23212
USPC ...................................................... 348/345, 350
See application file for complete search history.

(56) References Cited

U.S. PATENT DOCUMENTS

2011/0134310 A1 *    6/2011   Kimura ........................ 348/345

FOREIGN PATENT DOCUMENTS

| JP | 3854704 B | 12/2006 |
| JP | 2012-042597 A | 3/2012 |

* cited by examiner

*Primary Examiner* — Joel Fosselman
(74) *Attorney, Agent, or Firm* — Cowan, Liebowitz & Latman, P.C.

(57) ABSTRACT

A focus detection apparatus comprises: a sensor unit provided with a plurality of sensor pairs, including a first and second sensor pairs, each of which receives a light beam from an object, accumulates charge, and outputs a pair of image signals for focus detection; a control unit configured to detect a level of a predetermined signal based on the accumulated charge in each sensor pair, and controls charge accumulation time in accordance with the level of the predetermined signal; and a setting unit configured to set a priority of each sensor pair in accordance with the object. The priority of the first sensor pair is set higher than that of the second sensor pair, and the control unit detects the level of the predetermined signal of the first sensor pair in prior to that of the second sensor pair.

15 Claims, 63 Drawing Sheets

FIG. 11

| SELECTED AREA | PRIORITY | | | | | | | | | | |
|---|---|---|---|---|---|---|---|---|---|---|---|
| | 1 | 2 | 3 | 4 | 5 | 6 | 7 | 8 | 9 | 10 | 11 |
| 1 | 1 | 2 | 2 | 2 | 2 | 2 | 2 | 2 | 2 | 3 | 3 |
| 2 | 2 | 1 | 3 | 2 | 3 | 3 | 2 | 3 | 3 | 3 | 3 |
| 3 | 2 | 3 | 1 | 3 | 3 | 2 | 3 | 3 | 2 | 3 | 3 |
| 4 | 2 | 2 | 3 | 1 | 2 | 3 | 3 | 3 | 3 | 2 | 3 |
| 5 | 2 | 3 | 3 | 2 | 1 | 2 | 3 | 3 | 3 | 2 | 3 |
| 6 | 2 | 3 | 2 | 3 | 2 | 1 | 3 | 3 | 3 | 2 | 3 |
| 7 | 2 | 2 | 3 | 3 | 3 | 3 | 1 | 2 | 3 | 3 | 2 |
| 8 | 2 | 3 | 3 | 3 | 3 | 3 | 2 | 1 | 2 | 3 | 2 |
| 9 | 2 | 3 | 2 | 3 | 3 | 3 | 3 | 2 | 1 | 3 | 2 |
| 10 | 3 | 3 | 3 | 2 | 2 | 2 | 3 | 3 | 3 | 1 | 3 |
| 11 | 3 | 3 | 3 | 3 | 3 | 3 | 2 | 2 | 2 | 3 | 1 |

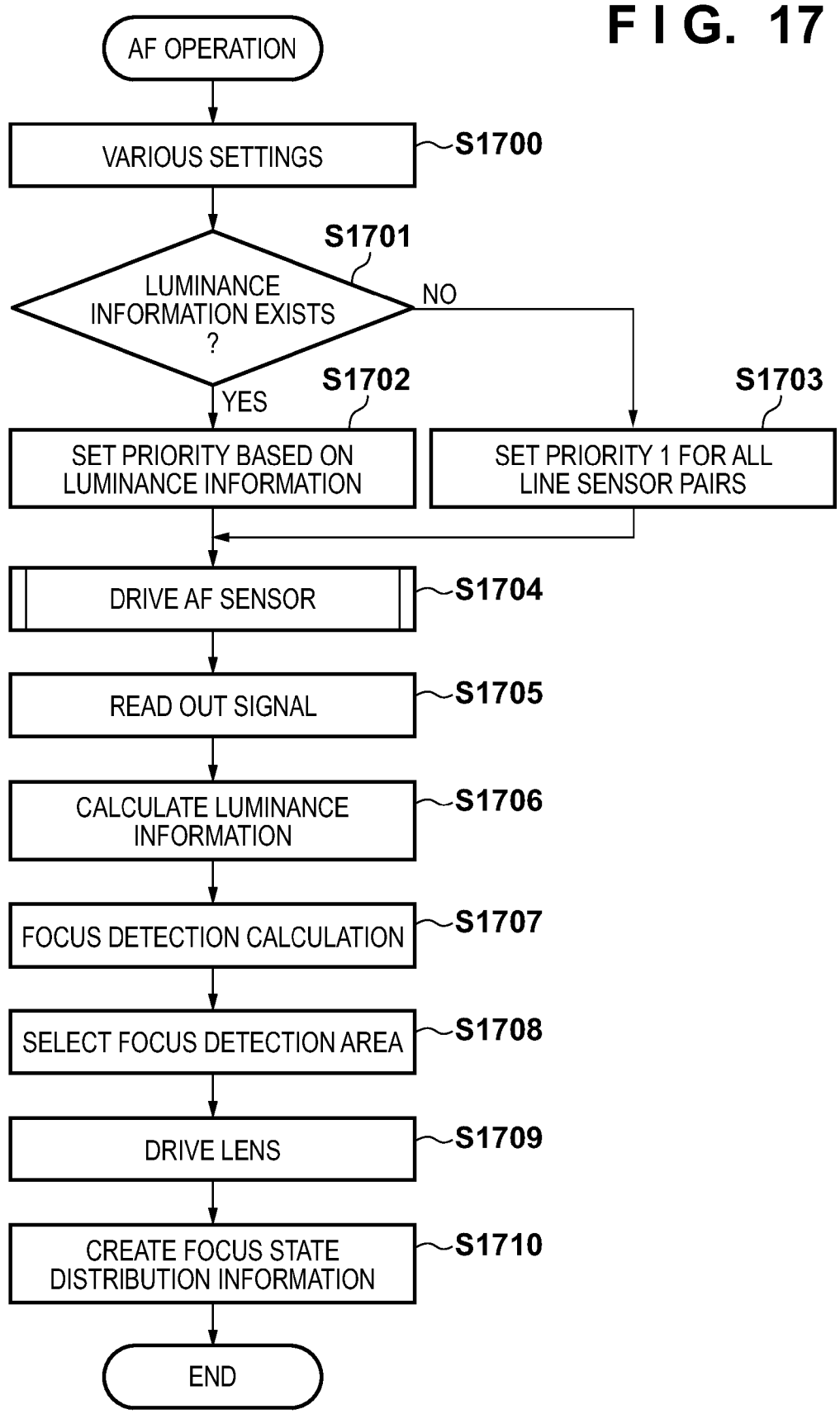

F I G. 25
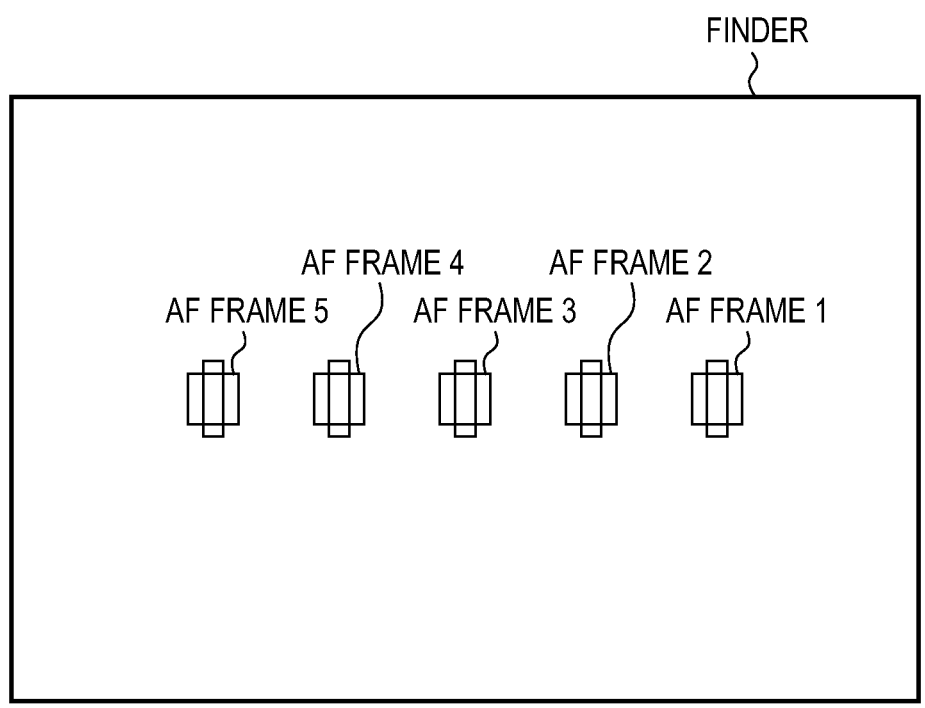

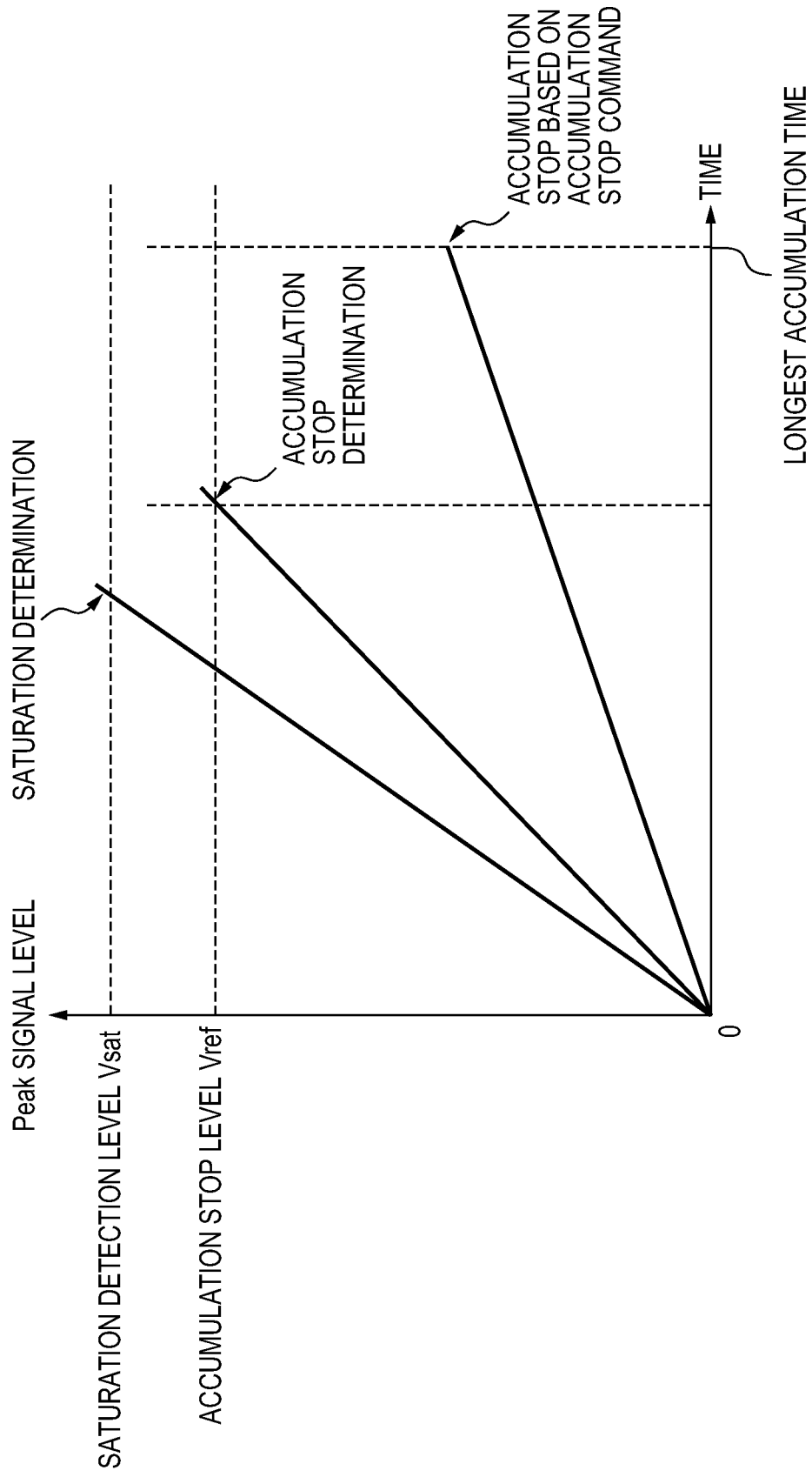

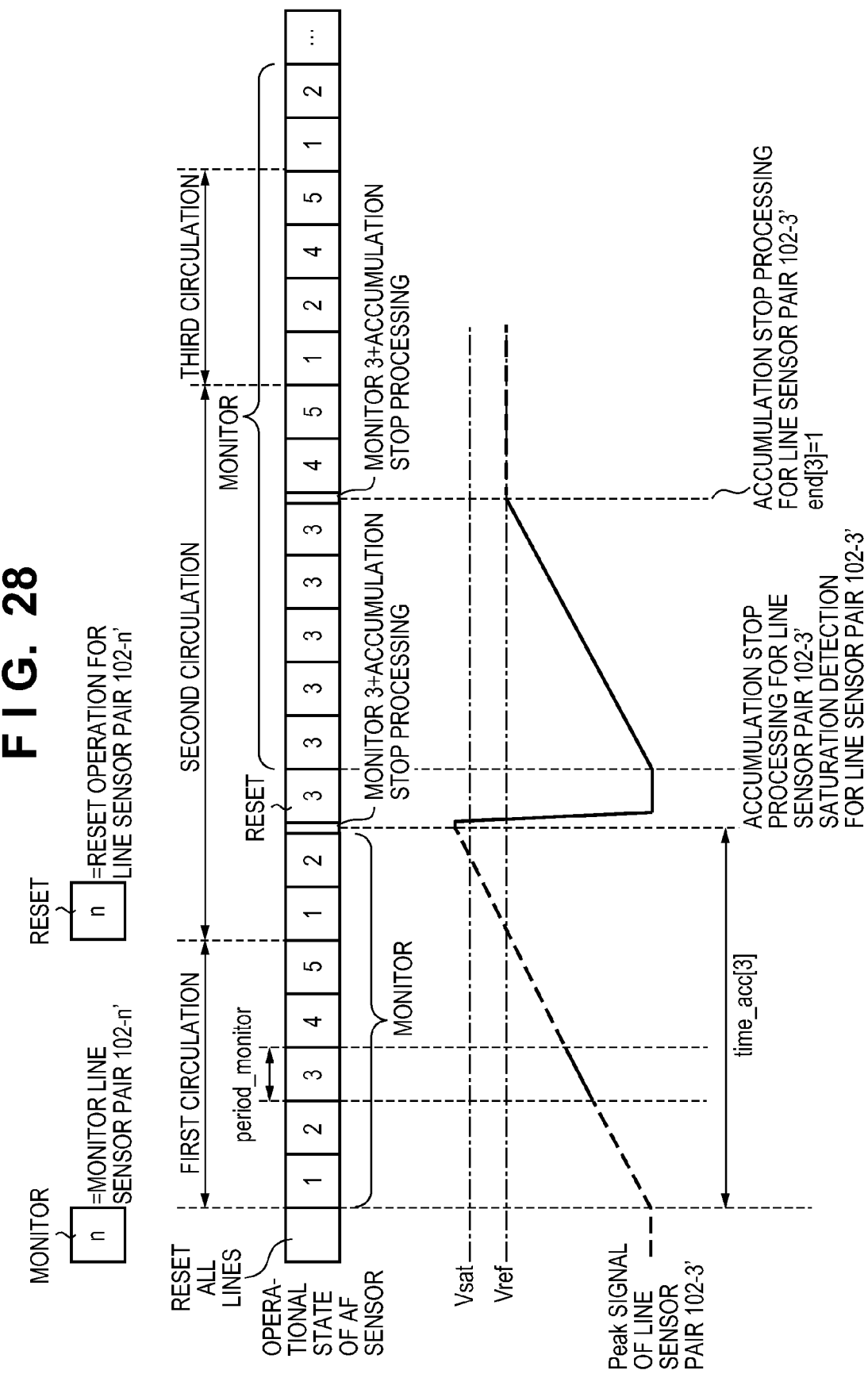

F I G. 30B
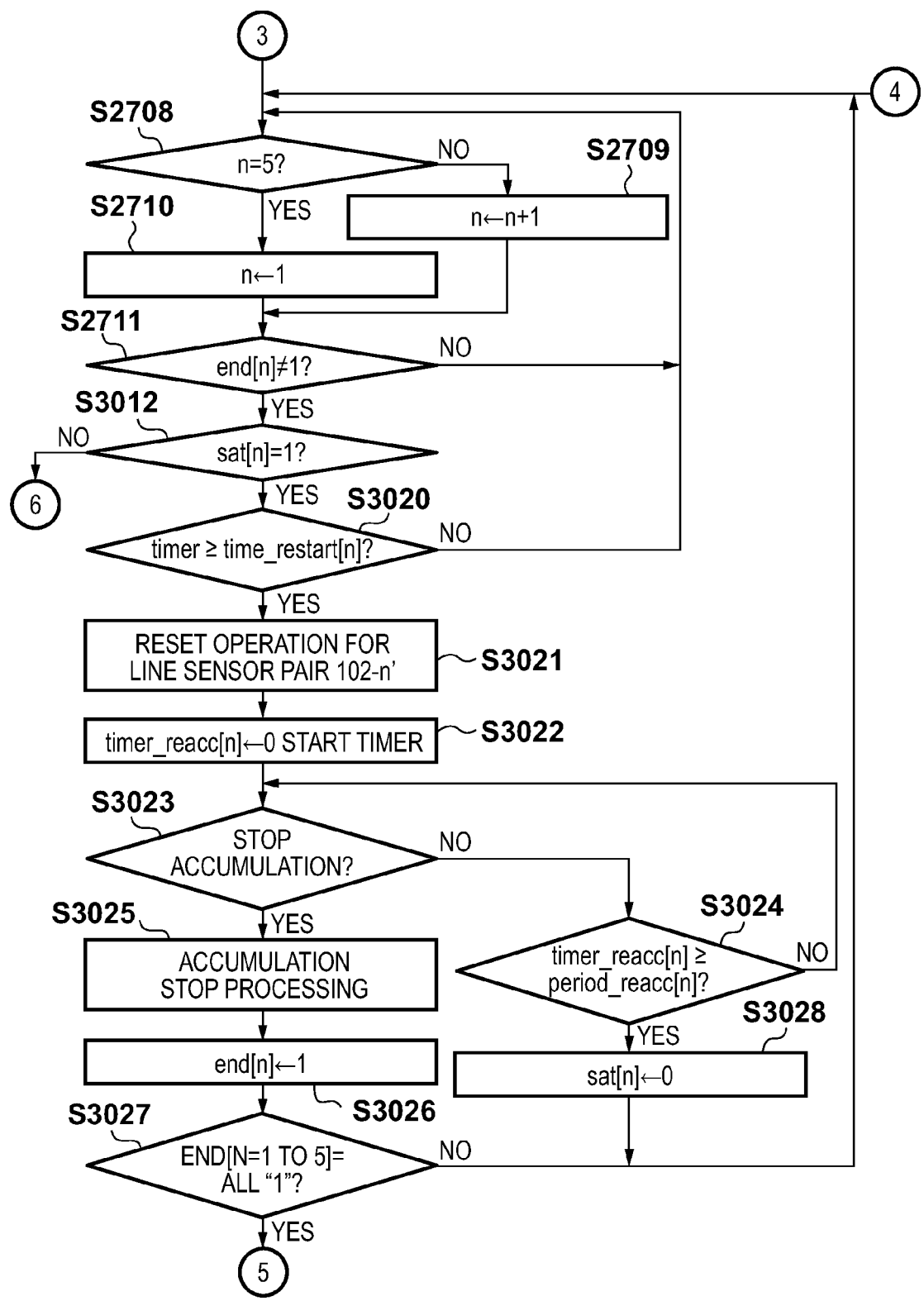

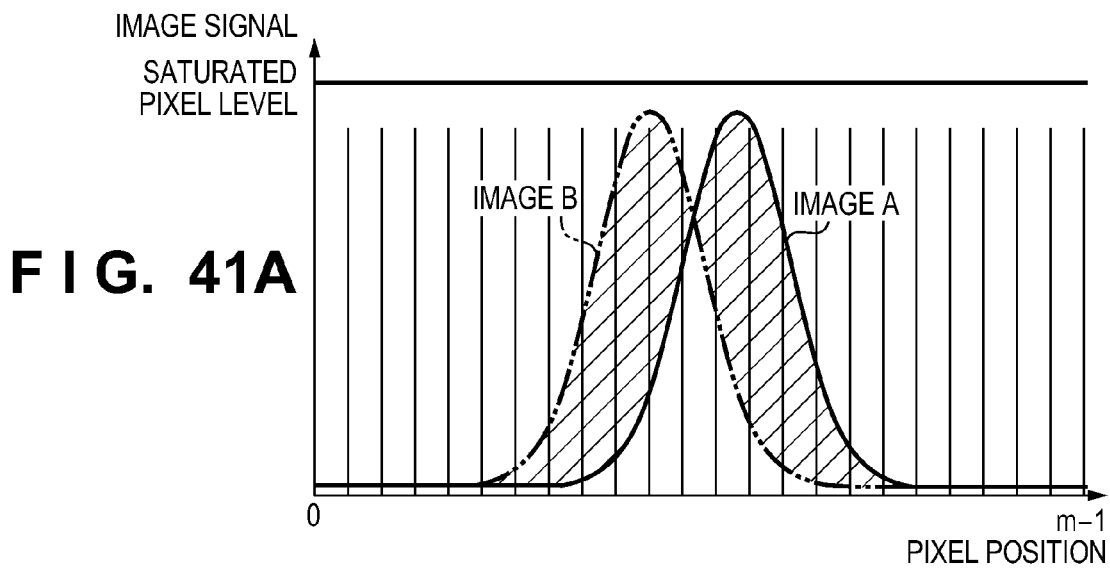
F I G. 41A
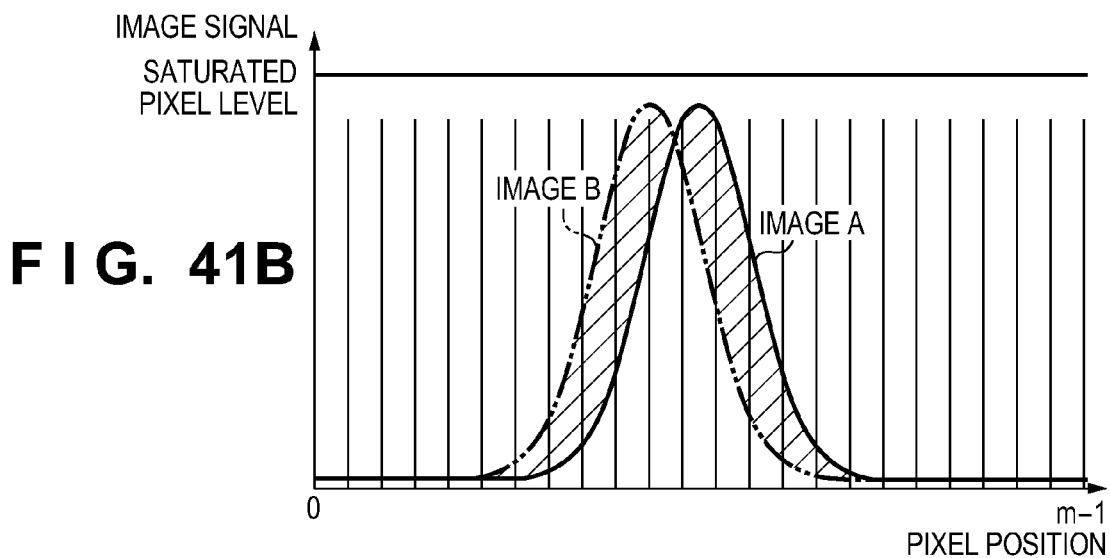
F I G. 41B
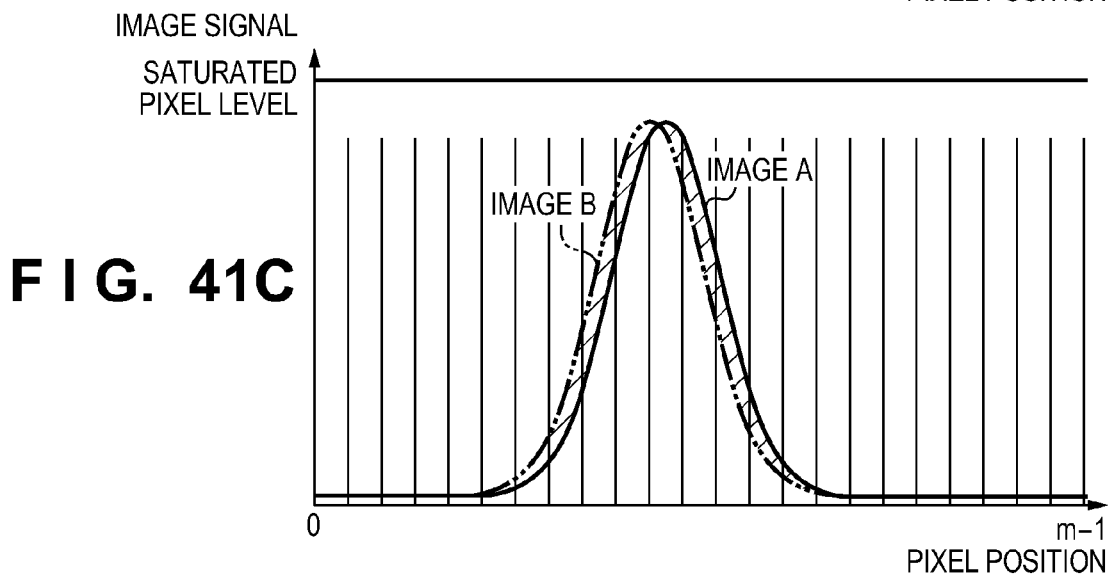
F I G. 41C

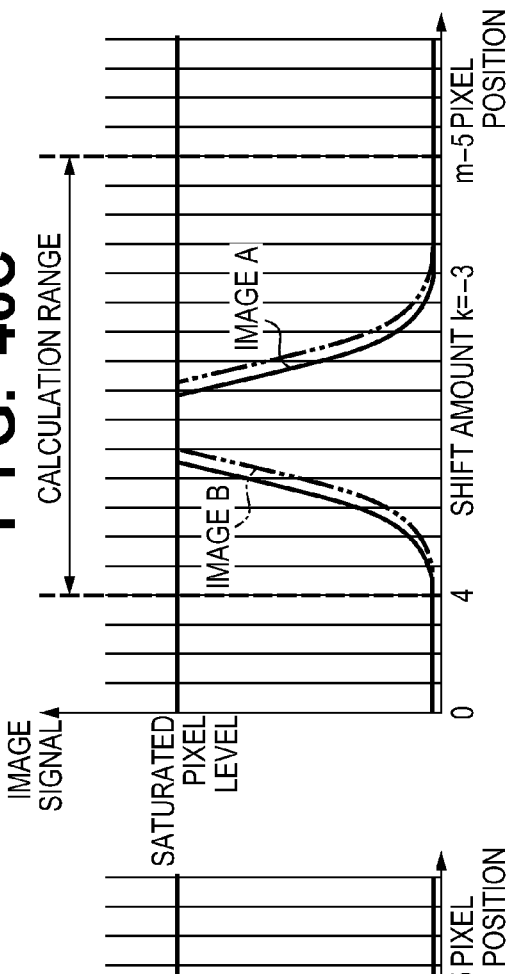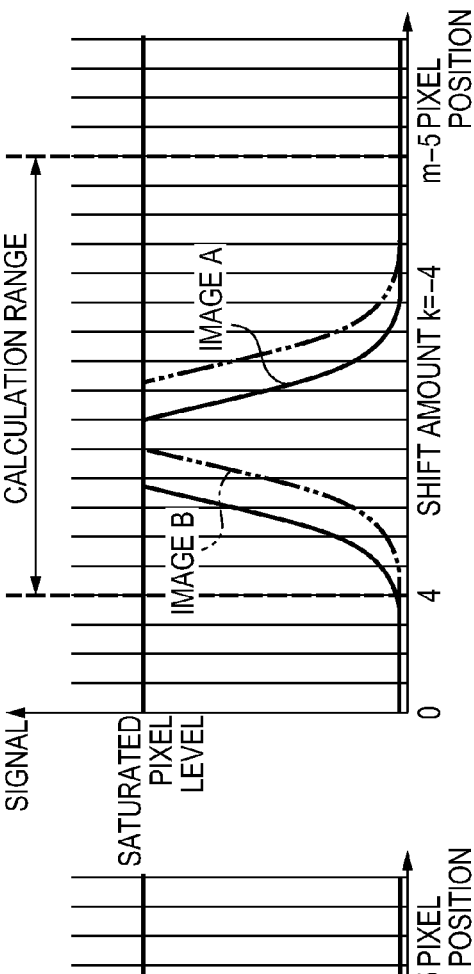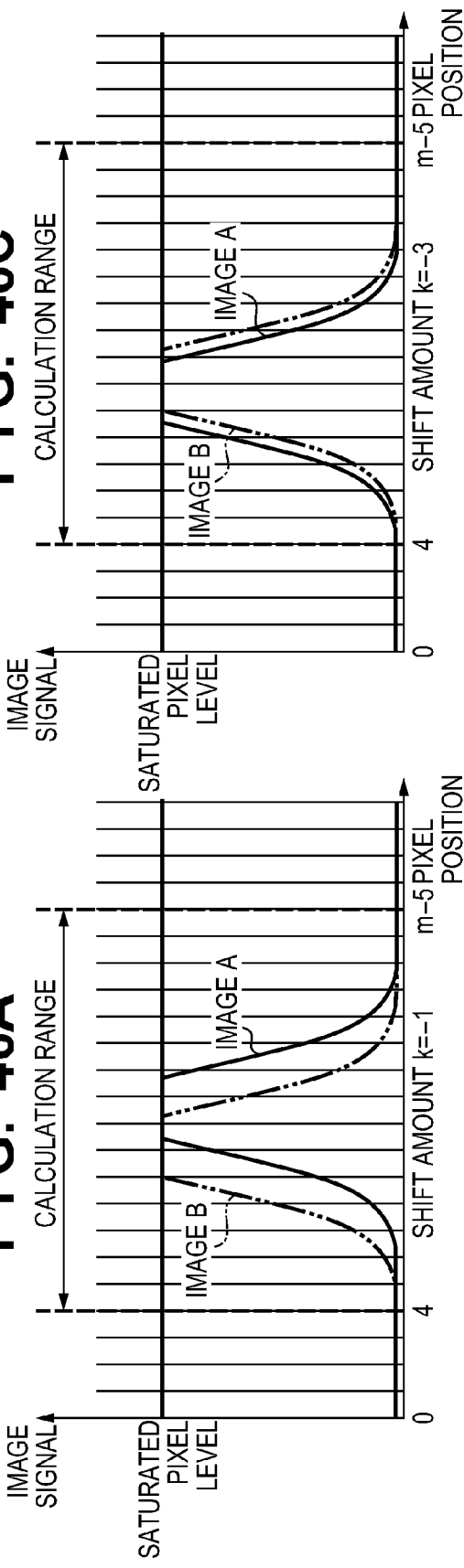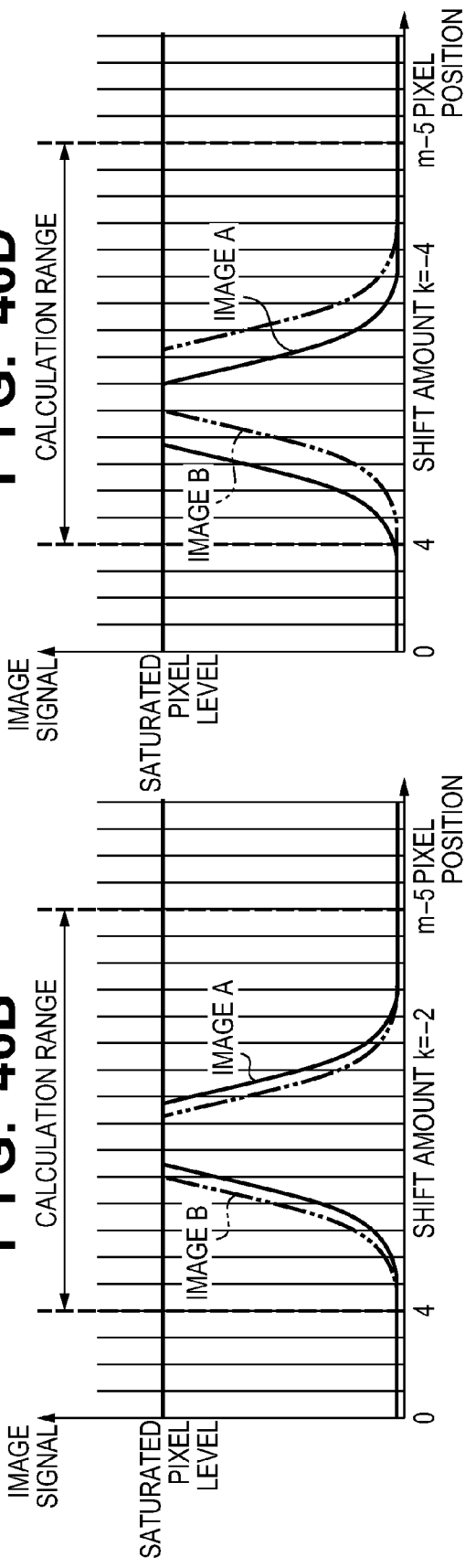

FIG. 47

| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|---|
| SHIFT AMOUNT K=−1 | IMAGE A | | | | | | | | | | | x | x | | | | | | | | | | | | |
| | IMAGE B | | | | | | | | | | | | x | x | | | | | | | | | | | |
| SHIFT AMOUNT K=−2 | IMAGE A | | | | | | | | | | x | x | | | | | | | | | | | | | |
| | IMAGE B | | | | | | | | | | | x | x | | | | | | | | | | | | |
| SHIFT AMOUNT K=−3 | IMAGE A | | | | | | | | | | x | | | | | | | | | | | | | | |
| | IMAGE B | | | | | | | | | x | x | | | | | | | | | | | | | | |
| SHIFT AMOUNT K=−4 | IMAGE A | | | | | | | | | | x | x | | | | | | | | | | | | | |
| | IMAGE B | | | | | | | | | | | x | x | | | | | | | | | | | | |
| PIXEL TO BE EXCLUDED | | | | | | | | | | x | x | x | x | x | | | | | | | | | | | |

PIXEL POSITION

F I G. 55

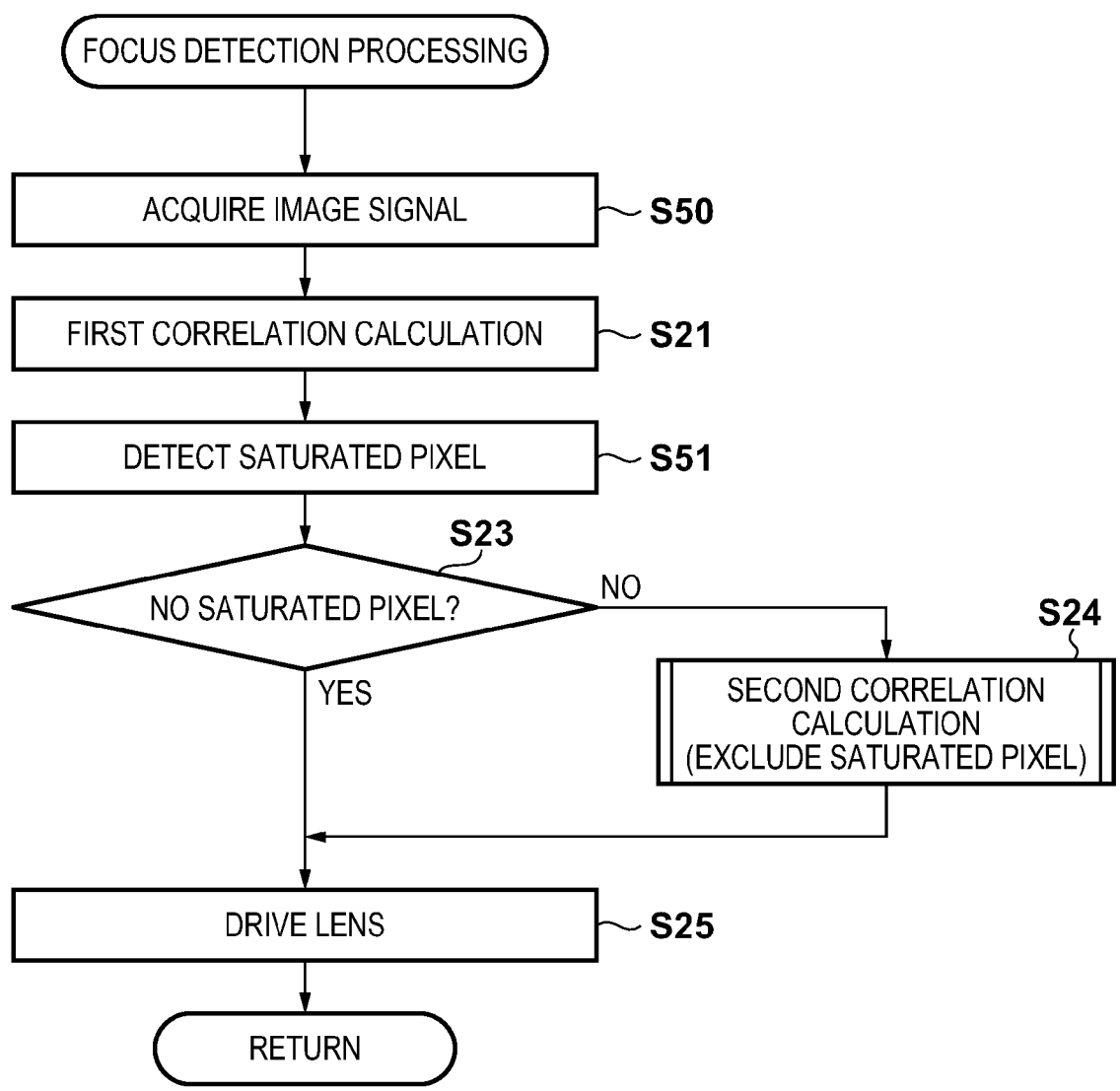
F I G. 60

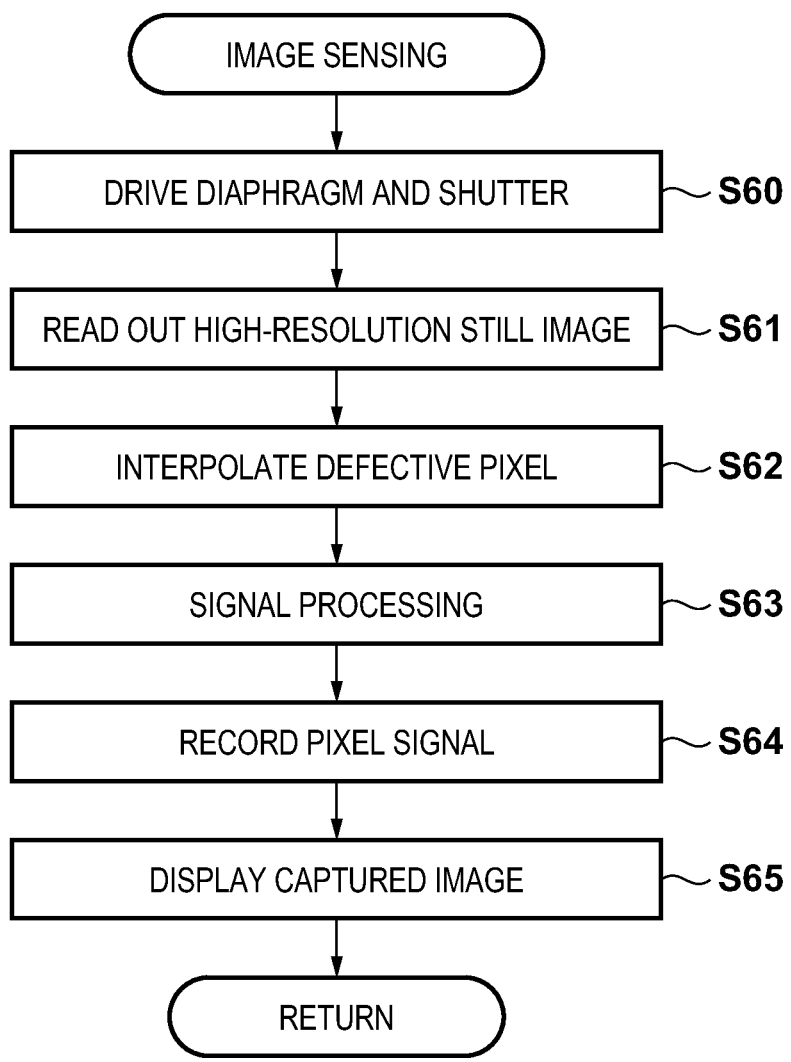
F I G. 61

FOCUS DETECTION APPARATUS, FOCUS DETECTION METHOD, AND IMAGE CAPTURING APPARATUS

BACKGROUND OF THE INVENTION

1. Field of the Invention

The present invention relates to a focus detection apparatus and a focus detection method for an image capturing apparatus such as a digital camera.

2. Description of the Related Art

Conventionally, a phase difference detection method is well-known in general as an automatic focus detection method for cameras. With the phase difference detection method, light beams that come from an object and have passed through different exit pupil areas of a taking lens are caused to form an image on a pair of line sensors, which are photoelectric conversion devices (AF sensors) for focus detection. The focusing state of the taking lens is detected by calculating a focus statesition of a pair of object images obtained by performing photoelectric conversion with the pair of line sensors (hereinafter referred to as "phase difference calculation"). Recently, various kinds of AF sensors have been proposed in which a plurality of line sensors are arranged such that focusing states of a plurality of areas in a screen can be detected.

For example, Japanese Patent No. 3854704 discloses the following control. That is to say, photoelectric conversion elements are arranged at positions corresponding to a plurality of focus detection areas, accumulation time is controlled for respective areas 1 to n by sequentially circulating through and monitoring the area 1 to the area n, and the gain at the time of reading out a pixel signal is appropriately controlled for each area. The pixel signal can be read out with an appropriate gain even when the object has different luminance levels, by appropriately controlling charge accumulation for each area.

Japanese Patent Laid-Open No. 2012-042597 proposes a focus detection apparatus that detects an abnormal signal within an image signal of a focus detection sensor and performs correlation calculation after excluding the abnormal signal.

However, with the focus detection apparatus using the photoelectric conversion device disclosed in Japanese Patent No. 3854704, the circulation cycle is lengthened, possibly resulting in a delay of accumulation end timing. In particular, in the case where the object has a super-high luminance, in some cases a signal of the super-high luminance area exceeds the dynamic range of the photoelectric conversion element or an AD converter while signals of other areas are monitored, which consequently causes a decrease in focus detection accuracy.

With the conventional technique disclosed in Japanese Patent Laid-Open No. 2012-042597 mentioned above, since the calculation is performed based on a correlation amount among a plurality of shifted waveforms, the number of excluded pixels differs depending on the shift amount in pixel signal columns when the correlation calculation is performed after excluding abnormal pixels. While the details thereof will be described later, the correlation amount is a value obtained by adding up differences between paired image signals of the pixels, and if the number of pixels used in the calculation differs, it may be possible that comparison between correlation amounts obtained for respective shift amounts may be inaccurate, and the focus detection accuracy decreases.

SUMMARY OF THE INVENTION

The present invention has been made in consideration of the above situation, and enables accurate focus detection even if a main object is an object having a high luminance.

According to the present invention, provided is a focus detection apparatus comprising: a sensor unit provided with a plurality of sensor pairs each of which receives a light beam from an object, accumulates charge, and outputs a pair of image signals for focus detection in a phase difference detection method; a control unit configured to detect a level of a predetermined signal based on the accumulated charge in each sensor pair, and control charge accumulation time in accordance with the level of the predetermined signal; and a setting unit configured to set a priority of each sensor pair in accordance with the object, wherein the setting unit sets the priority of a first sensor pair higher than the priority of a second sensor pair, the first sensor pair and the second sensor pair being included in the plurality of sensor pairs, wherein the control unit detects the level of the predetermined signal of the first sensor pair in prior to the level of the predetermined signal of the second sensor pair.

Further, according to the present invention, provided is an image capturing apparatus comprising: an image sensing unit configured to convert light that has passed through a photographic optical system into an electric signal; and the focus detection apparatus described above.

Furthermore, according to the present invention, provided is a method for controlling a focus detection apparatus including a sensor unit provided with a plurality of sensor pairs each of which receives a light beam from an object, accumulates charge, and outputs a pair of image signals for focus detection in a phase difference detection method, the method comprising: a detection step of detecting a level of a predetermined signal based on accumulated charge in each sensor pair; a control step of controlling charge accumulation time in accordance with the level of the predetermined signal; and a setting step of setting a priority of each sensor pair in accordance with the object, wherein in the setting step, the priority of a first sensor pair is set higher than the priority of a second sensor pair, the first sensor pair and the second sensor pair being included in the plurality of sensor pairs, wherein in the detection step, the level of the predetermined signal of the first sensor pair is detected in prior to the level of the predetermined signal of the second sensor pair.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a diagram showing a relationship between selected areas and priorities of focus detection areas according to the first embodiment;

FIG. 17 is a flowchart of an AF operation according to a third embodiment;

FIG. 25 is a diagram showing a relationship between an arrangement of line sensors and AF frames according to an embodiment;

FIG. 26 is a diagram showing accumulation time, a peak signal level, an accumulation stop level, and a saturation detection level;

FIG. 28 is a time chart for illustrating exemplary sole monitoring processing according to the fifth embodiment;

FIGS. 30A and 30B are flowcharts of an AF sensor operation according to a sixth embodiment;

FIGS. 41A to 41C are diagrams showing shifted waveforms in first correlation calculation;

FIGS. 46A to 46D are diagrams showing shifted waveforms in the second correlation calculation;

FIG. 47 is a diagram illustrating saturated pixels and excluded pixels in shifted waveforms in the second correlation calculation;

FIG. 55 is a diagram illustrating a superordinate unit of the pixel arrangement in the image sensor according to the eighth embodiment;

FIG. 60 is a flowchart of focus detection processing performed in step S44 in FIG. 59; and FIG. 61 is a flowchart of image sensing processing performed in step S46 in FIG. 59.

DESCRIPTION OF THE EMBODIMENTS

Exemplary embodiments of the present invention will be described in detail in accordance with the accompanying drawings.

First Embodiment

Figure 2:
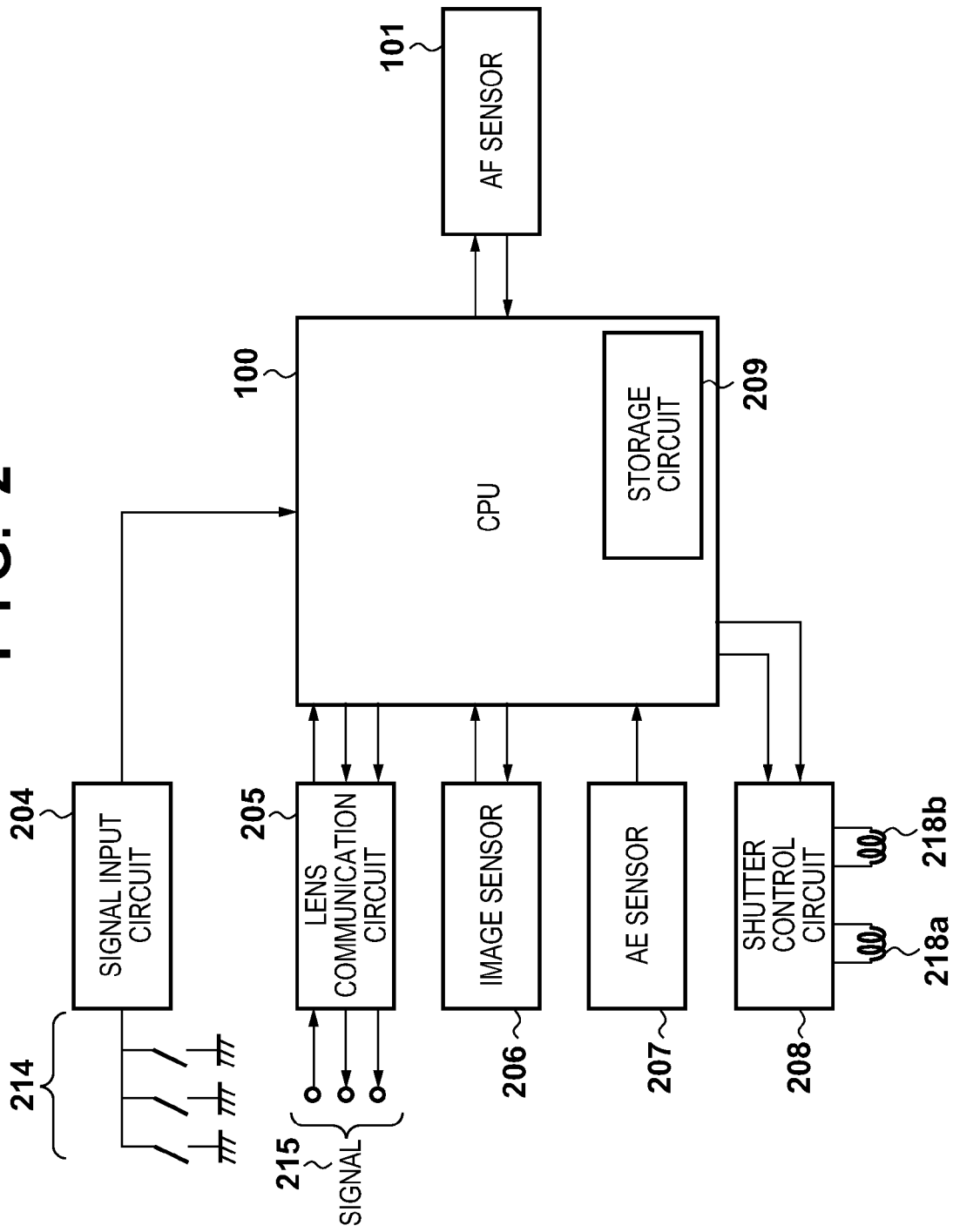
FIG. 2 is a block diagram showing a schematic configuration of a camera body according to an embodiment of the present invention.

FIG. 2 is a block diagram showing a schematic configuration of a camera body equipped with an AF sensor according to a first embodiment of the present invention.

Figure 3:
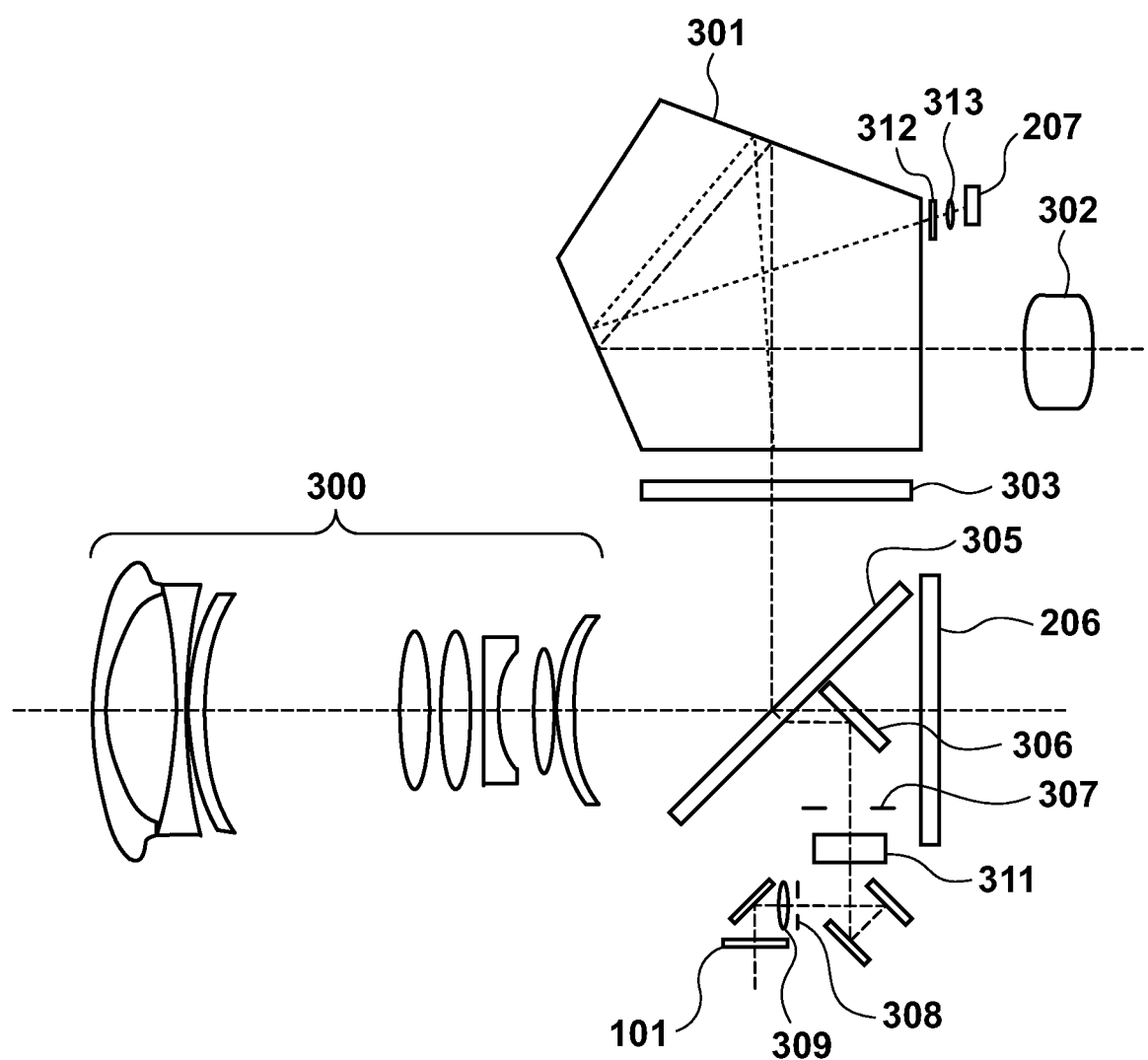
FIG. 3 is a diagram showing a configuration of an optical system of the camera.

A camera microcomputer (CPU) 100 is connected to a signal input circuit 204 for detecting a switch group 214 for various operations in the camera, an image sensor 206 constituted by a CMOS sensor, a CCD, or the like, an AE sensor 207, a shutter control circuit 208 for controlling shutter magnets 218a and 218b, and an AF sensor 101. A signal 215 is transmitted between the CPU 100 and a taking lens 300, which is shown in FIG. 3 and will be described later, via a lens communication circuit 205 in order to control the focus position and a diaphragm. The operation of the camera is determined by a photographer operating the switch group 214. The switch group 214 includes a release button, a dial for selecting a focus detection area, and the like.

The AF sensor 101 is provided with line sensor pairs, and can obtain a pair of image signals having a parallax with respect to each other from each line sensor pair, as a result of the CPU 100 controlling the AF sensor 101. The AF sensor 101 then detects a focusing state from a phase difference between the obtained pair of image signals, and controls the focus position of the taking lens 300. The CPU 100 also detects the luminance of an object by controlling the AE sensor 207, and determines the f-number and the shutter speed of the taking lens 300. The CPU 100 then controls the f-number of the taking lens 300 via the lens communication circuit 205, controls the shutter speed by adjusting energizing time of the magnets 218a and 218b via the shutter control circuit 208, and further performs an image sensing operation by controlling the image sensor 206. The CPU 100 also performs object tracking calculation using luminance information and color information of the object that are obtained from the AE sensor 207.

The CPU 100 contains storage circuits 209 such as a ROM that stores programs for controlling camera operations, a RAM for storing variables, and an EEPROM (Electronically Erasable Programmable Read Only Memory) for storing various parameters.

Next, a configuration of an optical system of the camera will be described with reference to FIG. 3. Most of incident light beams that come from the object via the taking lens 300 is reflected upward by a quick return mirror 305 and caused to form an object image on a finder screen 303. The photographer can observe this image via a pentaprism 301 and an eyepiece 302.

A part of the light beams that have entered the pentaprism 301 is caused to form an image on the AE sensor 207 via an optical filter 312 and an imaging lens 313. The object luminance can be measured by processing an image signal obtained by performing photoelectric conversion on this image.

Another part of the light beams from the object is transmitted through the quick return mirror 305, turned downward by a rear sub-mirror 306, and caused to form an image on the AF sensor 101 after passing through a visual field mask 307, a field lens 311, a diaphragm 308, and a secondary imaging lens 309. A focusing state of the taking lens 300 can be detected by processing an image signal obtained by performing photoelectric conversion on this image. At the time of photographing, the quick return mirror 305 and the sub-mirror 306 jump up and withdraw from the optical path, and all incident light beams are thereby caused to form an image on the image sensor 206, and the object image is exposed. The image sensor 206 converts the object image into an electric signal.

In FIG. 3, a well-known phase difference detection method is used as the focus detection method in the focus detection apparatus according to the present embodiment, which is constituted by the AF sensor 101 and the optical system that covers from the visual field mask 307 to the secondary imaging lens 309. Focusing states of a plurality of different areas within the screen can be detected.

Figure 4:
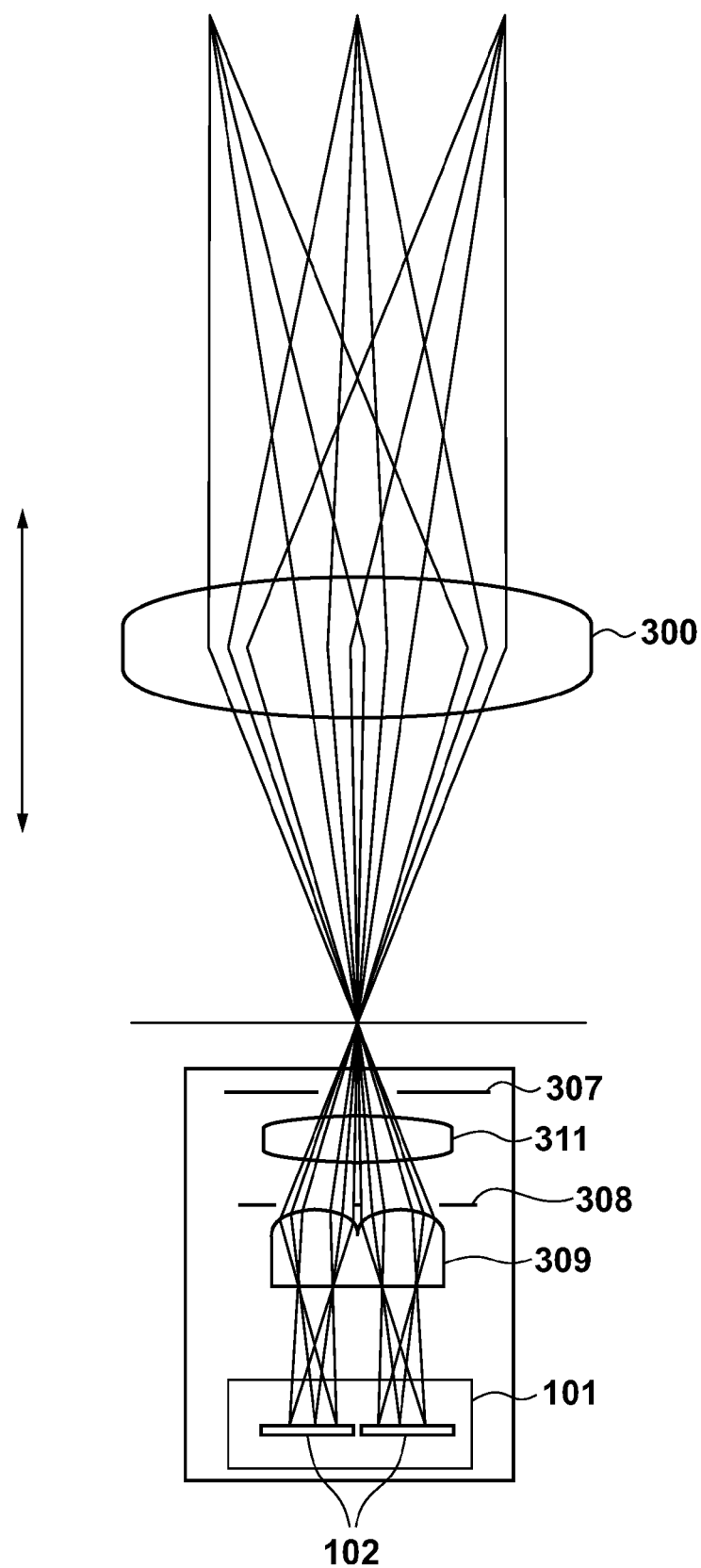
FIG. 4 is a diagram showing a detailed configuration of a focus detection optical system within the optical system shown in FIG. 3.

A specific configuration of the optical system related to the focus detection is shown in FIG. 4. The light beams from the object that have passed through the taking lens 300 (which is expressed by one lens for the sake of convenience in FIG. 4) are reflected by the sub-mirror 306 as described above with reference to FIG. 3, and temporarily caused to form an image in the vicinity of the visual field mask 307 located on a surface conjugate with respect to an imaging surface. In FIG. 4, the optical paths that are reflected by the sub-mirror 306 and thus turned back are expanded. The visual field mask 307 is a member for blocking unnecessary light that enters areas other than the focus detection areas in the screen.

The field lens 311 has an effect of forming an image with each aperture of the diaphragm 308 near the exit pupil of the taking lens 300. The secondary imaging lens 309 is arranged in the rear of the diaphragm 308 and constituted by a pair of lenses, which correspond to the respective apertures of the diaphragm 308. The light beams that have passed through the visual field mask 307, the field lens 311, the diaphragm 308, and the secondary imaging lens 309 form an image on the line sensors in the AF sensor 101. Although FIG. 4 shows only a pair of the line sensors in the AF sensor 101, multiple pairs of the line sensors are arranged, as described later.

Next, a relationship between the line sensors in the AF sensor 101 and focus detection areas within a photographic screen will be described with reference to FIGS. 5 and 6.

Figure 5:
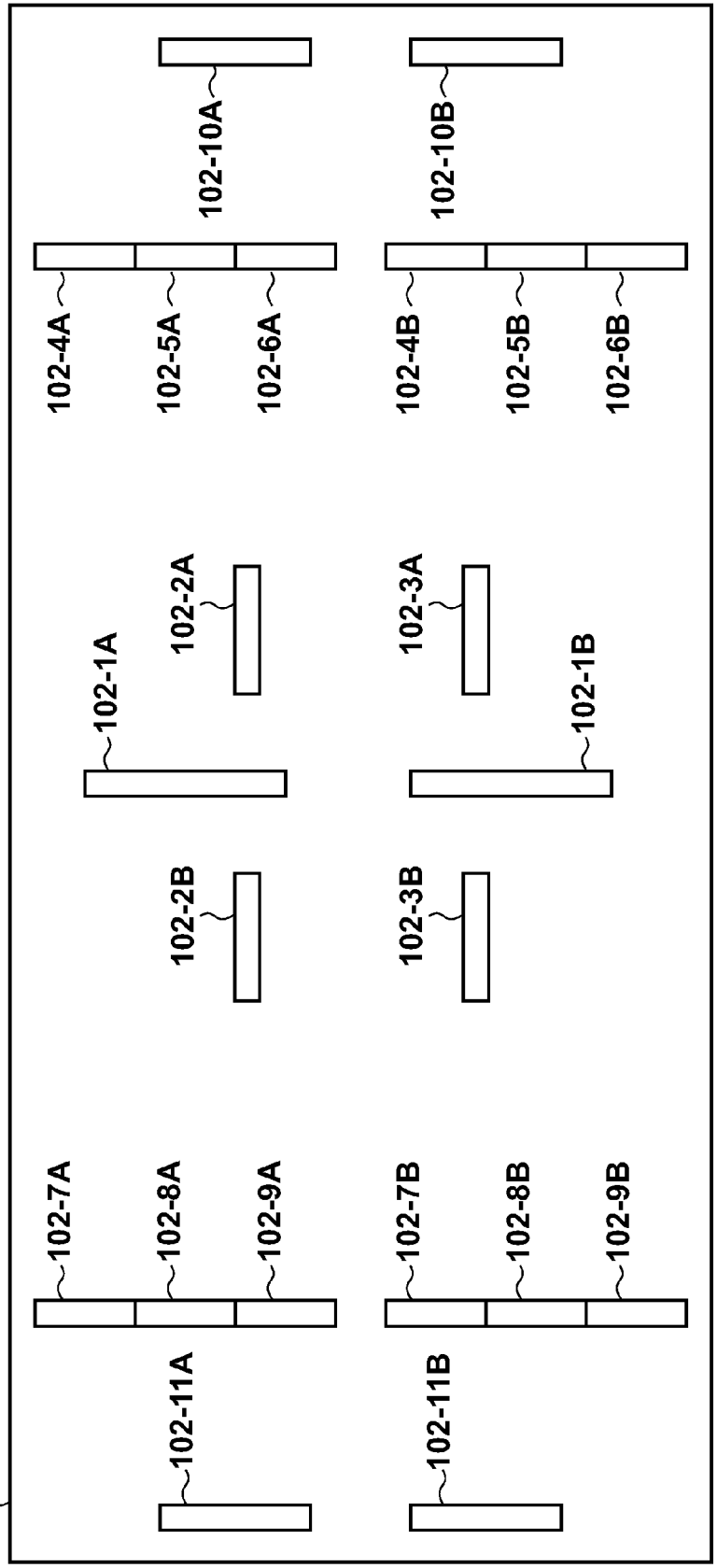
FIG. 5 is a diagram showing an arrangement of line sensors according to an embodiment.

FIG. 5 is a diagram showing an exemplary arrangement of the line sensor pairs in the AF sensor 101. Each of the line sensor pairs 102-1 to 102-11 is constituted by a pair of line sensors, and detects a focusing state based on a phase difference between a pair of signals obtained by the line sensor pair. For example, the line sensor pair 102-1 is constituted by a line sensor 102-1A and a line sensor 102-1B. Each line sensor pair detects a phase difference between two images that are output from the line sensor pair as a result of substantially the same area of the object being projected on the line sensor pair by a focus detection optical system such as the secondary imaging lens 309, and can thereby detect the focusing state.

Figure 6:
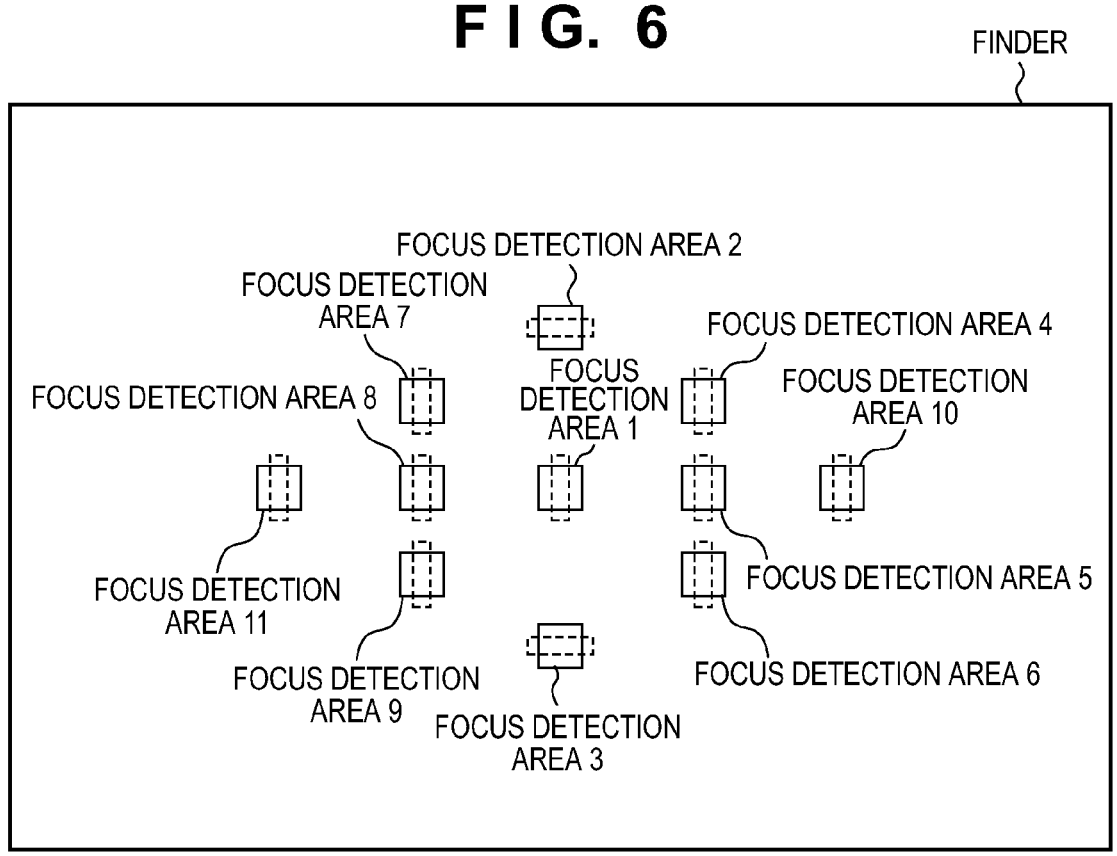
FIG. 6 is a diagram showing an arrangement of the line sensors and focus detection areas according to an embodiment.

FIG. 6 is a diagram showing the arrangement of the focus detection areas displayed on a finder and AF visual fields obtained by the line sensor pairs in the AF sensor 101. There are a total of 11 focus detection areas in the first embodiment, and the focus detection areas 1 to 11 correspond to the line sensor pairs 102-1 to 102-11, respectively.

Figure 7:
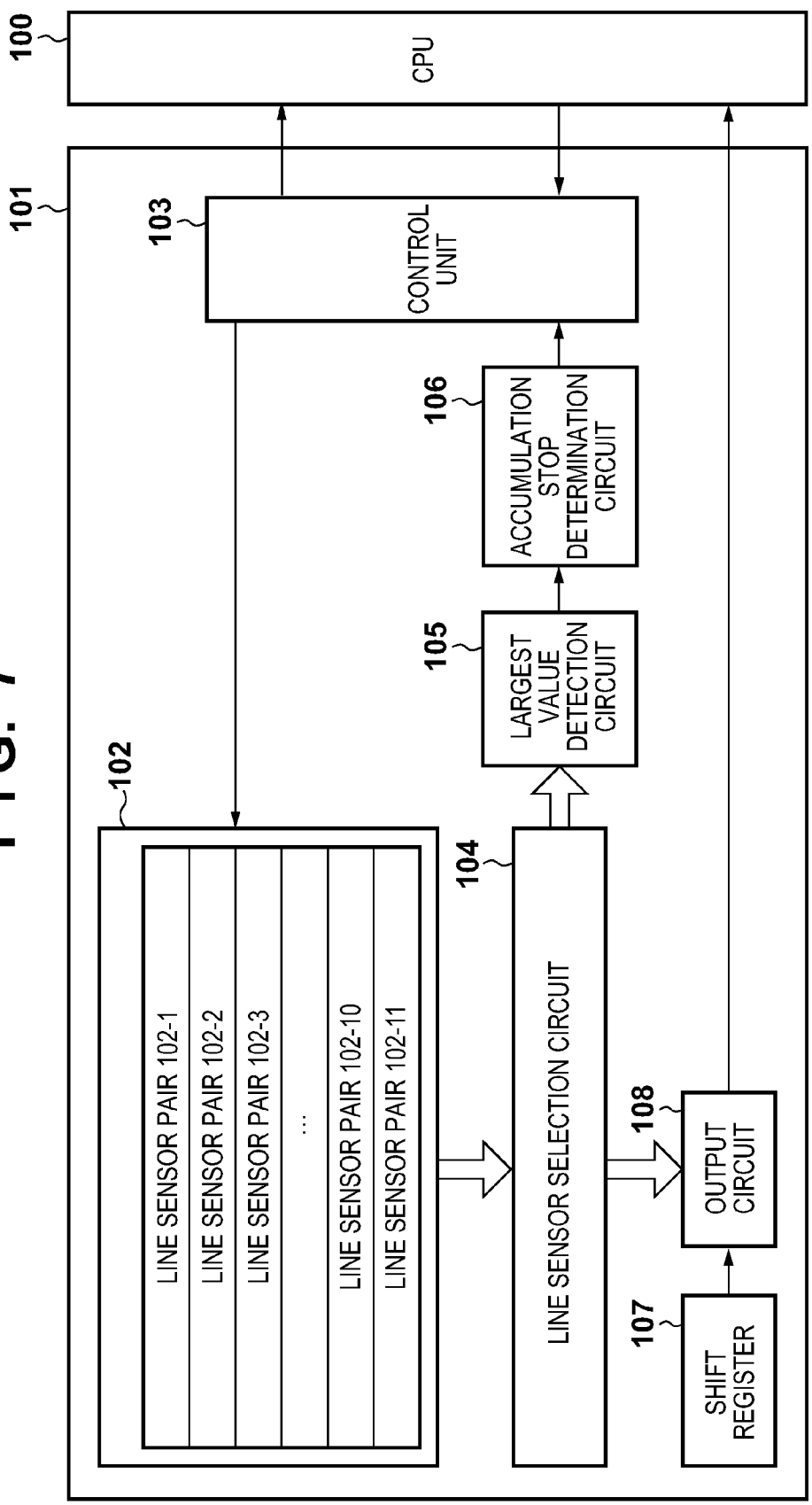
FIG. 7 is a block diagram showing a detailed circuit configuration of an AF sensor according to an embodiment.

Next, a specific circuit configuration of the AF sensor 101 will be described with reference to the block diagram in FIG. 7. A control unit 103 is connected to the CPU 100, and controls each block in the AF sensor 101 based on a communication command from the CPU 100. The control unit 103 also has a plurality of flag registers, setting registers, storage circuits, and timers (not shown) for various kinds of control. Further, the control unit 103 transmits accumulation stop information, accumulation time information, and the like of the AF sensor 101 to the CPU 100.

The object image formed by the secondary imaging lens 309 is subjected to photoelectric conversion by the line sensor group 102, which includes the line sensor pairs 102-1 to 102-11, and is accumulated as charge. The accumulated charge is output as voltage by an amplification circuit. A line sensor selection circuit 104 selects one of the plurality of line sensor pairs in the line sensor group 102. The line sensor selection circuit 104 has a function of outputting the pixel signals of the selected line sensor pair to an output circuit 108 and a largest value detection circuit 105 that monitors a feature amount (here, largest value) of the signals of the line sensor pair.

The largest value detection circuit 105 outputs a largest value signal (peak signal), which is the largest of the pixel signals of the line sensor pair that was selected by the line sensor selection circuit 104 and is currently monitored, to an accumulation stop determination circuit 106. The peak signal is one of feature amount signals, each indicating a feature amount of a pixel signal. On the other hand, the pixel signals are output to the CPU 100 one by one from the output circuit 108 by driving the shift register 107.

Figure 8:
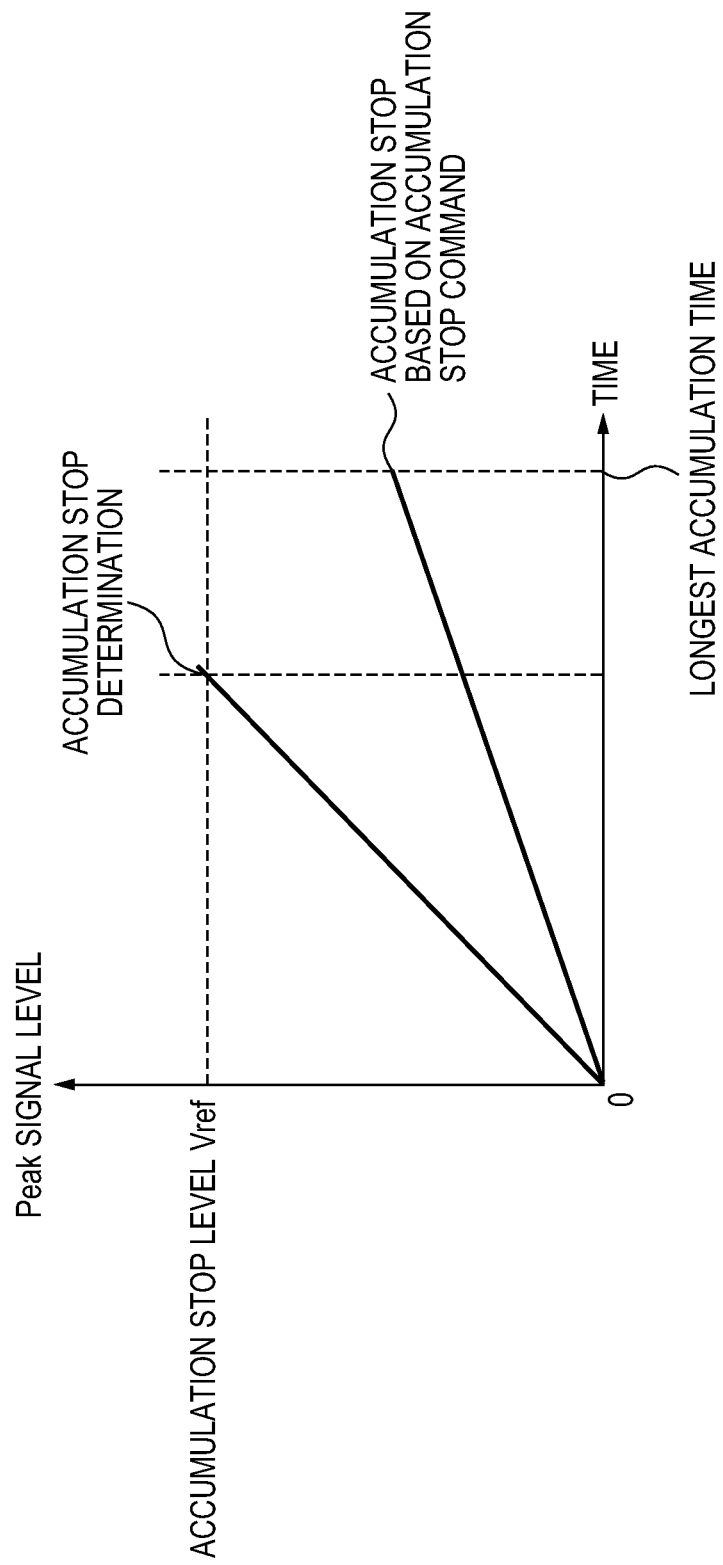
FIG. 8 is a diagram showing accumulation time, a peak signal level, and an accumulation stop level.

FIG. 8 is a diagram showing a relationship between the signal amount of the peak signal, which is an output signal from the largest value detection circuit 105, the accumulation time, and accumulation stop determination. Accumulation time 0 is an accumulation start timing, and the peak signal increases with the lapse of time. The accumulation stop determination circuit 106 compares the peak signal with an accumulation stop level Vref. The accumulation stop level Vref is set such that the pixel signal level of the line sensor pair that is currently monitored does not exceed an input/output permissible range of the respective units such as a photoelectric conversion unit of the line sensor pair, an amplifier (not shown), and the output circuit.

Although the accumulation stop determination is performed by means of comparison of the peak signal here, it may be performed using a circuit (not shown) for detecting the smallest value of the signals of the line sensor pair, the largest value detection circuit 105, and a subtracting circuit (not shown). In this case, a contrast detection circuit for detecting a contrast (difference signal) of the object as the feature amount may be configured, and the accumulation stop determination may be performed using a contrast signal that is obtained from this circuit. In this case as well, comparison with a predetermined accumulation stop level is performed in the accumulation stop determination circuit 106. The accumulation stop level is set such that a signal that has been amplified by the output circuit 108 does not exceed an input permissible range of the CPU 100, for example.

When the peak signal exceeds the accumulation stop level Vref, the accumulation stop determination circuit 106 outputs an accumulation stop determination signal to the control unit 103. The control unit 103 outputs an accumulation stop signal to the line sensor group 102 so as to stop accumulation in the line sensor pair that was selected by the line sensor selection circuit 104 and is currently monitored. Furthermore, the control unit 103 outputs, to the CPU 100, an accumulation end signal and information of the line where accumulation has been finished. If the peak signal does not reach a target value within a predetermined time period, the CPU 100 transmits an accumulation stop command to the AF sensor 101 so as to forcibly stop accumulation, and the control unit 103 outputs the accumulation stop signal to the line sensor group 102.

Figure 9:
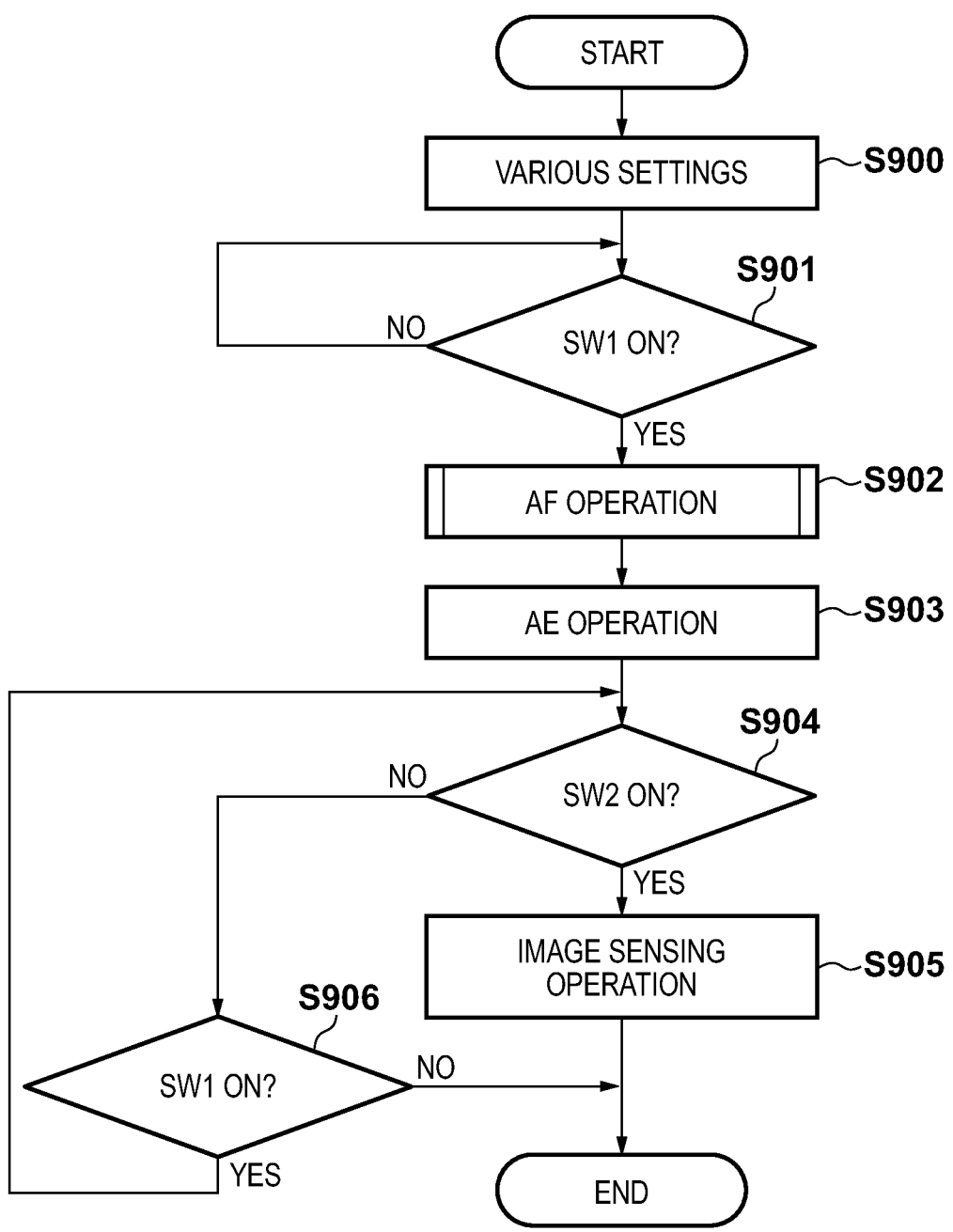
FIG. 9 is a flowchart of an image capturing operation of the camera according to an first embodiment.

The basic operation for image capturing in the camera that is configured as described above will be described based on the flowchart in FIG. 9. In step S900, initialization of various set values and various settings based on operations by the photographer are performed. In the first embodiment, a description will be given of the case where the AF mode is a one-shot AF mode in which an AF operation is performed in accordance with an operation given to a release button by the photographer, and the focus is locked upon focusing being complete. In addition, regarding the focus detection areas, a one-point selecting AF mode is employed in which the photographer selects any area from among the focus detection areas 1 to 11, and AF is performed based on the focusing state in the selected area, and in the following description, the focus detection area 5 is selected.

In step S901, the state of a switch SW1 is checked, which is turned on upon the release button being pressed down to a first stroke (e.g., half-pressed), and it is determined whether the switch SW1 is in an on or off state. The processing in step S901 is repeated until the switch SW1 is turned on. After the switch SW1 is turned on, the processing proceeds to step S902, and the AF operation is performed. The AF operation refers to signal accumulation control, focus detection calculation, and driving of the lens that are performed by the AF sensor 101, and the details thereof will be described later.

In step S903, the AE operation is performed. The AE operation includes signal accumulation control of the AE sensor 207 and AE calculation. The luminance in each of the plurality of areas within the screen is detected from the signals obtained from the AE sensor 207. Furthermore, an appropriate exposure value for the object is calculated by weighting more the luminance value of the area that is associated with the size of the object, based on later-described focusing state distribution information that is obtained as a result of the AF operation in step S902.

Next, in step S904, the state of a switch SW2 is checked, which is turned on upon the release button being pressed down to a second stroke (e.g., full-pressed), and it is determined whether the switch SW2 is in an on or off state. If the switch SW2 is in an on state, the processing proceeds to step S905, and the image sensing operation is performed. The image capturing operation includes control (mirror-up, mirror-down) of the quick return mirror 305, an exposure operation of the image sensor 206 that is performed by controlling the shutter and the image sensor 206, and diaphragm control of the taking lens 300. The f-number and the shutter speed are determined in accordance with the exposure value calculated in the AE operation in step S903.

On the other hand, if the switch SW2 is in an off state, the processing proceeds to step S906, and the state of the switch SW1 is checked. If the switch SW1 is in an on state in step S906, the processing returns to step S904, and the state of the switch SW2 is checked. In step S906, if the switch SW1 is in an off state, the operation is terminated.

Figure 10:
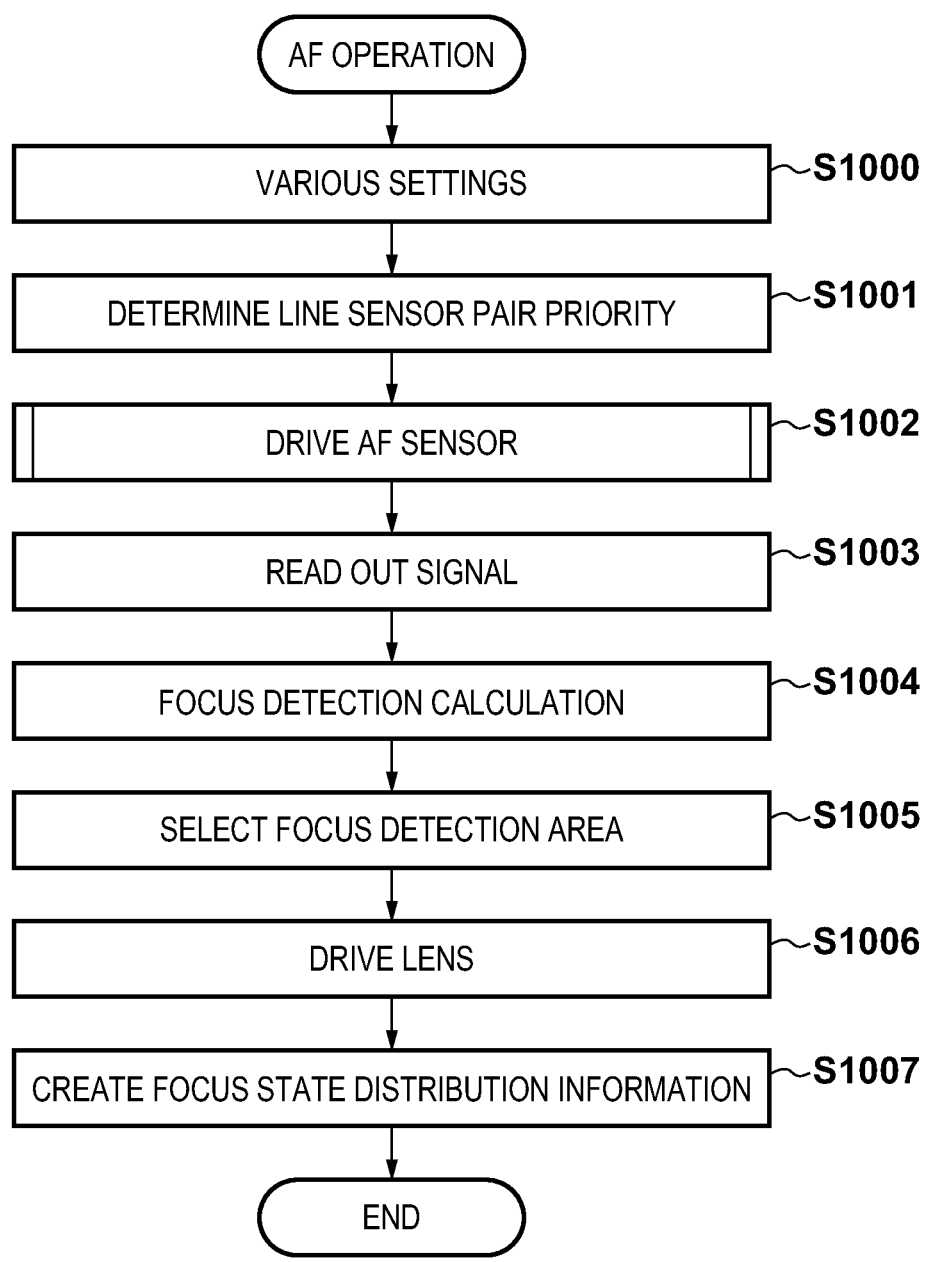
FIG. 10 is a flowchart of an AF operation according to the first embodiment.

FIG. 10 shows a subroutine of the AF operation performed in step S902. In step S1000, various settings for the AF operation are performed. For example, the CPU 100 communicates with the taking lens 300 via the lens communication circuit 205, and obtains focal distance information of the taking lens 300 and the like. The CPU 100 also sets the longest accumulation time of the AF sensor 101 in accordance with the operation by the photographer.

In step S1001, the priority of each line sensor pair is determined in order to drive the AF sensor 101. In this embodiment, it is assumed that there are three priority ranks. Since the focus detection area 5 is the selected area as mentioned above, the highest priority (priority 1) is given to the line sensor pair 102-5. The second priority (priority 2) is given to the line sensor pairs 102-1, 102-4, 102-6, and 102-10 that correspond to the focus detection area 1, the focus detection area 4, the focus detection area 6, and the focus detection area 10, respectively, which are adjacent to the focus detection area 5. The lowest priority (priority 3) is given to the remaining line sensor pairs. Thus, a higher priority is set for the areas closer to the focus detection area 5.

Note that, regarding the other selected areas as well, the focus detection areas to be set to the priority 1, the priority 2, and the priority 3 are predetermined as shown in FIG. 11, in accordance with the selected focus detection area.

In step S1002, the AF sensor 101 is driven based on the priority determined in step S1001, and charge accumulation for obtaining a signal for the focus detection calculation is performed. Note that the details of the driving of the AF sensor 101 will be described later.

In step S1003, the CPU 100 reads out the signals obtained from the charge accumulated in the AF sensor 101, and in step S1004, the focus detection calculation for detecting the focusing state of the taking lens 300 is performed using the obtained signals. In step S1005, a focus detection area is selected. In the first embodiment, due to the one-point selecting AF mode, the lens is driven based on the signal obtained from the line sensor pair corresponding to the focus detection area (main object area) selected by the photographer. Since the focus detection area 5 has been selected here, the lens is driven based on the result of the focus detection calculation with the focus detection area 5 (step S1006).

In step S1007, the focusing state distribution information of an object space is created. Here, the focus detection calculation is performed for all focus detection areas 1 to 11 using signals obtained from the respective focus detection areas, and the focusing state distribution information of the object space is created based on the result of this calculation. The created focusing state distribution information of the object space is used in the AE operation that is performed in aforementioned step S903, for example. In this case, initially, a focus detection area whose focusing state is the same as the focusing state of the focus detection area selected in step S1005 is extracted, and the size of the main object is estimated. Then, the AE operation is performed based on the above information. The focusing state information of the areas other than the selected area is used in order to separate the main object from the background. Accordingly, the focus accuracy in the areas other than the selected areas may be more or less lower than the focus detection accuracy in the selected focus detection area, and there is no problem even if signals of the areas other than the selected area are saturated.

Figure 12:
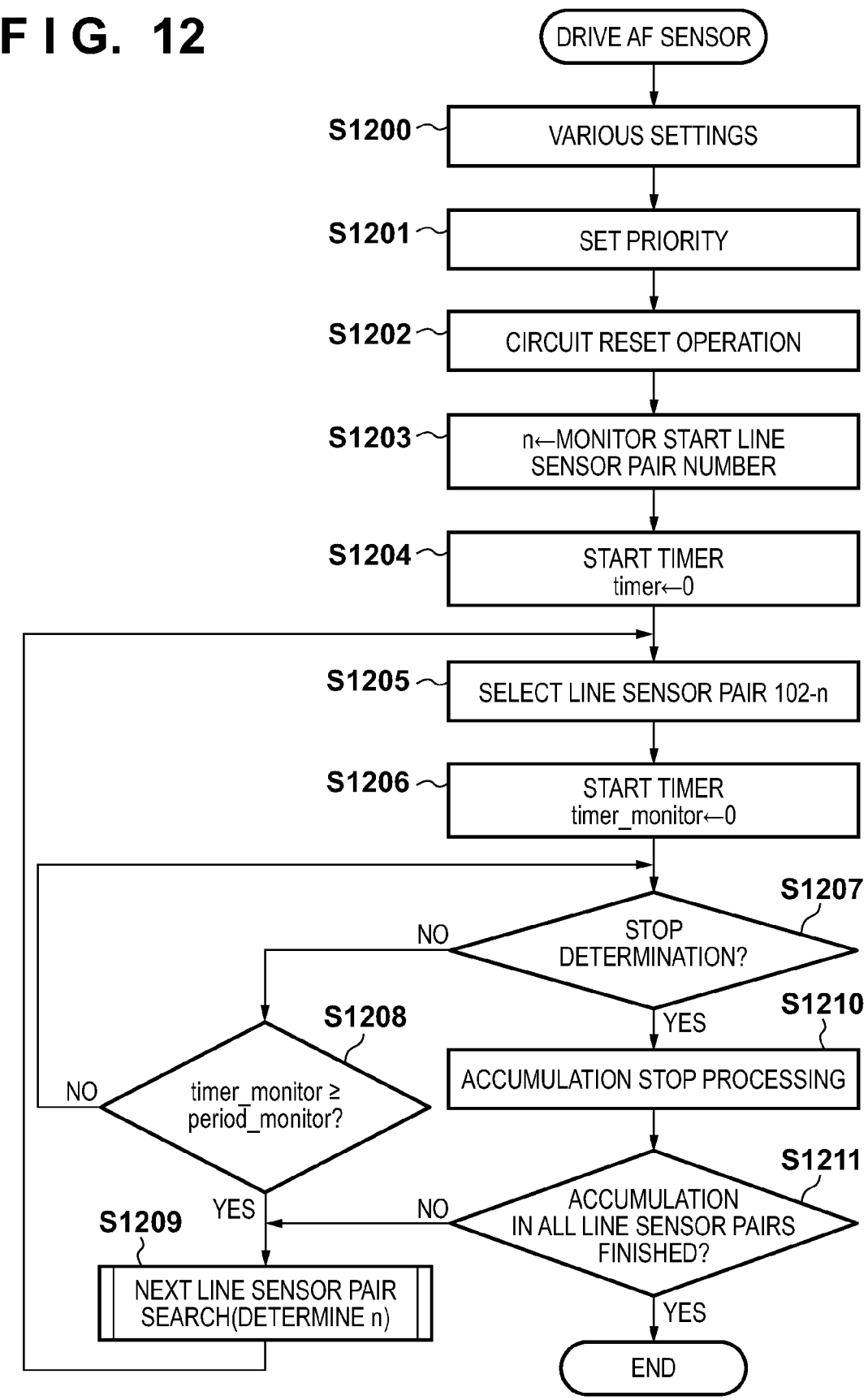
FIG. 12 is a flowchart of processing for driving the AF sensor according to the first embodiment.

FIG. 12 is a flowchart showing the subroutine of the driving of the AF sensor 101 in step S1002. Steps S1200 to S1204 cover operations from an initial setting operation and a circuit reset operation of the AF sensor 101 up to accumulation start. In step S1200, various settings in the AF sensor 101 are performed based on a command from the CPU 100.

In step S1201, the priority of each line sensor pair is set based on the priorities determined in step S1001. The priority of each line sensor pair is determined by the CPU 100 setting priority identification register "priority[n]" (n=1 to 11) that corresponds to the line sensor pair 102-n, by means of communication. The highest priority (priority 1) is given if priority[n]=1 is set, the middle priority (priority 2) is given if priority[n]=2 is set, and the lowest priority (priority 3) is given if priority[n]=3 is set.

The register "priority[n]" is set in accordance with the priority of each line sensor pair determined in step S1001 in FIG. 10. Since the focus detection area 5 is the selected area as mentioned above, in this case the priority of the line sensor pair 102-5 is highest, and is set such that priority[5]=1. Similarly, as described with reference to FIG. 11, the register is set such that priority[1, 4, 6, 10]=2, and such that priority[2, 3, 7, 8, 9, 11]=3.

In step S1202, the charge of the photoelectric conversion units of the line sensor pairs 102-1 to 102-11 is simultaneously reset, and charge accumulation is started. In step S1203, the line sensor pair of the highest priority is set as a monitoring start line sensor pair, based on the priority information (priority[n]) that was set in step S1201. It is assumed here that n=5, and the line sensor pair 102-5 is set as the monitoring start line sensor pair. In step S1204, a timer "timer" that is contained in the control unit 103 is reset, and thereafter clocking is started in order to start measurement of elapsed time (charge accumulation time) since the start of charge accumulation.

Steps S1205 to S1209 are a circulative monitoring operation in which the selected line sensor pair is monitored in a predetermined cycle. In step S1205, the line sensor pair 102-n (n=1 to 11) is selected by the line sensor selection circuit 104, and the signal of the line sensor pair 102-n is output to the largest value detection circuit 105.

In step S1206, clocking is started after resetting a timer "timer_monitor" that is contained in the control unit 103 to start measurement of elapsed time of the monitoring period. In step S1207, the peak signal of the line sensor pair 102-n that is output from the largest value detection circuit 105 is compared with the accumulation stop level Vref in the accumulation stop determination circuit 106 to determine whether or not to stop accumulation. If the peak signal is larger than or equal to the accumulation stop level Vref, the processing proceeds to step S1210, and if the peak signal is smaller than the accumulation stop level Vref, the processing proceeds to step S1208.

In step S1208, the value of the timer "timer_monitor" is compared with a monitoring cycle time "period_monitor" for one line sensor pair. The accumulation stop determination in step S1207 is repeated until the timer "timer_monitor" reaches the monitoring cycle time "period_monitor".

If the timer "timer_monitor" reaches the monitoring cycle time "period_monitor" while it has not been determined to stop accumulation, the processing proceeds to step S1209 and advances to next line sensor pair search for determining the next monitoring target line sensor pair. Note that the next line sensor pair search processing will be described later in detail.

On the other hand, if, during the monitoring period, it is determined in step S1207 to stop accumulation, the processing proceeds to step S1210, and accumulation stop processing is performed. In step S1210, accumulation in the line sensor pair 102-n is stopped, the pixel signal is held, and the value of the timer "timer" is stored as the charge accumulation time in the storage unit contained in the control unit 103.

In step S1211, it is determined whether or not accumulation in all line sensor pairs has ended. If accumulation in all line sensor pairs has ended, the AF sensor operation is terminated. On the other hand, if a line sensor pair that has not finished accumulation still remains, the processing proceeds to step S1209, and the next line sensor pair search is performed.

Note that although not clearly shown in the drawings, if a forcible accumulation stop command is transmitted from the CPU 100, in step S1207 the processing forcibly proceeds to step S1210, and stop processing is performed.

In the next line sensor pair search in the case where the forcible accumulation stop command is transmitted, all line sensor pairs are sequentially selected and the stop processing for all line sensor pairs is performed, regardless of the charge accumulation time and the priority.

Steps S1205 to S1211 are repeated, and the AF sensor operation is terminated when the accumulation stop processing for all line sensor pairs is terminated.

Next, the next line sensor pair search in step S1209 will be described in detail with reference to FIGS. 1 and 13. In the next line sensor pair search, the line sensor pair to be the next monitoring target is determined based on the charge accumulation time (timer) and the priority information (priority[n]). Here, initially, the next monitoring target line sensor pair is determined such that only the line sensor pair having the priority 1 is monitored, until the charge accumulation time exceeds a threshold value "time_1". Next, the next monitoring target line sensor pair is determined so as to monitor such that the line sensor pairs having the priority 1 and the priority 2 are monitored, until the charge accumulation time exceeds a threshold value "time_2". After the charge accumulation time exceeds the threshold value "time_2", the next monitoring target line sensor pair is determined such that all line sensor pairs are monitored. The specific monitoring order will now be described.

Figure 1:
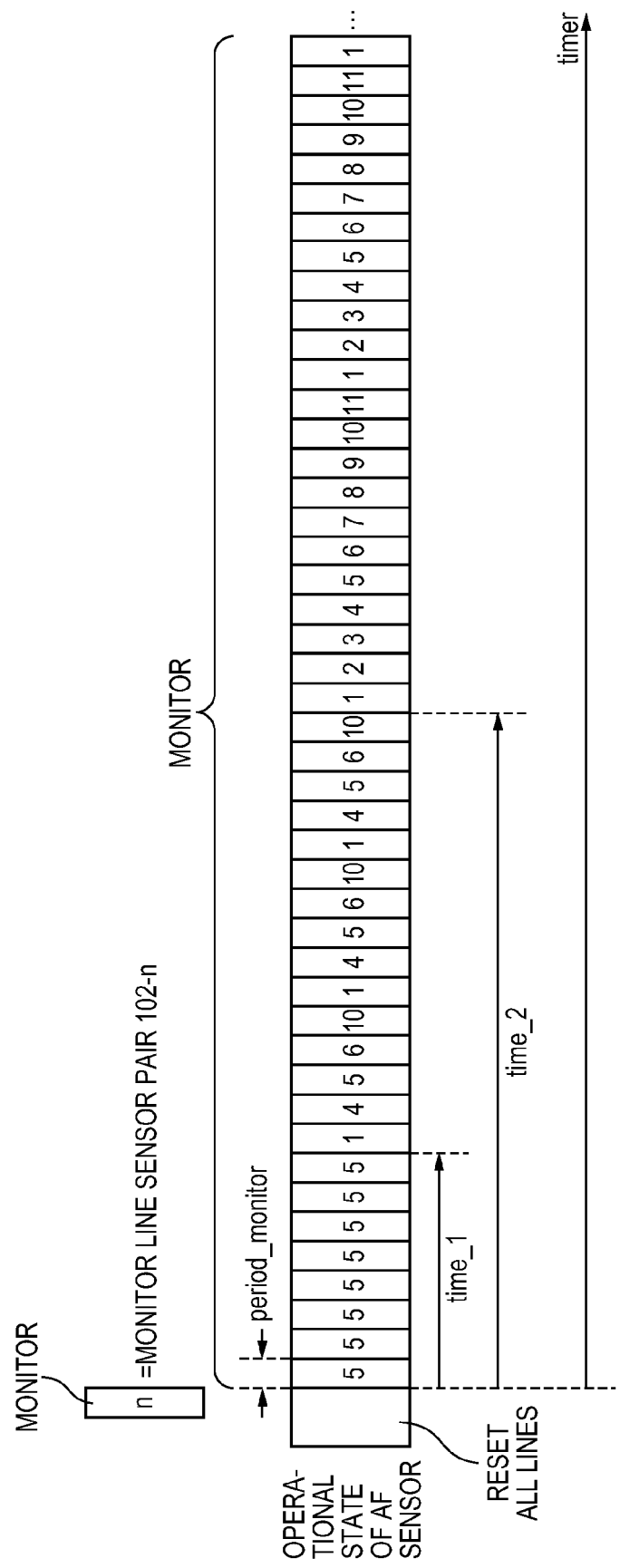
FIG. 1 is a diagram illustrating a monitoring order in next line sensor pair search in a first embodiment.

In FIG. 1, after all line sensor pairs are reset, the line sensor pair 102-5 that is set to the priority 1 is set as the monitoring start line sensor pair, and the peak signal thereof is monitored. From when the charge accumulation is started until the time "time_1", only the line sensor pair 102-5 having the priority 1 is kept monitored while steps S1205 to S1209 are repeated.

After the charge accumulation time exceeds the time "time_1", the line sensor pairs 102-1, 102-4, 102-6, and 102-10 that are set to the priority 2 are sequentially selected in addition to the line sensor pair 102-5, and the monitoring operation is performed. Furthermore, after the charge accumulation time exceeds the time "time_2", all line sensor pairs including the line sensor pairs that are set to the priority 3 are sequentially selected, and the monitoring operation is performed.

Next, the case where the line sensor pair 102-5 that is set to the priority 1 stops charge accumulation by the time "time_1" will be described with reference to FIG. 13. In FIG. 13, the solid line portion of the peak signal of the line sensor pair 102-5 indicates the time period during which the line sensor pair 102-5 is selected and monitored, and the broken line portion thereof indicates the time period during which a line sensor pair other than the line sensor pair 102-5 is selected and monitored.

As in FIG. 1, after all line sensor pairs are reset, the line sensor pair 102-5 that is set to the priority 1 is selected, and the peak signal thereof is monitored. Steps S1205 to S1209 are repeated in the cycle of "period_monitor", while only the line sensor pair 102-5 is kept monitored.

Figure 13:
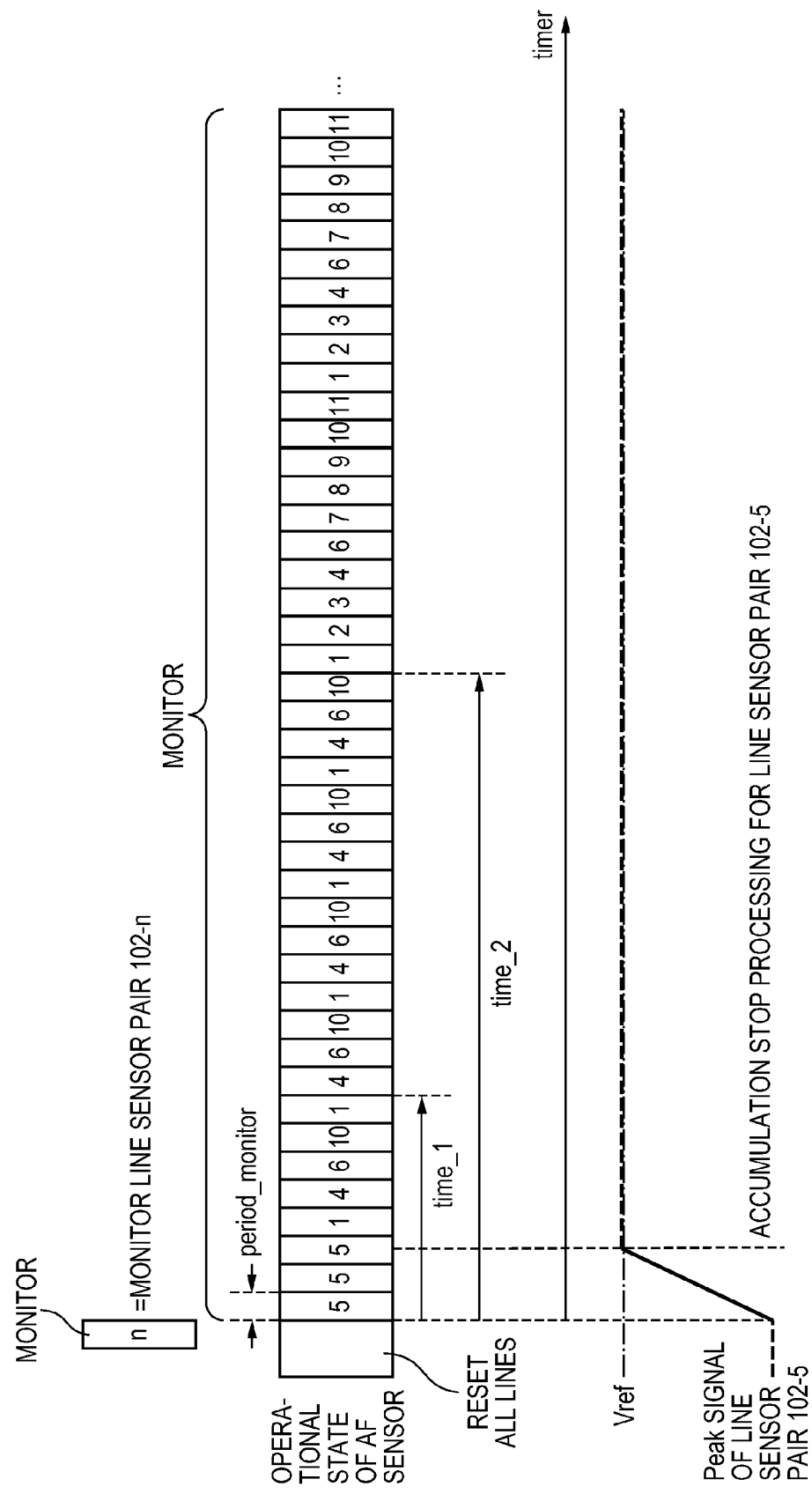
FIG. 13 is a diagram illustrating a monitoring order in the next line sensor pair search according to the first embodiment.

In the example in FIG. 13, peak signal of the line sensor pair 102-5 reaches the accumulation stop level Vref during the third cycle of the monitoring operation for the line sensor pair 102-5, and accordingly the charge accumulation stop processing is performed (step S1210). Since accumulation in the line sensor pair that is set to the priority 1 has completely ended at this point in time, the monitoring operation for the line sensor pairs that are set to the priority 2 in the initial settings is started although the charge accumulation time has not elapsed the time "time_1". The line sensor pairs 102-1, 102-4, 102-6, and 102-10 that are set to the priority 2 are sequentially selected, and the monitoring operation is performed. Furthermore, after the charge accumulation time exceeds the time "time_2", all line sensor pairs including the line sensor pairs that are set to the priority 3 are sequentially selected, and the monitoring operation is performed.

Note that if the peak signal exceeds the accumulation stop level Vref during the monitoring operation for each line sensor pair, this line sensor pair is excluded from the monitoring target, and the remaining line sensor pairs are monitored.

Although only the line sensor pair 102-5 is set to the priority 1 in the first embodiment, a plurality of line sensor pairs may be set to the priority 1. For example, in the case where a plurality of line sensor pairs are arranged with respect to one focus detection area, the plurality of line sensor pairs are set to the priority 1. Further, although there are three priority ranks, namely the priorities 1 to 3 in the first embodiment, this need not be the case.

Figure 22:
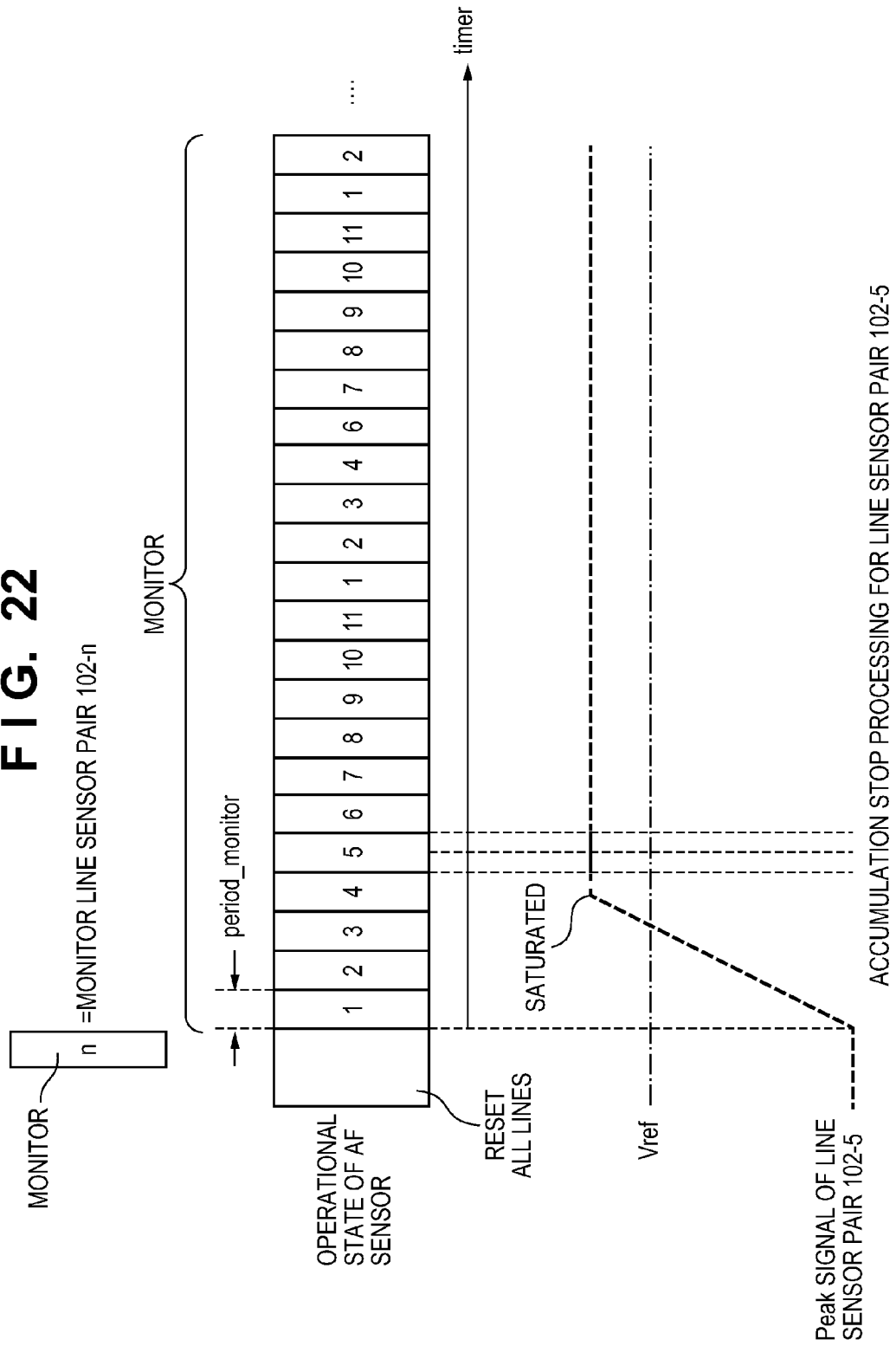
FIG. 22 is a diagram for illustrating saturation of a line sensor of a conventional technique.

An exemplary operation in the case where the AF sensor 101 is driven with the conventional technique will now be described with reference to FIG. 22, in order to compare this exemplary operation with the operation of the AF sensor 101 according to the present invention. In FIG. 22, the solid line portion of the peak signal of the line sensor pair 102-5 indicates the time period during which the line sensor pair 102-5 is selected and monitored, and the broken line portion thereof indicates the time period during which a line sensor pair other than the line sensor pair 102-5 is selected and monitored. After all line sensor pairs are reset, the line sensor pairs 102-1 to 102-11 are sequentially monitored.

Assuming that the object luminance in the area corresponding to the line sensor pair 102-5 is the same as that in FIG. 13, the signal reaches the saturation level before the line sensor pair 102-5 is monitored, as is understood from FIG. 22. With this signal, the accuracy of the focus detection calculation deteriorates. Furthermore, even though only the line sensor pair 102-5 can be caused to perform accumulation and to be monitored, in this case the focusing state distribution in the object space cannot be acquired.

As described above, according to the first embodiment, the focus detection area selected by the photographer is set as the main object area, and control is performed so as to set a high priority for the corresponding line sensor pair and increase the monitoring frequency thereof. Thus, in the focus detection operation, the pixel signals can be accumulated while charge accumulation in other line sensor pairs are simultaneously performed in parallel, without saturating the line sensor pair corresponding to the selected focus detection area. As a result, a focusing state can be detected accurately even if the main object has a super-high luminance.

Second Embodiment

Next, a second embodiment of the present invention will be described. Note that since the camera configuration is the same as that described in the first embodiment with reference to FIGS. 2 to 7, the description thereof will be omitted here.

Figure 14:
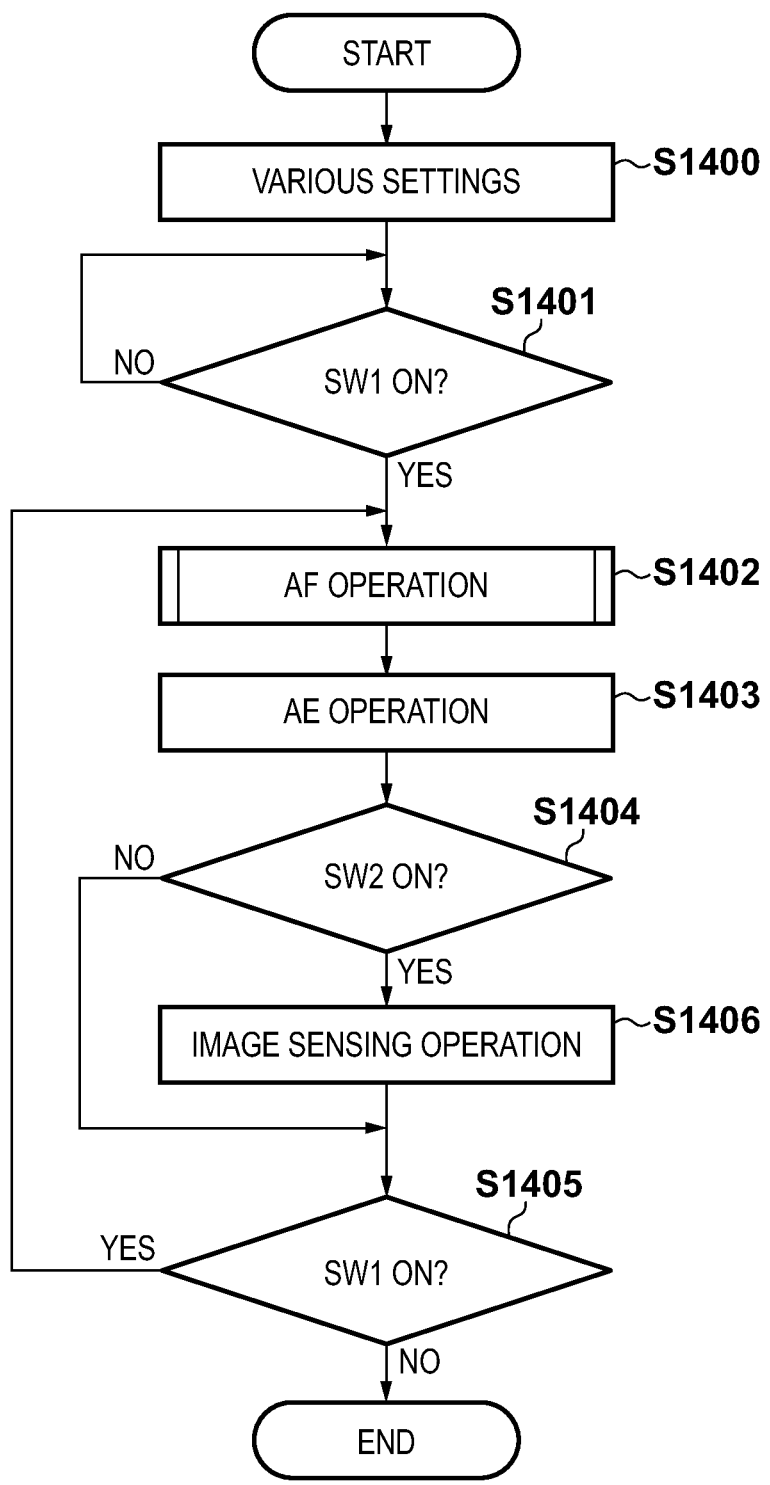
FIG. 14 is a flowchart of an image capturing operation of a camera according to a second embodiment.

FIG. 14 is a flowchart showing the basic operation for image capturing in the camera in the second embodiment. In the second embodiment, a description will be given of the case where the AF mode is a continuous AF mode in which the AF operation is performed in accordance with an operation given to the release button by the photographer, and the focus is not locked even if focusing is complete and the AF operation is continued while the switch SW1 is in an on state. In addition, a focus detection area auto-selection mode is employed in which any one of 11 focus detection areas is automatically selected based on object information. It is also assumed that the photographic mode is a continuous photographic mode.

In step S1400, initialization of various set values and various settings based on operations by the photographer are performed. In step S1401, the state of a switch SW1 is checked, which is turned on upon the release button being pressed down to a first stroke, and it is determined whether the switch SW1 is in an on or off state. The processing in step S1401 is repeated until the switch SW1 is turned on. After the switch SW1 is turned on, the processing proceeds to step S1402, and the AF operation is performed. Note that the details of the AF operation will be described later. In step S1403, the AE operation is performed.

Next, in step S1404, the state of a switch SW2 is checked, which is turned on upon the release button being pressed down to a second stroke, and it is determined whether the switch SW2 is in an on or off state. If the switch SW2 is in an off state, the processing proceeds to step S1405, and the state of the switch SW1 is checked. If the switch SW1 is in an on state in step S1405, the processing returns to step S1402, and the AF operation is repeated. Accordingly, while the switch SW1 remains in an on state and until the switch SW2 is pressed, the camera repeats the AF operation and continues to move the lens in accordance with the focusing state of the object. On the other hand, if the switch SW1 is in an off state in step S1405, the operation is terminated.

If it is determined in step S1404 that the switch SW2 is in an on state, the processing proceeds to step S1406, and the image capturing operation is performed. After the image capturing operation ends, the processing proceeds to step S1405, and the state of the switch SW1 is checked again.

If the switch SW1 and the switch SW2 remain in an on state, the AF operation (step S1402), the AE operation (step S1403), and the image sensing operation (step S1406) are repeated, and continuous photographing is performed while the AF operation and the AE operation are performed.

Figure 15:
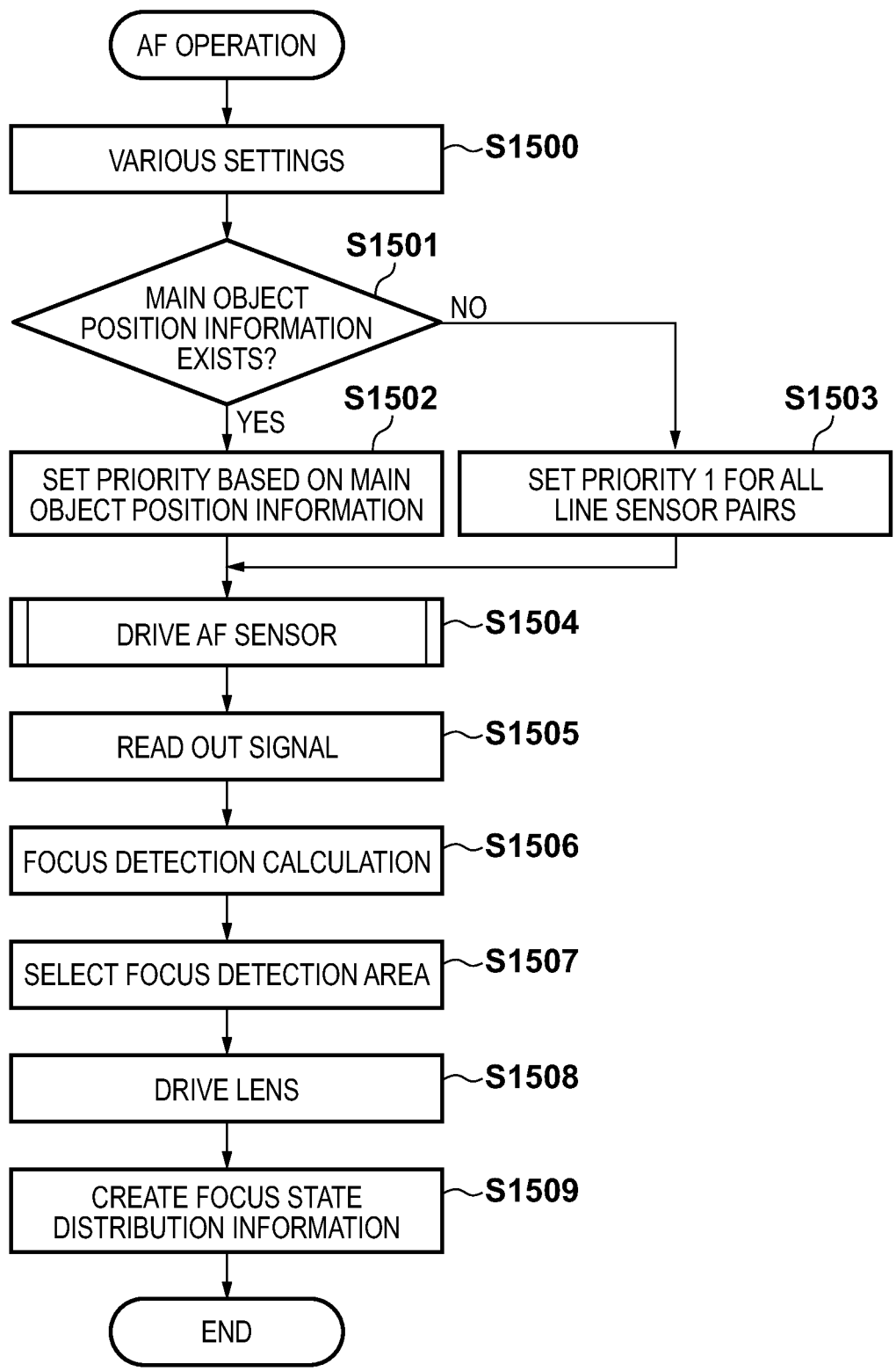
FIG. 15 is a flowchart of an AF operation according to the second embodiment.

FIG. 15 shows a subroutine of the AF operation performed in step S1402. In step S1500, various settings for the AF operation are performed. In step S1501, it is determined whether or not main object position information exists. If it is determined that the main object position information exists, the processing proceeds to step S1502, and the priority of each line sensor pair is set based on this information. The main object position is the focus detection area selected in the focus detection area selection (step S1507) in the previous AF operation, which will be described later. This focus detection area is set to the priority 1, and a high priority is set for focus detection areas in descending order of the distance from the selected focus detection area. Note that the priority setting conforms to that in FIG. 11, for example.

On the other hand, if it is determined that the main object position information does not exist, the processing proceeds to step S1503, and the same priority is set for all line sensor pairs. Here, the priority 1 is set (priority[n]=1, n=1 to 11). For example, the main object position information does not exist in the first AF operation in FIG. 14, and accordingly the processing proceeds to step S1503.

In step S1504, the AF sensor 101 is driven based on the priority determined in step S1502 or step S1503, and charge accumulation for obtaining signals for the focus detection calculation is performed. Note that the driving of the AF sensor here is the same as that in FIG. 12, and the description thereof will be omitted. In step S1505, the CPU 100 reads out a signal obtained from the charge accumulated in the AF sensor 101, and in step S1506, the focus detection calculation for detecting the focusing state of the taking lens 300 is performed using the obtained signal.

Since the focus detection area is automatically selected in the mode employed in the second embodiment, in step S1507 a focus detection area is selected from among the focus detection areas 1 to 11. For example, the focus detection area is selected based on the reliability of the focus detection calculation result obtained based on the pixel signal of the line sensor pair, the focus detection calculation result obtained in step S1506, and the like. For example, the focus detection area is selected, giving priority to focus detection areas with an object regarding which the focus detection calculation result is reliable and that is close to the photographer. Then, in step S1508, the lens is driven based on the focusing state of the selected focus detection area. In step S1509, the focusing state distribution information of an object space is created.

Next, a description will be given, using FIG. 16, of the order of the next line sensor pair search and the monitoring in the driving of the AF sensor when it is determined in step S1501 that the main object position information does not exist and the priority 1 is set for all line sensor pairs in step S1503.

Figure 16:
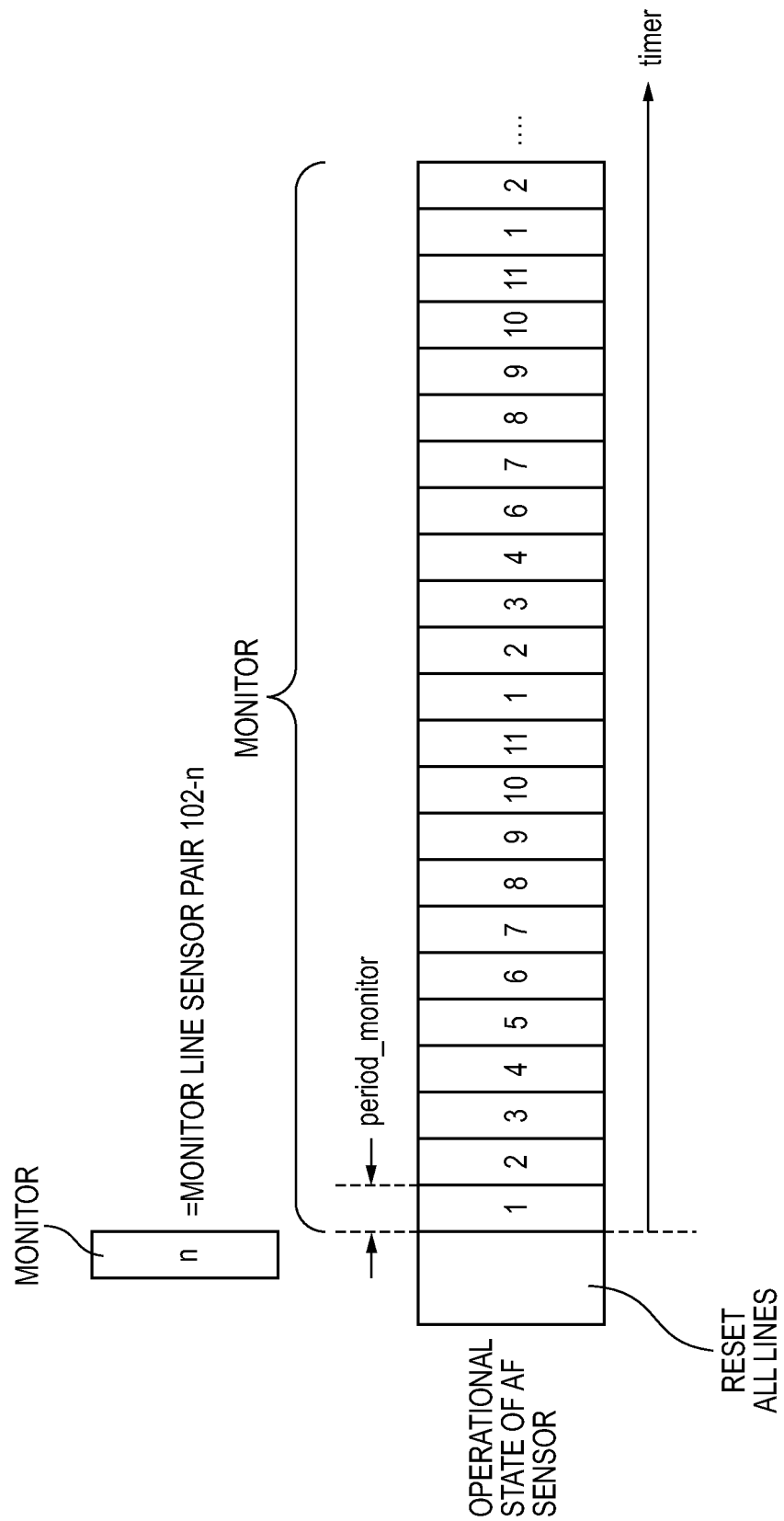
FIG. 16 is a diagram illustrating a monitoring order according to the next line sensor pair search in the second embodiment.

In FIG. 16, after all line sensor pairs are reset, the line sensor pair 102-1 is set as the monitoring start line sensor number, and the peak signal thereof is monitored. Thereafter, the monitoring operation for the line sensor pairs 102-1 to 102-11 is repeated. In this manner, in the case where the priority 1 is set for all line sensor pairs, consequently the same operation as that of the AF sensor 101 in the monitoring order in the conventional technique shown in FIG. 22 is performed.

Next, the operation in the case where it is determined in step S1501 that the main object position information exists will be described in detail. For example, it is assumed that the focus detection area 5 has been selected in the previous AF operation, and the main object position (main object area) is the focus detection area 5. At this time, the priority of the corresponding line sensor pair 102-5 is highest, and is set such that priority[5]=1 (priority 1). The priorities of the other line sensor pairs are set in accordance with FIG. 11. The priority 2 is set for the line sensor pairs 102-1, 102-4, 102-6, and 102-10 (priority [1, 4, 6, 10]=2) that correspond to the focus detection area 1, the focus detection area 4, the focus detection area 6, and the focus detection area 10, respectively. The priority 3 is set for the other line sensor pairs (priority[2, 3, 7, 8, 9, 11]=3).

The driving of the AF sensor is performed based on the priorities that are set as above. The driving of the AF sensor at this time is the same operation as that described above with reference to FIGS. 1 and 13.

As described above, according to the second embodiment, in the case where the focus detection operation is continuously performed multiple times, the main object position is determined based on the focus detection result in the previous focus detection operation. Furthermore, the priority of each line sensor pair is set based on the main object position. Thus, even in the focus detection area auto-selection mode in which any of the plurality of focus detection areas is automatically selected, the same effect as that of the first embodiment can be achieved, and the focusing state can be detected accurately.

Third Embodiment

A third embodiment of the present invention will be described below. Note that since the camera configuration is the same as that described in the first embodiment with reference to FIGS. 2 to 7, the description thereof will be omitted here. The basic operation of the camera in the third embodiment is the same as the operation described in the second embodiment with reference to FIG. 14, the photographic mode is the continuous photographic mode, the AF mode is the continuous AF mode, and the focus detection area is set in the auto-selection mode.

Next, the AF operation performed in step S1402 in the third embodiment will be described with reference to the flowchart in FIG. 17. In step S1700, various settings for the AF operation is performed. In step S1701, it is determined whether or not luminance information exists. If it is determined that the luminance information exists, the processing proceeds to step S1702, and the priority of each line sensor pair is set based on this information. The manner of setting the priorities will be described later. The luminance information is calculated in the luminance information calculation in step S1706 in the previous AF operation, which will be described later.

On the other hand, if it is determined that the luminance information does not exist, the processing proceeds to step S1703, and the same priority is set for all line sensor pairs. Here, the priority 1 is set therefor (priority[n]=1, n=1 to 11). For example, the main object position information does not exist in the first AF operation in FIG. 14, and accordingly the processing proceeds to step S1503. In step S1704, the AF sensor 101 is driven based on the priority determined in step S1702 or step S1703, and charge accumulation for obtaining signals for the focus detection calculation is performed. Note that the driving of the AF sensor here is the same as that in FIG. 12. In step S1705, the CPU 100 reads out the signals obtained from the charge accumulated in the AF sensor 101, and in step S1706, the luminance information of the respective focus detection areas is calculated based on the obtained signals and the accumulation information. Simultaneously, it is determined whether or not the pixel signal of each line sensor pair is saturated. For example, assuming that an AD conversion circuit of the CPU 100 has 10 bits, each pixel signal of the line sensor pairs is quantized into 0 to 1023. It is determined that the pixel signal whose value is 1023 is saturated, and it is determined that the line sensor pair including the pixel that output this signal is saturated.

In step S1707, the focus detection calculation for detecting the focusing state of the taking lens 300 is performed using the obtained signals. In step S1708, one focus detection area is selected from among the focus detection areas 1 to 11. For example, the focus detection area is selected based on the reliability of the calculation using the pixel signals of the line sensor pairs, and the focus detection calculation result obtained in step S1707. For example, the focus detection area is selected, giving priority to focus detection areas with an object regarding which the focus detection calculation result is reliable and that is close to the photographer. Further, the priority to be selected for the focus detection area corresponding to the saturated line sensor pair is lowered. Then, in step S1709, the lens is driven based on the focusing state of the selected focus detection area. In step S1710, the focusing state distribution information of the object space is created.

Next, a detailed description will be given of the manner of setting the priorities based on the luminance information in step S1702 in the case where it is determined in step S1701 that the luminance information exists. In step S1702, the priority of each line sensor pair is set based on the luminance information calculation result (step S1706) in the previous AF operation. Here, a higher priority is set for the line sensor pairs as the luminance of the corresponding focus detection areas is higher.

For example, two types of luminance determination threshold values (L1, L2) are set, and these threshold values are compared with the luminance calculated from the signals obtained from the line sensor pairs. The priority 1 is given if the luminance is higher than L1, the priority 2 is given if the luminance is between L1 and L2, and the priority 3 is given if the luminance is lower than L2. If it has been determined that any line sensor pair is saturated, the highest priority is set for this line sensor pair.

The driving of the AF sensor in the case where it is determined in step S1701 that the luminance information does not exist and the priority 1 is set for all line sensor pairs in step S1503 is the same as that in FIG. 16.

Assume that it is determined in step S1701 that the luminance information exists, and it is also determined in the previous AF operation that the focus detection area 5 is saturated. Also assume that the luminance of the focus detection area 1, the focus detection area 4, the focus detection area 6, and the focus detection area 10, which are adjacent to the focus detection area 5, is between the luminance determination threshold values L1 and L2, and the luminance of the other line sensor pairs is lower than L2.

At this time, the priority of the line sensor pair 102-5 is highest, and is set such that priority[5]=1 (priority 1). The priority 2 is set for the line sensor pairs 102-1, 102-4, 102-6, and 102-10 that correspond to the focus detection area 1, the focus detection area 4, the focus detection area 6, and the focus detection area 10, respectively (priority[n]=2, n=1, 4, 6, 10). The priority 3 is set for the other line sensor pairs (priority [n]=3, n=2, 3, 7, 8, 9, 11).

The driving of the AF sensor is performed based on the priorities that are set as above. The driving of the AF sensor at this time is the same operation as that described above with reference to FIGS. 1 and 13. Since a higher priority is given to the line sensor pairs corresponding to the areas having a higher luminance, control is performed such that only these line sensor pairs are monitored, as shown in FIG. 13. As a result, accumulation control can be performed without the pixel signals of these line sensor pairs being saturated.

As described above, according to the third embodiment, in the case where the focus detection operation is continuously performed multiple times, the priority of each line sensor pair is set based on the luminance information of a plurality of focus detection areas in the previous focus detection operation. Thus, in the second and subsequent focus detection operation in the focus detection area auto-selection mode in which any of the plurality of focus detection areas is automatically selected, accumulation control can be performed without saturating the pixel signal of the line sensor pair corresponding to the focus area where an object having a high luminance is located. As a result, the focusing state can be detected accurately.

Note that a higher priority may be set in descending order of distance from a line sensor pair that has been found to be saturated or to have a high luminance in the above determination (in accordance with FIG. 11). Thus, even when the high-luminance object has moved since the previous AF operation, the possibility of saturation of the signals in the line sensor pairs can be reduced.

Figure 18A:
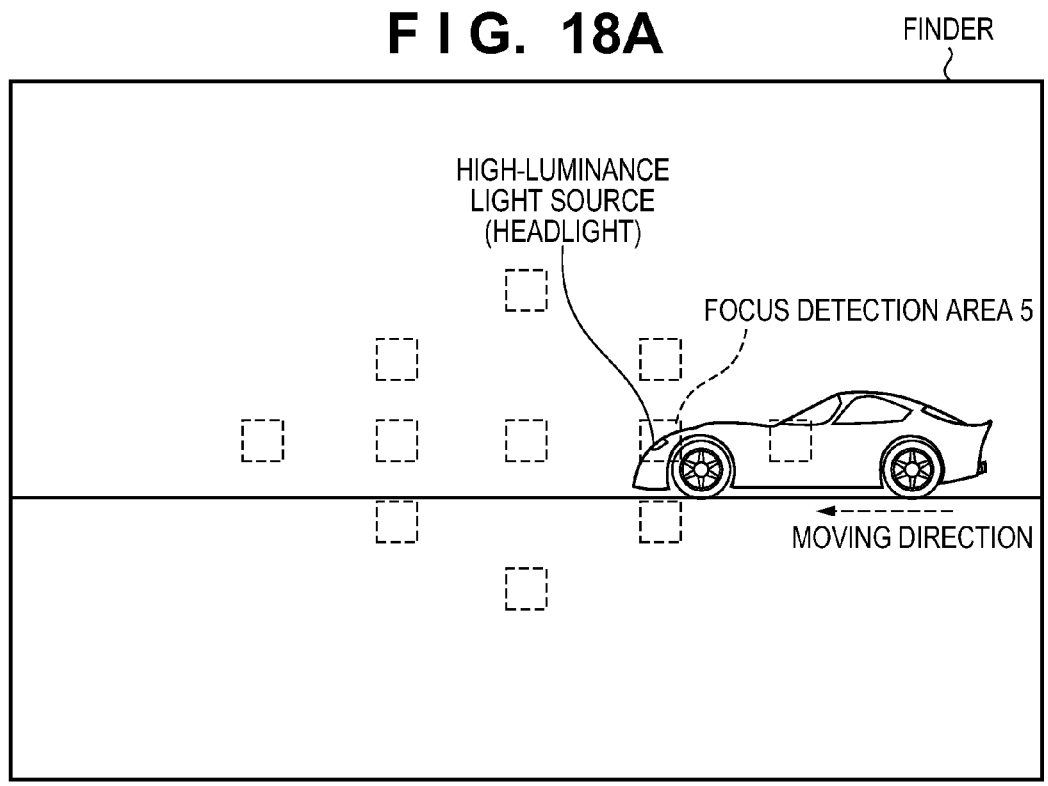
FIGS. 18A and 18B are diagrams for illustrating prediction of the moving direction of an object according to the third embodiment.
Figure 18B:
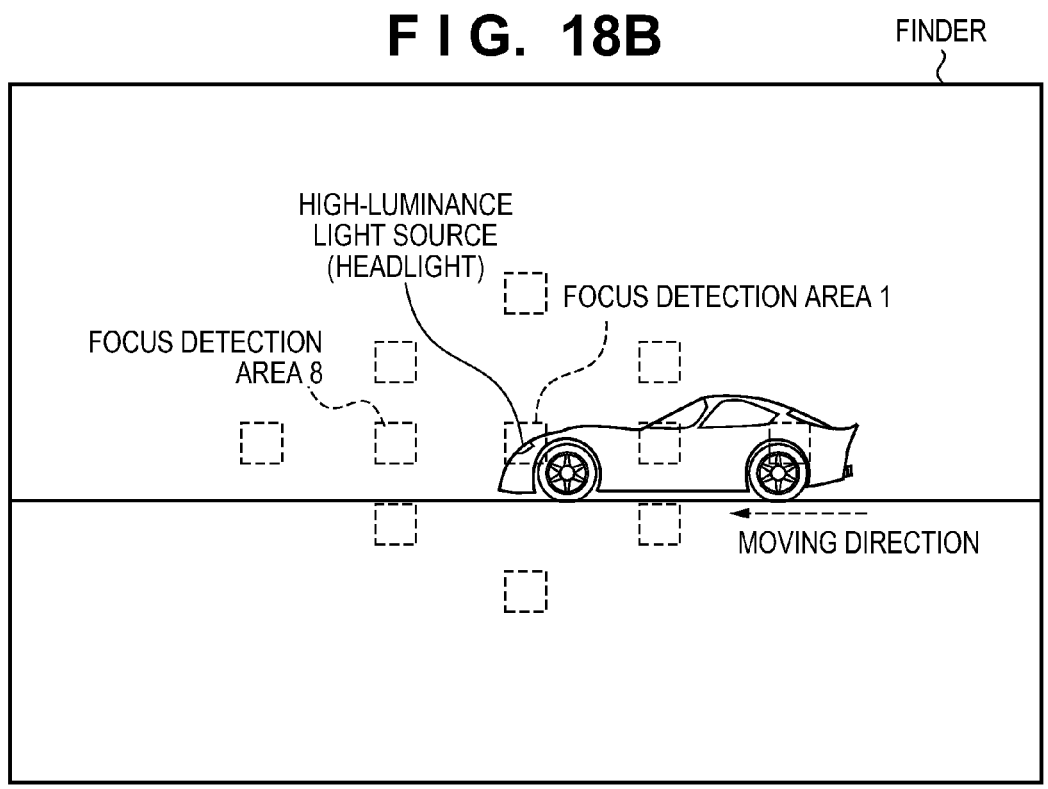

In the case where there are multiple pieces of luminance information that are obtained in multiple times of the focus detection operation, the priority may be set by predicting the moving direction of the high-luminance object in step S1702. FIGS. 18A and 18B show an exemplary case where the headlight of an automobile is a high-luminance light source. The automobile is moving leftward, FIG. 18A shows a finder image during the first AF operation, and FIG. 18B shows a finder image during the second AF operation.

In the AF operation at the point in time in FIG. 18A, it is determined that the high-luminance object exists in the focus detection area 5. In the next AF operation, it is determined that the high-luminance object exists in the focus detection area 1. As a result, it can be recognized that the high-luminance object is moving from right to left. Accordingly, in the third AF operation to be performed thereafter, a high priority is set for the focus detection area 8 that corresponds to the moving direction. Although the luminance information obtained in the previous two times of the AF operation is used in this example, luminance information history of a larger number of times thereof may be used.

Although the luminance information is acquired from the luminance information of a plurality of focus detection areas in the previous focus detection operation in the third embodiment, the luminance information calculated from the signal of the AE sensor 207 obtained in step S1403 may also be used. Furthermore, if object tracking processing is performed using the AE sensor 207, the priority can be set by also using the prediction of the moving direction of the high-luminance object position as described above.

In addition to the above, the priority may be determined based on both the main object position as described in the second embodiment and the luminance information of the object space described in the third embodiment.

Fourth Embodiment

Next, a fourth embodiment of the present invention will be described. Note that since the basic camera configuration is the same as that described in the first embodiment with reference to FIGS. 2 to 7, the description thereof will be omitted here. With the focus detection apparatus according to the above-described first to third embodiments, in the pixel reset operation of the AF sensor 101, the line sensor pairs 102-1 to 102-11 are simultaneously reset. On the other hand, in the fourth embodiment, a focus detection apparatus configured to circulatively reset the line sensor pairs 102-1 to 102-11 one by one will be described.

With the circulative reset, each of the line sensor pairs is selected one by one and sequentially reset, and accordingly the current that is generated due to charging and discharging is reduced. As an effect thereof, noise can be reduced, deterioration of the accuracy of the focus detection calculation can be prevented. Furthermore, as a result of a reset circuit being shared by all line sensor pairs, a reduction in the circuit area can also be achieved.

The basic operation of the camera in the fourth embodiment is the same as the operation described in the second embodiment with reference to FIG. 14, the photographic mode is the continuous photographic mode, the AF mode is the continuous AF mode, and the focus detection area is set in the auto-selection mode. The AF operation is the same as the operation described in the third embodiment with reference to FIG. 17.

Figure 19:
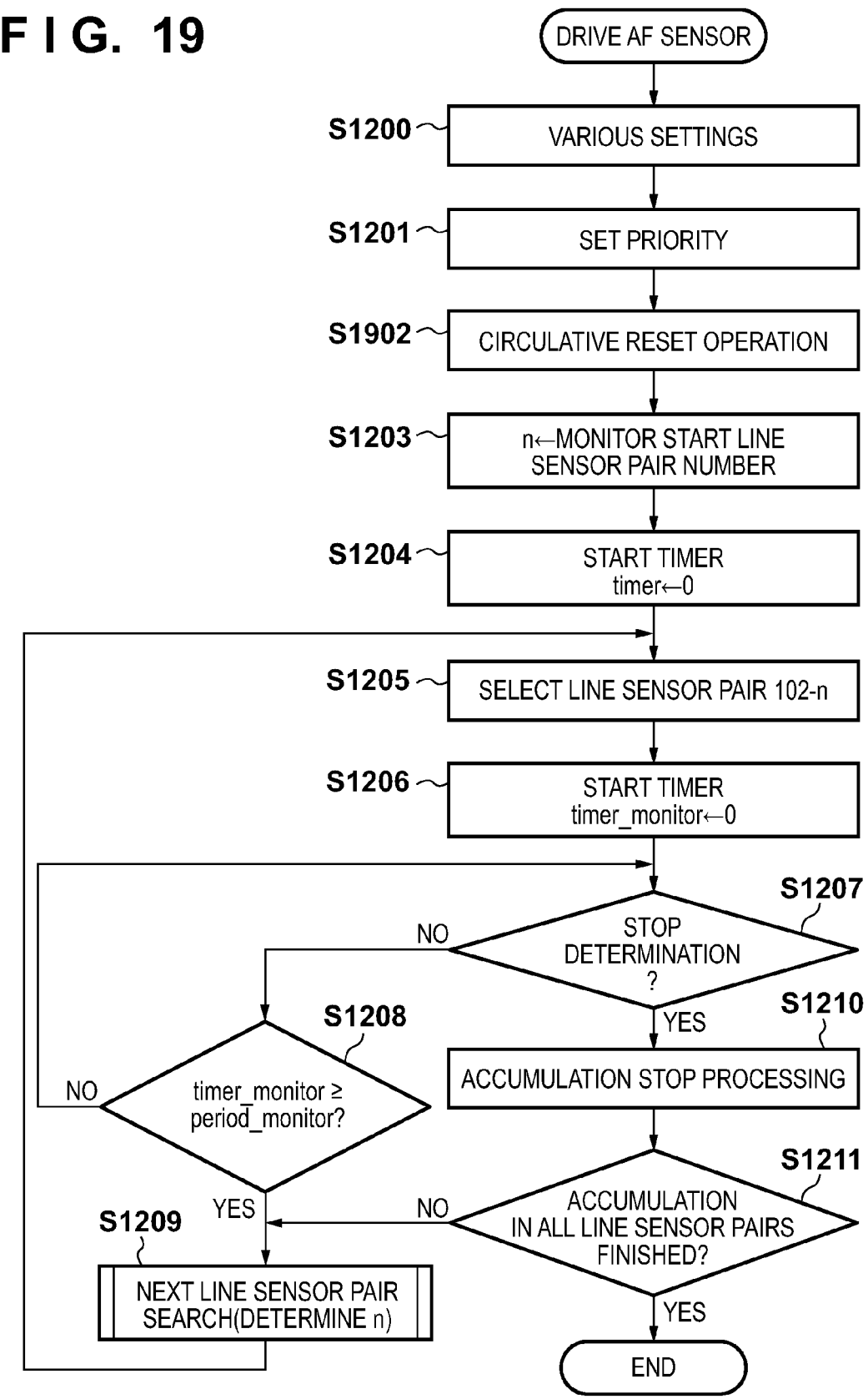
FIG. 19 is a flowchart of processing for driving an AF sensor according to a fourth embodiment.

Processing for driving the AF sensor 101 according to the fourth embodiment is shown in FIG. 19. Since this processing is the same as the above-described processing shown in FIG. 12 except the process in step S1902, the description thereof will be omitted by providing the same reference numerals.

In step S1902, the circulative reset operation is performed in which the line sensor pairs are selected one by one and sequentially reset by the control unit 103 and the line sensor selection circuit 104. The reset order is controlled such that the line sensor pairs are reset in the ascending order of priority, and the line sensor pair having the highest priority is reset lastly. This order is set when the priority is set in step S1201. It is assumed here that the priority is set based on the luminance information obtained in the previous AF operation, as in the third embodiment.

The operations that have been described thus far will be described using FIG. 20. Here, the priority is set as follows, based on the previous AF operation.

Figure 20:
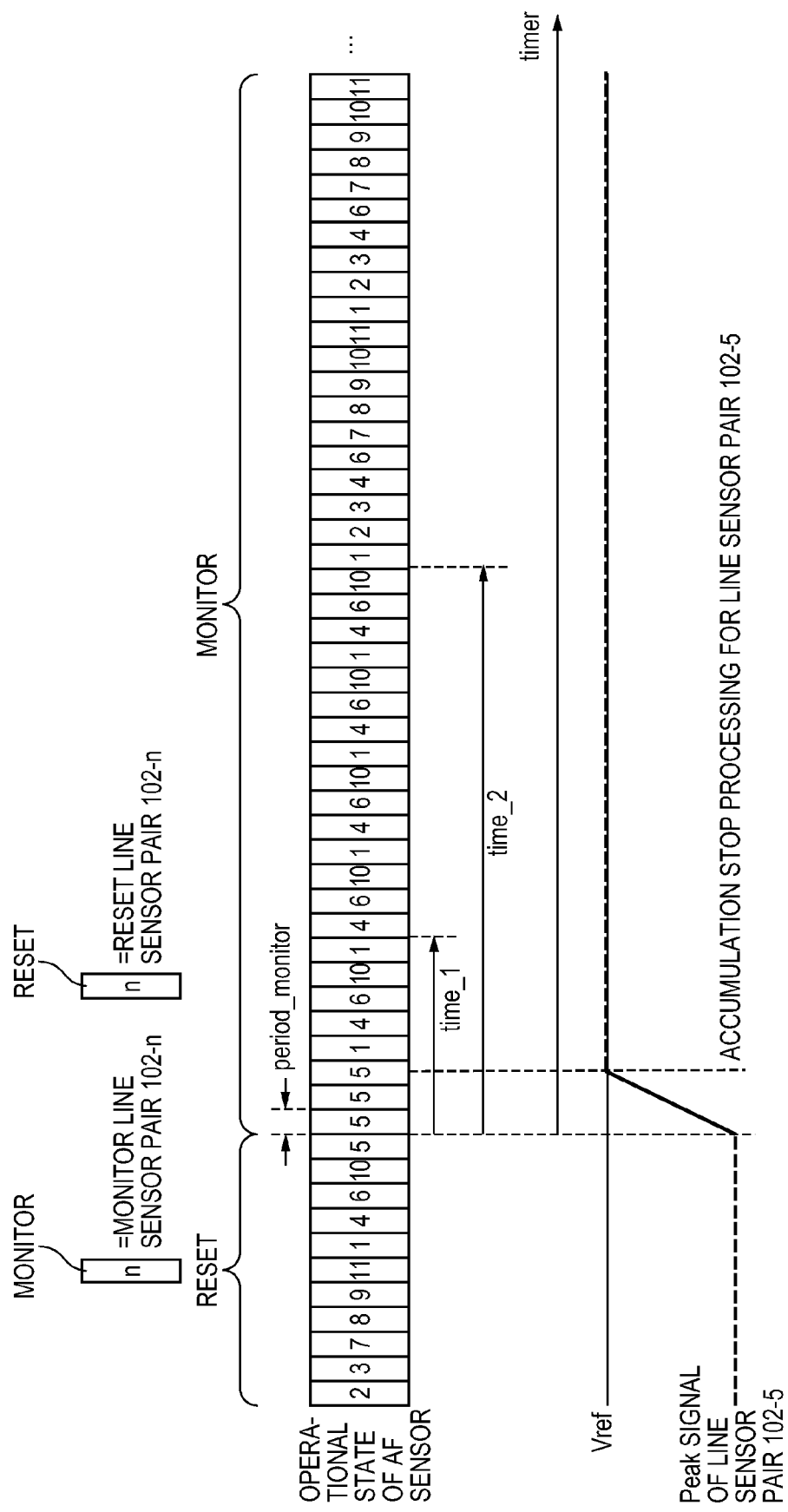
FIG. 20 is a diagram for illustrating a state of driving of the AF sensor according to the fourth embodiment.

Priority 1: line sensor pair 102-5
Priority 2: line sensor pairs 102-1, 102-4, 102-6, 102-10
Priority 3: the other line sensor pairs In FIG. 20, the solid line portion of the peak signal of the line sensor pair 102-5 indicates the time period during which the line sensor pair 102-5 is selected and monitored, and the broken line portion thereof indicates the time period during which a line sensor pair other than the line sensor pair 102-5 is selected and monitored.

First, the line sensor pairs are sequentially reset one by one, starting from the line sensor pairs that are set to the priority 3. Next, the line sensor pairs that are set to the priority 2 are sequentially reset. Lastly, the line sensor pair 102-5 that is set to the priority 1 is reset. Thereafter, the line sensor pair 102-5 that is set to the priority 1 is selected, and the peak signal thereof is monitored. The description of the subsequent operation will be omitted. With the above-described control, the time period from accumulation start to the first monitoring of the line sensors having a higher priority can be shortened more.

Figure 21:
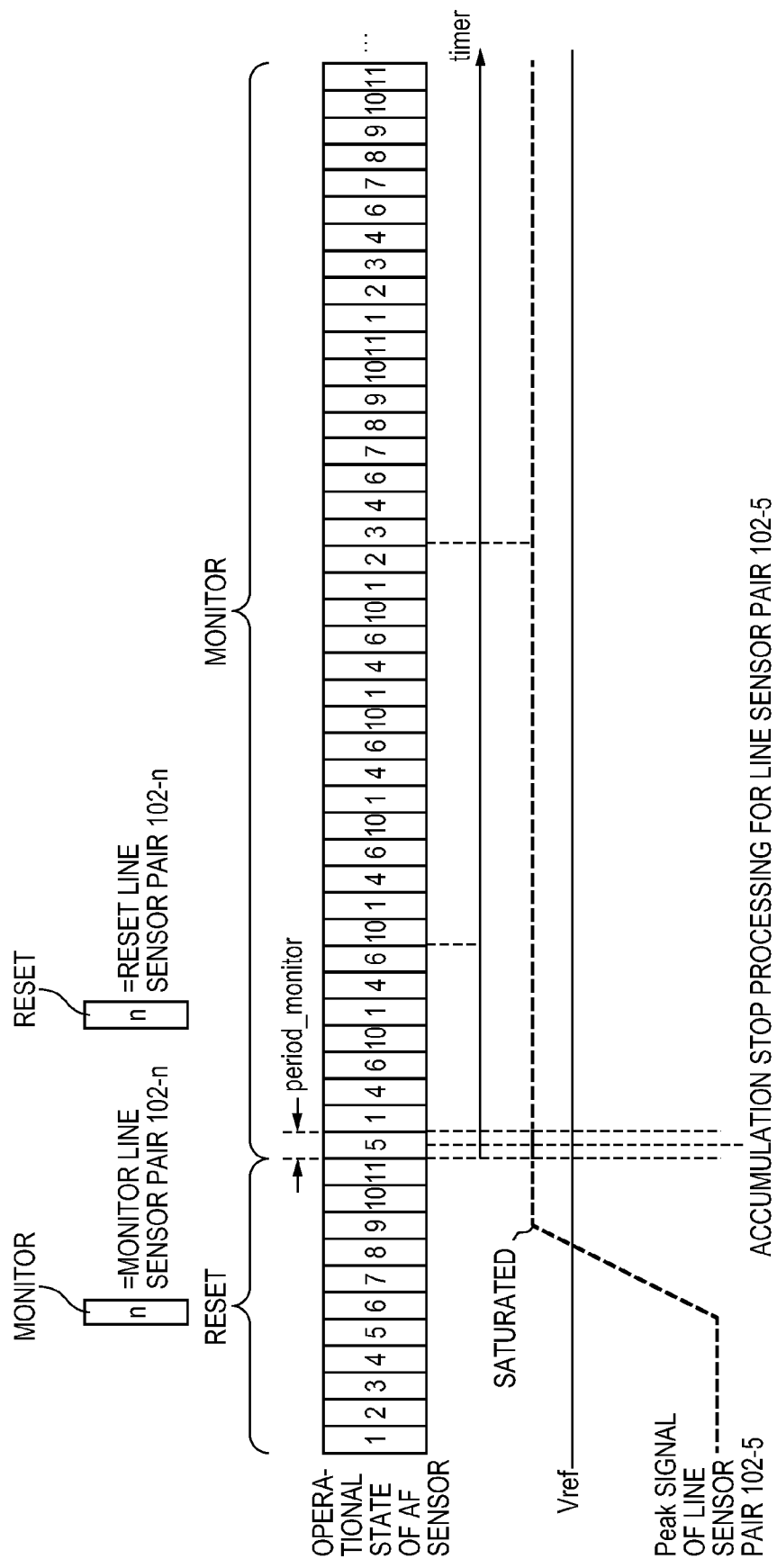
FIG. 21 is a diagram for illustrating saturation of a line sensor in the case where the priority is not set in the order of resetting during circulative reset.

FIG. 21 shows the operation of the AF sensor in the case where the priority is not given in the circulative reset order. In FIG. 21, the solid line portion of the peak signal of the line sensor pair 102-5 indicates the time period during which the line sensor pair 102-5 is selected and monitored, and the broken line portion thereof indicates the time period during which a line sensor pair other than the line sensor pair 102-5 is selected and monitored. After the line sensor pairs 102-1 to 102-11 are sequentially reset, the line sensor pairs are monitored, starting from the line sensor pair 102-5 having the highest priority.

If the object luminance in the area corresponding to the line sensor pair 102-5 is the same as that in FIG. 20, the signal of the line sensor pair 102-5 reaches the saturation level while the line sensor pairs 102-6 to 102-11 are reset. If this signal is used, the accuracy of focus detection calculation deteriorates.

As described above, according to the fourth embodiment, the reset order is determined in accordance with the priority in the AF sensor in which the plurality of line sensor pairs are selected one by one and sequentially reset. Thus, the time taken from reset to monitoring of the line sensor pair having a high priority can be shortened. As a result, accumulation control can be performed without saturating the pixel signals of the line sensor pairs having a high priority, and the focusing state can be detected accurately. Furthermore, since the above configuration reduces current that is generated due to charging and discharging, the noise can be reduced, and deterioration of the accuracy of the focus detection calculation can be prevented. Furthermore, as a result of a reset circuit being shared by all line sensor pairs, a reduction in the circuit area can also be achieved.

Note that although the above embodiments have been described regarding the case of using 11 line sensor pairs, the number of line sensor pairs is not limited thereto.

Although the above embodiments have been described regarding the configuration in which two line sensors are used and a pair of signals having a phase difference is output, the present invention is not limited thereto. For example, a configuration may be employed in which two images that have passed through different exit pupils are formed on one elongated line sensor.

Fifth Embodiment

Next, a fifth embodiment of the present invention will be described. Note that since the main camera configuration is the same as that described in the first embodiment with reference to FIGS. 2 to 4, the description thereof will be omitted here. A relationship between the line sensors in the AF sensor 101 and AF frames within a photographic screen will be described with reference to FIGS. 24 and 25.

Figure 24:
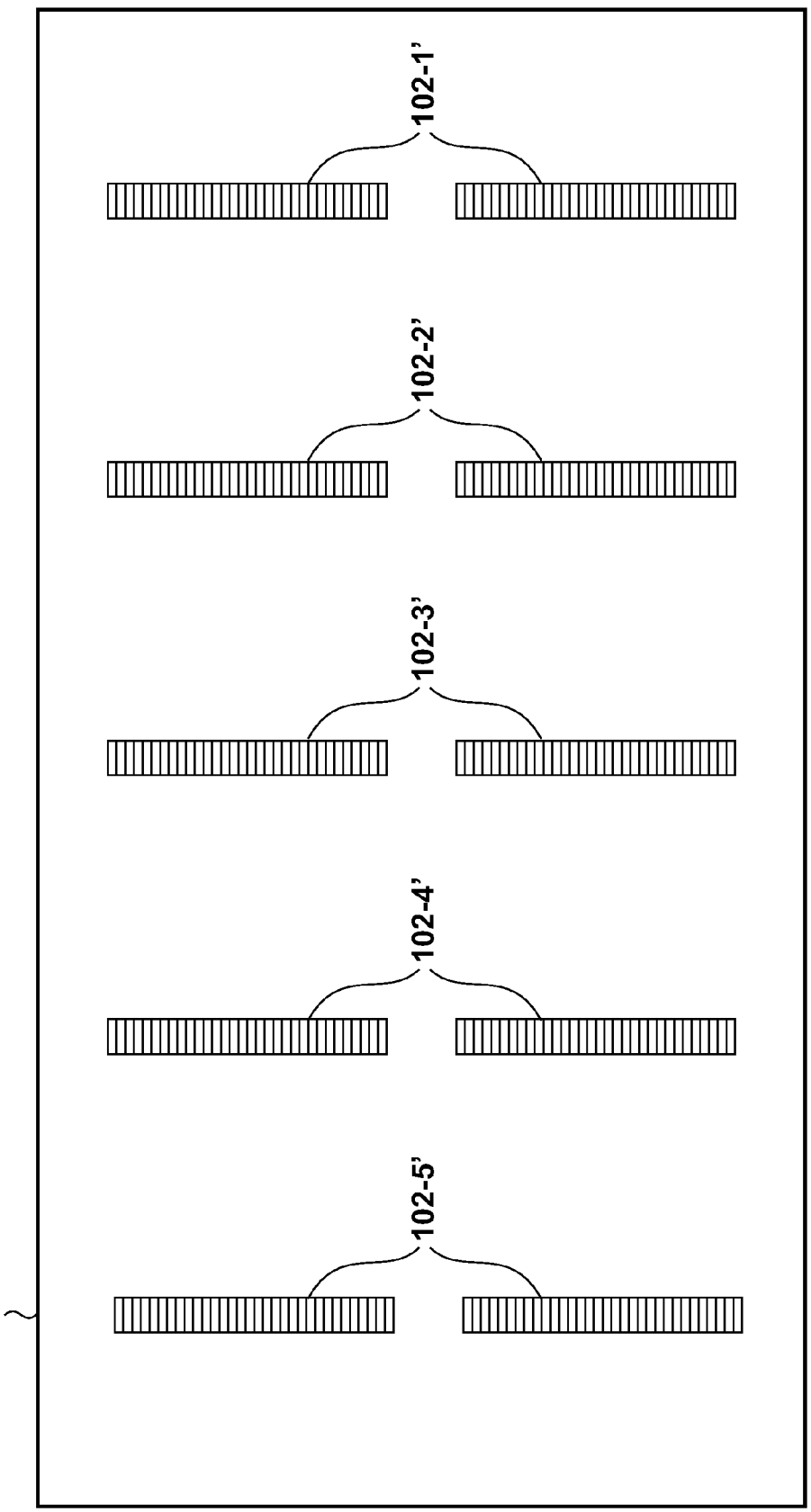
FIG. 24 is a diagram showing an arrangement of line sensors according to an embodiment.

FIG. 24 is a diagram showing an exemplary arrangement of the line sensor pairs in the AF sensor 101. Each of the line sensor pairs 102-1 to 102-5 is constituted by a pair of line sensors, and detects a focusing state based on a phase difference between a pair of signals obtained by the line sensor pair. Each line sensor pair detects a phase difference between two images that are output from the line sensor pair as a result of substantially the same area (AF area) of the object being projected on the line sensor pair by a focus detection optical system such as the secondary imaging lens 309, and can thereby detect the focusing state.

FIG. 25 is a diagram showing an arrangement of the AF frames displayed in a finder and AF visual fields obtained by the line sensor pairs in the AF sensor 101. In the fifth embodiment, a total of five AF frames are provided, and the line sensor pairs 102-1 to 102-5 correspond to an AF frame 1 to an AF frame 5, respectively.

Figure 23:
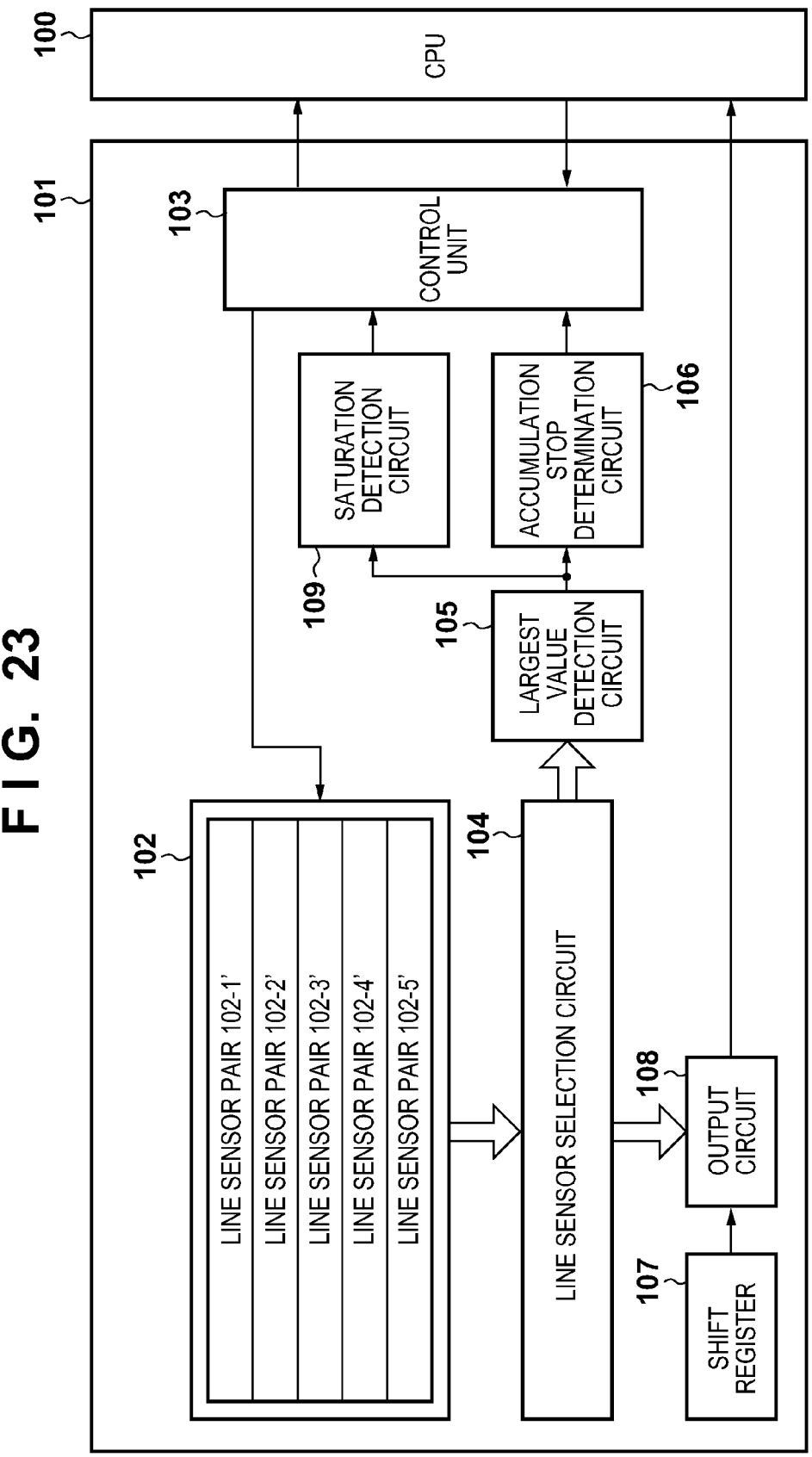
FIG. 23 is a block diagram showing a detailed circuit configuration of an AF sensor according to an embodiment of the present invention.

Next, a specific circuit configuration of the AF sensor 101 will be described with reference to the block diagram in FIG. 23. A control unit 103 is connected to the CPU 100, and controls each block in the AF sensor 101 based on a communication command from the CPU 100. The control unit 103 also has a plurality of flag registers, setting registers, storage circuits, and timers (not shown) for various kinds of control. Further, the control unit 103 transmits accumulation stop information, accumulation time information, and the like of the AF sensor 101 to the CPU 100.

The object image formed by the secondary imaging lens 309 is subjected to photoelectric conversion by the line sensor group 102, which includes the line sensor pairs 102-1' to 102-5', and is accumulated as charge. The accumulated charge is output as voltage by an amplification circuit. A line sensor selection circuit 104 selects one of the plurality of line sensor pairs in the line sensor group 102. The line sensor selection circuit 104 has a function of outputting signals of the selected line sensor pair to an output circuit 108 and a largest value detection circuit 105 that monitors a feature amount (here, largest value) of the signals of the line sensor pair.

The largest value detection circuit 105 outputs a largest value signal (peak signal), which is the largest of the pixel signals of the line sensor pair that was selected by the line sensor selection circuit 104 and is currently monitored, to an accumulation stop determination circuit 106 and a saturation detection circuit 109. The peak signal is one of feature amount signals, each indicating a feature amount of a pixel signal. On the other hand, the pixel signals are output to the CPU 100 one by one from the output circuit 108 by driving the shift register 107.

FIG. 26 is a diagram showing a relationship between the signal amount of the peak signal, which is an output signal from the largest value detection circuit 105, the accumulation time, accumulation stop determination, and saturation detection. Accumulation time 0 is an accumulation start timing, and the peak signal increases with the lapse of time. The accumulation stop determination circuit 106 compares the peak signal with an accumulation stop level Vref. The accumulation stop level Vref is set such that the signal level of the line sensor pair which is currently monitored does not exceed an input/output permissible range of the respective units such as a photoelectric conversion unit of the line sensor pair, an amplifier (not shown), and the output circuit. When the peak signal exceeds the accumulation stop level Vref, the accumulation stop determination circuit 106 outputs an accumulation stop determination signal to the control unit 103.

A contrast detection circuit may be configured that detects a contrast (difference signal) of the object as a feature amount using a smallest value detection circuit (not shown) for signals of the line sensor pairs, the largest value detection circuit 105, and a subtraction circuit (not shown). In this case, the accumulation stop determination may be performed using a contrast signal obtained therefrom. In this case as well, comparison with a predetermined accumulation stop level is performed in the accumulation stop determination circuit 106. The accumulation stop level is set such that a signal that has been amplified by the output circuit 108 does not exceed an input permissible range of the CPU 100, for example. The accumulation stop determination may be performed by detecting both the peak signal and the contrast signal as feature amount signals.

The control unit 103 outputs an accumulation stop signal to the line sensor group 102 so as to stop accumulation in the line sensor pair that was selected by the line sensor selection circuit 104 and is currently monitored. Furthermore, the control unit 103 outputs, to the CPU 100, an accumulation end signal and information of the line where accumulation has been finished. If the peak signal does not reach a target value within a predetermined time period (longest accumulation time), the CPU 100 transmits an accumulation stop command to the AF sensor 101 so as to forcibly stop accumulation, and the control unit 103 outputs the accumulation stop signal to the line sensor group 102.

If it is detected that the peak signal is at or above a saturation detection level, the saturation detection circuit 109 outputs a saturation detection signal to the control unit 103. The saturation detection level is set higher than the accumulation stop level such that the signal level of the line sensor pair can be detected when the signal level may possibly exceed the input/output permissible ranges of at least one of the photoelectric conversion units of the line sensor pair, the amplifier (not shown), the output circuit, and the like. If saturation is detected, the operation of the AF sensor 101 is controlled by the control unit 103 based on the later-described flowchart.

As described above, the pixel signal accumulated in the line sensor group 102 is output to the output circuit 108 via the line sensor selection circuit 104. A control command for reading out the pixels is transmitted from the CPU 100, and the pixel signal of each pixel is output from the output circuit 108 to the A/D converter (not shown) of the CPU 100 by driving the shift register 107. At this time, processing for extracting a contrast component from the pixel signal and amplifying this signal and the like is performed in the output circuit 108.

Figure 27A:
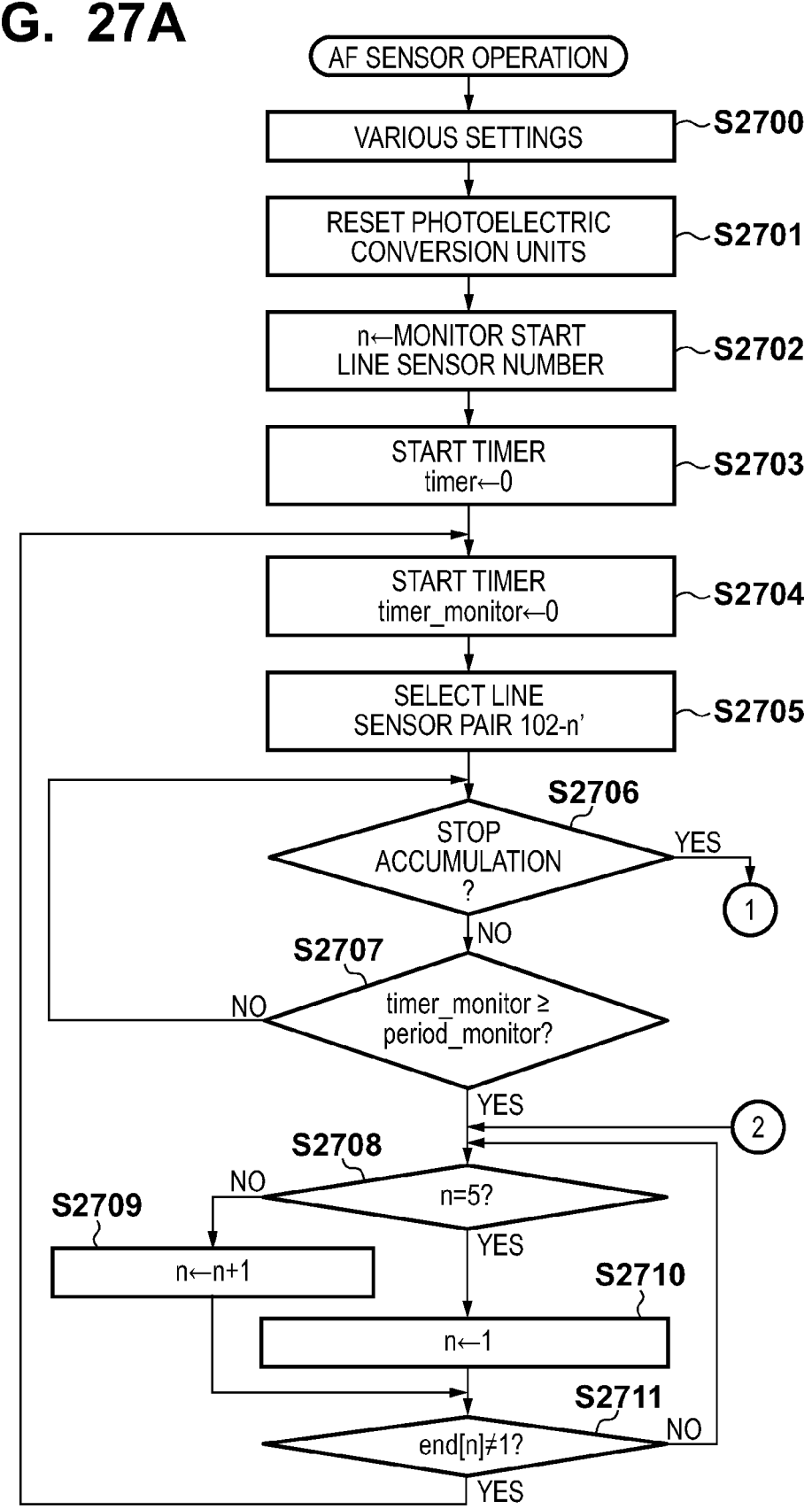
FIGS. 27A and 27B are flowcharts of an AF sensor operation according to a fifth embodiment.

The operation of the focus detection apparatus that is configured as described above will be described in detail based on the flowchart in FIGS. 27A and 27B, as well as FIGS. 28 and 29. It is assumed here that only an object image projected on the line sensor pair 102-3' is bright, and object images projected on the line sensor pairs other than the line sensor pair 102-3' are sufficiently dark. It is also assumed that the accumulation is permitted in all line sensors (line sensor pairs 102-1' to 102-5').

Steps S2700 to S2703 are operations from an initial setting operation and a circuit reset operation of the AF sensor 101 up to accumulation start. In step S2700, various settings in the AF sensor 101 are performed based on a command from the CPU 100. Note that the settings performed here include a setting regarding whether or not to permit accumulation in each line sensor pair.

In step S2701, charge in the photoelectric conversion units of all line sensor pairs is reset, and charge accumulation is started. Here, the photoelectric conversion unit of the line sensor pair **102-*n'* (n=1 to 5) regarding which accumulation permission has not been set in step S2700** remains fixed to a reset potential even after the accumulation is started, and a corresponding accumulation end flag "end[n]" (n=1 to 5) is set to 1. Note that the accumulation end flag "end[n]" (n=1 to 5) will be described later.

In step S2702, among the line sensor pairs regarding which accumulation permission has been set in step S2700, the line sensor pair having the smallest line sensor number is set as the monitoring start line sensor. It is assumed here that the accumulation is permitted in all line sensor pairs, and the monitoring is started from the line sensor pair 102-1' by setting n=1. When the monitoring is started, a timer "timer" contained in the control unit 103 is reset and then clocking is started in step S2703, and measurement of the elapsed time of the charge accumulation is started.

Steps S2704 to S2711 are a circulative monitoring operation in which the monitoring is performed while the line sensor pairs are circulated through and selected in a predetermined cycle. In step S2704, clocking is started after resetting a timer "timer_monitor" that is contained in the control unit 103 to start measurement of elapsed time of the monitoring period. In step S2705, any line sensor pair **102-*n'* (n=1 to 5) is selected by the line sensor selection circuit 104, and the signal of the line sensor pair 102-*n'* that is currently monitored is output to the largest value detection circuit 105**.

In step S2706, the accumulation stop determination circuit 106 performs accumulation stop determination based on the peak signal of the currently-monitored line sensor pair **102-*n'* that is output from the largest value detection circuit 105. In step S2707, the value of the timer "timer_monitor" is compared with a monitoring cycle time "period_monitor" of one line sensor pair, and it is determined whether or not the monitoring period has reached the monitoring cycle time. Steps S2706 and S2707 are repeated, and if it is determined to stop accumulation before the monitoring period reaches the monitoring cycle time, the processing proceeds to step S2712 in FIG. 27B. If the monitoring period has reached the monitoring cycle time while it has not been determined to stop accumulation, the monitoring period is terminated, the processing proceeds to step S2708** and advances to an operation of determining the line sensor pair to be monitored next.

In steps S2708 to S2711, the line sensor pair to be monitored next is determined. In step S2708, it is determined whether or not n is its largest value (here, 5). If n is its largest value, n is initialized to 1 in step S2701, and if not, n is incremented in step S2709. In step S2711, it is determined whether or not the line sensor pair that is the next monitoring target candidate has ended the accumulation, based on the accumulation end flag "end[n]" of this line sensor pair. If the accumulation end flag is set such that end[n]=1, the accumulation in this line sensor pair has ended.

If the accumulation has been finished, the processing returns to step S2708, and the determination regarding the next line sensor pair is performed. On the other hand, if the accumulation has not ended, the processing returns to step S2704, and the monitoring operation for this line sensor pair is started.

An example of the monitoring operation in above-described steps S2704 to S2711 will be described in detail using FIG. 28. In the first monitoring circulation, steps S2704 to S2711 are repeated while it is not determined to stop accumulation in any of the line sensor pairs, and each of the line sensor pairs 102-1' to 102-5' is sequentially monitored for the monitoring cycle time "period_monitor". In FIG. 28, the solid line portion of the line sensor peak signal indicates the time period during which the line sensor pair 102-3' is selected and monitored, and the broken line portion thereof indicates the time period during which a line sensor pair other than the line sensor pair 102-3' is selected and monitored. After the monitoring of the line sensor pair 102-5' ends, the line sensor pair 102-1' is monitored again.

Figure 27B:
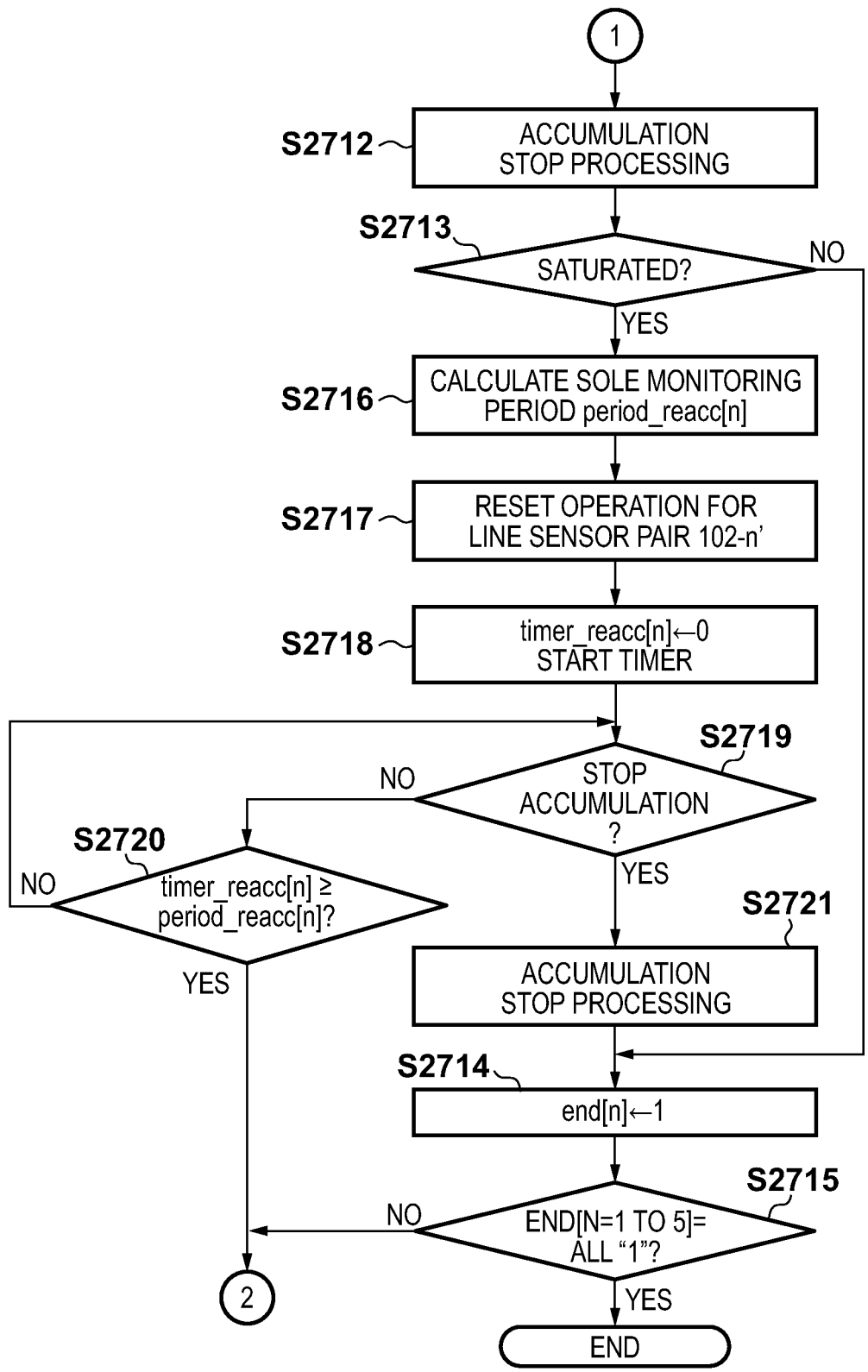

Returning to FIG. 27A, if it is determined in step S2706 to stop the accumulation during the monitoring period, the processing proceeds to step S2712 in FIG. 27B, and the accumulation stop processing is performed. In step S2712, accumulation in the line sensor pair **102-*n'* is stopped, the pixel signal thereof is held, and furthermore, the value of the timer "timer" is stored as the accumulation time in the storage unit "time_acc[n]" that is contained in the control unit 103**. If this stop determination is made after reaccumulation, the elapsed time "timer_reacc" since re-reset is stored. Note that "timer_reacc" will be described later.

In step S2713, the saturation detection circuit 109 detects saturation based on the largest value signal (peak signal) of the line sensor pair **102-*n'* that is output from the largest value detection circuit 105. If saturation is detected, the processing proceeds to step S2716, and if not, the processing proceeds to step S2714**.

In step S2714, the accumulation end flag is set such that end[n]=1, and the end of the accumulation in the line sensor pair **102-*n'* is stored. In step S2715, it is determined whether or not the accumulation in all line sensor pairs has been ended. If all accumulation end flags "end[n]" (n=1 to 5) are 1, it is determined that the accumulation in all line sensor pairs has ended, and the AF sensor operation is terminated. On the other hand, if at least one of the accumulation end flags "end[n]" (n=1 to 5) is not 1, it is determined that the line sensor pair that has not finished the accumulation still remains, and the processing proceeds to step S2708** to continue the AF sensor operation.

If saturation is detected in step S2713, the processing proceeds to step S2716, and processing for re-reset and reaccumulation is performed in steps S2716 to S2721 so as to obtain an unsaturated signal. In step S2716, the time period during which only the line sensor pair **102-*n'* is solely monitored is calculated at the time of reaccumulation in the line sensor pair 102-*n'***. Here, the following calculation is performed as exemplary calculation of the sole monitoring period "period_reacc[n]".

$$\text{period\_reacc}[n] = \text{time\_}acc[n] + \alpha,$$

(n=1 to 5)

Here, the sole monitoring period "period_reacc[n]" is obtained by adding an arbitrary redundant time $\alpha$ to the accumulation time "time_acc" at the time when saturation occurred previously.

If the position and luminance of the object are the same as those during accumulation when the saturation occurred, the peak signal of the line sensor n is to reach the accumulation stop level Vref within the sole monitoring period "period_reacc[n]". The redundant time $\alpha$ is added with consideration given to a stop control error. For example, the redundant time $\alpha$ is the monitoring time "period_monitor". Provision of the sole monitoring period "period_reacc[n]" can prevent an increase in the sole monitoring period caused by a decrease in the light amount due to a movement of an object or a change in the luminance in the image projected on the line sensor.

In step S2717, the reset operation only for the line sensor pair **102-*n'* whose saturation has been detected is performed, and in step S2718, the timer "timer_reacc[n]" is started. Then the processing proceeds to step S2719, and the reaccumulation operation for the line sensor pair 102-*n'*** is performed.

Accordingly, the timer "timer_reacc[n]" measures the reaccumulation time in the line sensor pair 102-n'.

In step S2719, accumulation stop determination is performed as in step S2706. If it is not determined to stop the accumulation in the accumulation stop determination circuit 106, the processing proceeds to step S2720. In step S2720, the value of the reaccumulation time "timer_reacc[n]" is compared with the sole monitoring period "period_reacc[n]" that was calculated in step S2711, and it is determined whether the reaccumulation time has reached the sole monitoring period.

Steps S2719 and S2720 are repeated, and if it is determined, before the reaccumulation time reaches the sole monitoring period "period_reacc[n]", to stop accumulation, the processing proceeds to step S2721, and the accumulation stop processing is performed. If the reaccumulation time has reached the sole monitoring period while it has not been determined to stop the accumulation, the processing proceeds to step S2708, and the sole monitoring period is terminated.

In step S2721, the accumulation in the line sensor pair 102-n' is stopped, the pixel signal thereof is held, and the value of the timer "timer_reacc[n]" is stored as the accumulation time in the storage unit "time_acc[n]" that is contained in the control unit 103.

The operation of the AF sensor including the reaccumulation operation in steps S2704 to S2721 will be described in detail using FIGS. 28 and 29. In FIG. 28, the second monitoring circulation is started, and the line sensor pairs 102-1' to 102-3' are sequentially monitored again. In the second circulation for the line sensor pair 102-3', since the peak signal of the line sensor pair 102-3' has reached the accumulation stop level Vref, the accumulation stop processing is performed (step S2712).

Next, since the peak signal of the line sensor pair 102-3' is at or above the saturation detection level Vsat, it is determined that the peak signal is saturated (YES in step S2713). Next, the sole monitoring period "period_reacc[3]" is calculated (step S2716). Thereafter, the reaccumulation operation for the line sensor pair 102-3' is performed (steps S2717, S2718).

The sole monitoring period during which only the line sensor pair 102-3' is monitored is the time period after the reaccumulation operation (steps S2719, S2720). In FIG. 28, the accumulation stop processing (step S2721) is performed during this time period, and the accumulation end flag is set such that end[n]=1.

Figure 29:
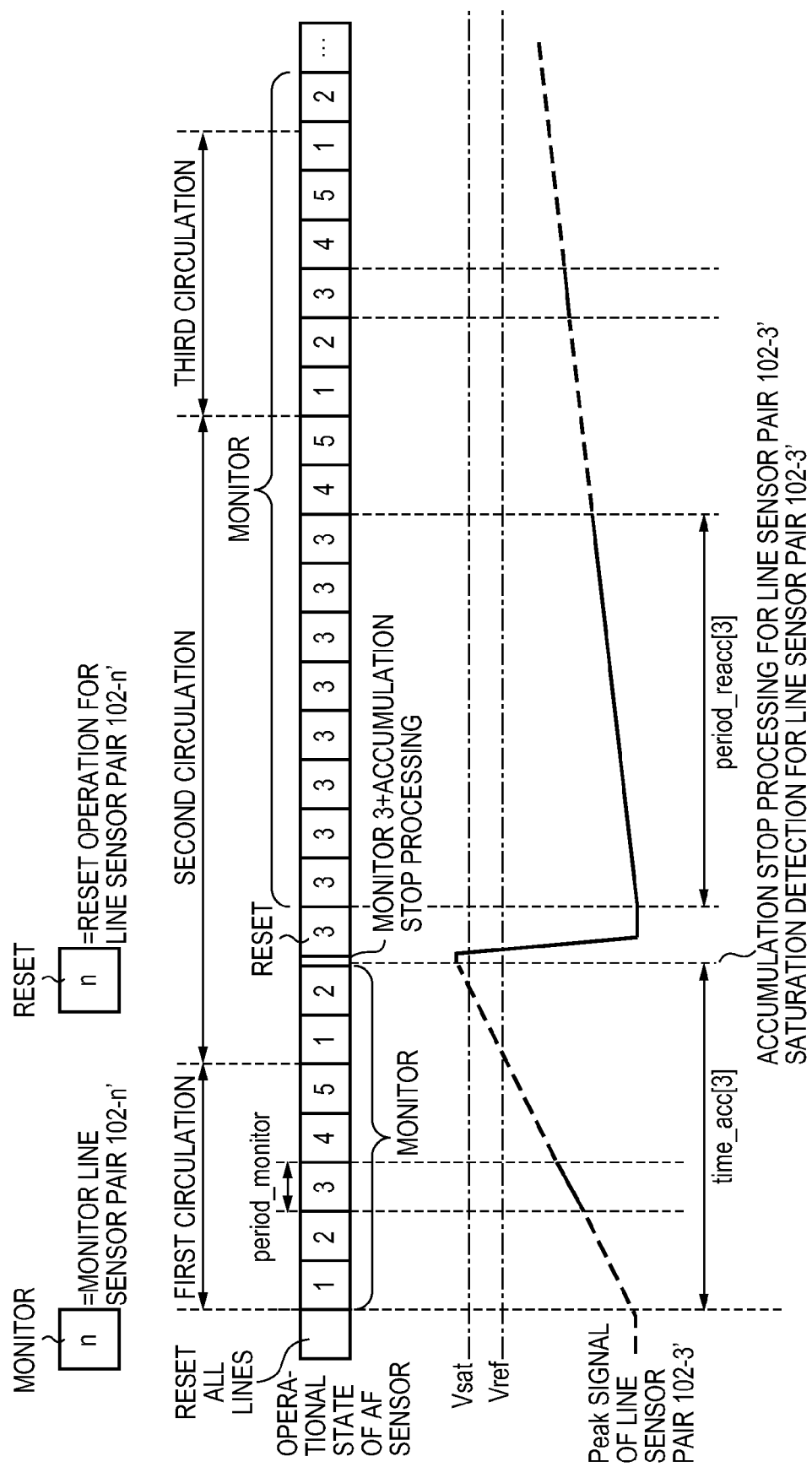
FIG. 29 is a time chart for illustrating exemplary sole monitoring processing according to the fifth embodiment in the case where the object luminance varies.

FIG. 29 shows the case where it is not determined to stop the accumulation during the sole monitoring period, due to a movement of the object or a change in the luminance. As shown in FIG. 29, if it is not determined to stop the accumulation during the sole monitoring period, the monitoring of the line sensor pair 102-3' is continued until the sole monitoring period ends, and the processing advances to the regular circulative operation. At this time, the accumulation end flag is not set such that end[n]=1, and accordingly the circulative operation is performed so as to also cover the line sensor pair 102-3'.

These operations are repeated, and if the accumulation end flags "end[n]" (n=1 to 5) of all line sensor pairs become 1, the AF sensor operation is terminated. The CPU 100 reads out the signals of the line sensor pairs when necessary, and the focus detection calculation is performed using these signals.

Note that, although not clearly shown in the drawings, if a forcible accumulation stop command is transmitted from the CPU 100, in step S2706 the processing forcibly proceeds to step S2712, and the stop processing is performed. In step S2713, the processing forcibly proceeds to step S2714, and the accumulation end flag is set such that end[n]=1. Note that also in the case where a forcible accumulation stop command is transmitted from the CPU 100 during the sole monitoring period, the processing forcibly proceeds from step S2719 to step S2721, and the stop processing is performed.

As described above, according to the fifth embodiment, only the saturated line sensor pair is re-reset and performs reaccumulation, and furthermore, the sole monitoring period during which only this line sensor pair is monitored is provided to perform accumulation control. As a result, the accumulation can be performed such that the accumulation in a plurality of line sensor pairs on which a dark object is projected is performed in parallel, without saturating the signal of the line sensor pair on which an object having a super-high luminance is projected. With the signals obtained as described above, the focusing state in the case where an object having a wide luminance range is projected on a plurality of AF frames can be detected.

Sixth Embodiment

Next, a sixth embodiment of the present invention will be described. Note that the camera configuration according to the sixth embodiment is the same as that described in the fifth embodiment with reference to FIGS. 23 to 25, and accordingly the description thereof will be omitted here. An operation flow of the focus detection apparatus according to the sixth embodiment of the present invention will now be described with reference to FIGS. 30A and 30B. Note that the description will be omitted as appropriate by providing the same step numbers to the processes that are the same as the above-described processes in FIGS. 27A and 27B.

In steps S2700 to S2711, processing for sequentially monitoring the line sensor pairs 102-1' to 102-5' is performed as in the processing described with reference to FIGS. 27A and 27B. If it is determined in step S2711 in FIG. 30B that the accumulation end flag of the line sensor pair that is the next monitoring target candidate is not set such that end[n]=1, the processing proceeds to step S3012. In step S3012, it is determined whether or not the next monitoring target candidate line sensor is waiting for reaccumulation after saturation is detected, based on a saturation flag "sat[n]", which will be described later. If the saturation flag is set such that sat[n]=1, this line sensor pair is waiting for reaccumulation. If the line sensor is not waiting for reaccumulation, the processing returns to step S2704, and the circulative monitoring operation is continued.

On the other hand, if sat[n]=1 and the line sensor pair 102-n' is waiting for reaccumulation, the processing proceeds to step S3020, and it is determined whether or not the current time is a reaccumulation timing. In step S3020, the time indicated by "timer" that was started in step S2703 is compared with the reaccumulation timing "time_restart" that is calculated in step S3019, which will be described later.

If timer<time_restart, the processing returns to step S2708, and it is further determined whether or not the next line sensor pair is the monitoring target. Note that the reaccumulation timing and the reaccumulation operation performed in steps S3021 to S3027 will be described later.

On the other hand, the processing in steps S2712 to S2715 that are performed after it is determined in step S2706 to stop the accumulation is the same as that in FIG. 27B. In step S2713, if saturation is detected by the saturation detection circuit 109, the processing proceeds to step S3017.

In step S3017, the saturation flag is set such that sat[n]=1, saturation of the line sensor pair 102-n' is stored, and the processing proceeds to step S3018. In step S3018, the time period during which only the line sensor pair 102-n' is solely monitored is calculated at the time of reaccumulation in the line sensor pair 102-n', as in step S2716. In step S3019, a timing "time_restart[n]" at which re-reset and reaccumulation are performed for the line sensor pair 102-n' is determined.

The reaccumulation timing "time_restart[n]" will now be described. In the fifth embodiment, the re-reset and reaccumulation operation for the saturated line sensor is performed immediately after the saturation is detected. In this case, the monitoring operation for the other line sensor pairs is not performed during the sole monitoring period, and these line sensor pairs may possibly be saturated. As a result, the accumulation is performed in the line sensor pairs one by one in this operation, and the operation responsiveness of the AF sensor may possibly deteriorate in some cases.

Figure 31:
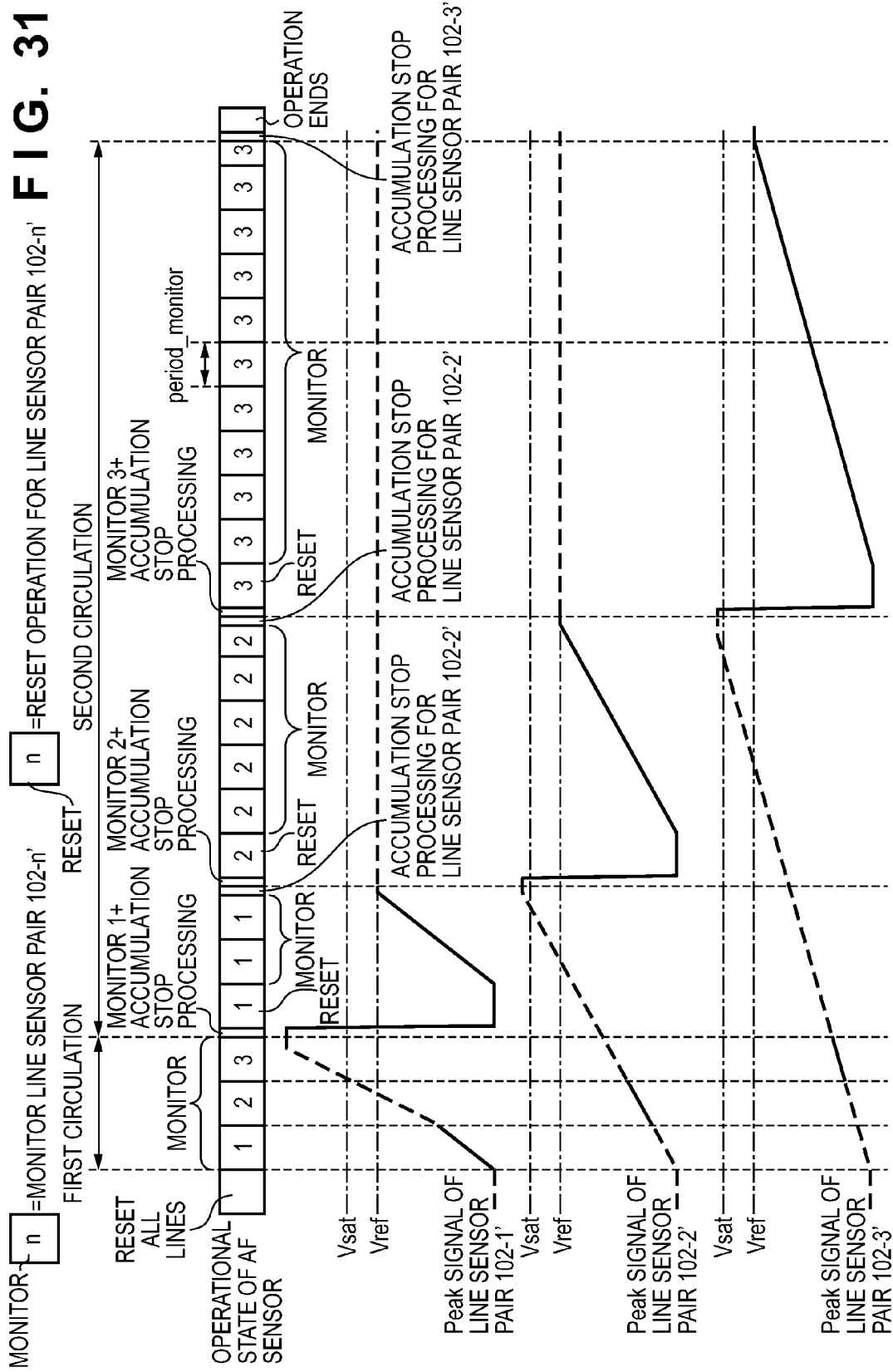
FIG. 31 is a time chart for illustrating a problem in the sole monitoring processing according to the fifth embodiment.

FIG. 31 shows a specific example for illustrating the aforementioned problem that may possibly arise due to the processing described in the fifth embodiment. It is assumed here that the accumulation in the line sensor pairs 102-1' to 102-3' is permitted.

In the second monitoring circulation, saturation of the line sensor pair 102-1' is detected, and immediately the re-reset and reaccumulation operation for the line sensor pair 102-1' is performed. In the example shown in FIG. 31, the line sensor pair 102-2' is saturated during the sole monitoring period for the line sensor pair 102-1'. Here, in the case where the re-reset and reaccumulation operation for the line sensor pair 102-2' is performed after the reaccumulation in the line sensor pair 102-1' ends in accordance with the flowchart in FIG. 27B, the line sensor pair 102-3' will further be saturated during the sole monitoring period for the line sensor pair 102-2'. In this example, the operation in which the signal level of the line sensor pair 102-3' reaches or exceeds the accumulation stop level Vref is performed twice until the operation of the AF sensor 101 ends, which wastes time.

Accordingly, in the sixth embodiment, reaccumulation control is not immediately performed on the line sensor pair whose saturation was detected, and this line sensor pair is caused to wait. Thereafter, control is performed such that the re-reset and reaccumulation operation for the saturated line sensor pair is performed at a timing at which the other line sensor pairs are not saturated during the sole monitoring period for the saturated line sensor pair, and the operation of the AF sensor can thereby be shortened, as compared with the operation in the fifth embodiment. The specific example of this effect will be described later.

Here, the following calculation is performed as an exemplary calculation of the reaccumulation timing "time_restart[n]" (waiting time) that is obtained in step S3019.

$$\text{time\_restart}[n] = \text{period\_reacc}[n] \times V\text{ref}/(V\text{sat} - V\text{ref})$$

Figure 32A:
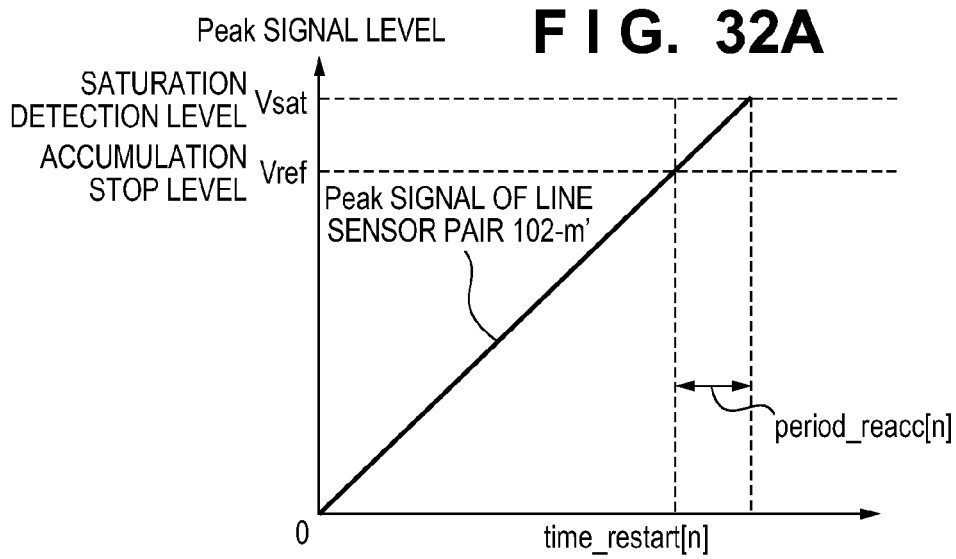
FIGS. 32A to 32C are diagrams for illustrating a reaccumulation start timing according to the sixth embodiment.

The first term of the above equation will now be described using FIGS. 32A to 32C. The relationship of the above equation is shown in FIG. 32A. In this diagram, m≠n. The luminance of the object projected on the line sensor pair 102-m' is the brightness that grows the peak signal of the line sensor pair 102-m' by Vsat-Vref during the sole monitoring period "period_reacc[n]" for the line sensor pair 102-n'.

Figure 32B:
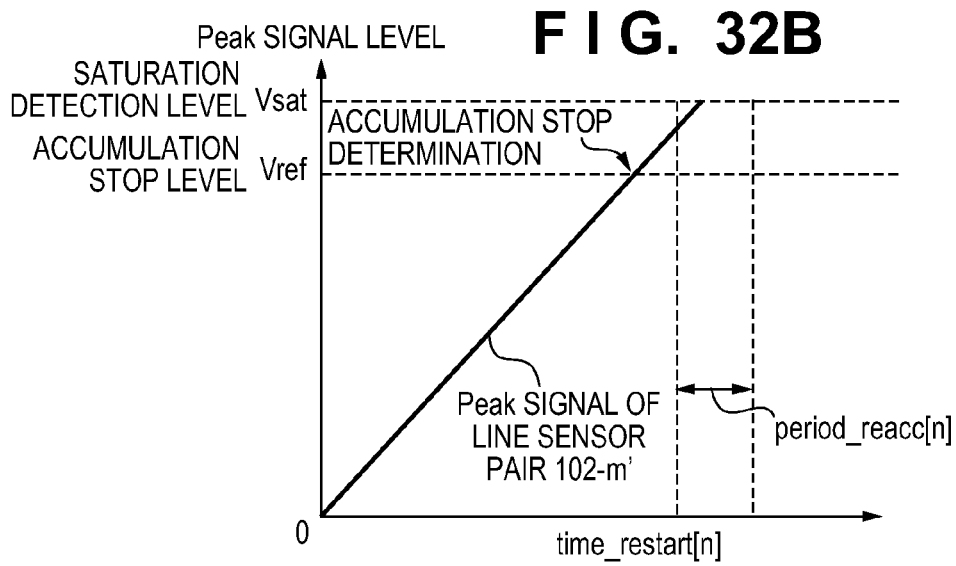

As shown in FIG. 32B, if the luminance of the object projected on the line sensor pair 102-m' is higher than the object luminance in FIG. 32A, the accumulation stops by "time_restart[n]", and the line sensor pair 102-m' will not be saturated during the sole monitoring period.

Figure 32C:
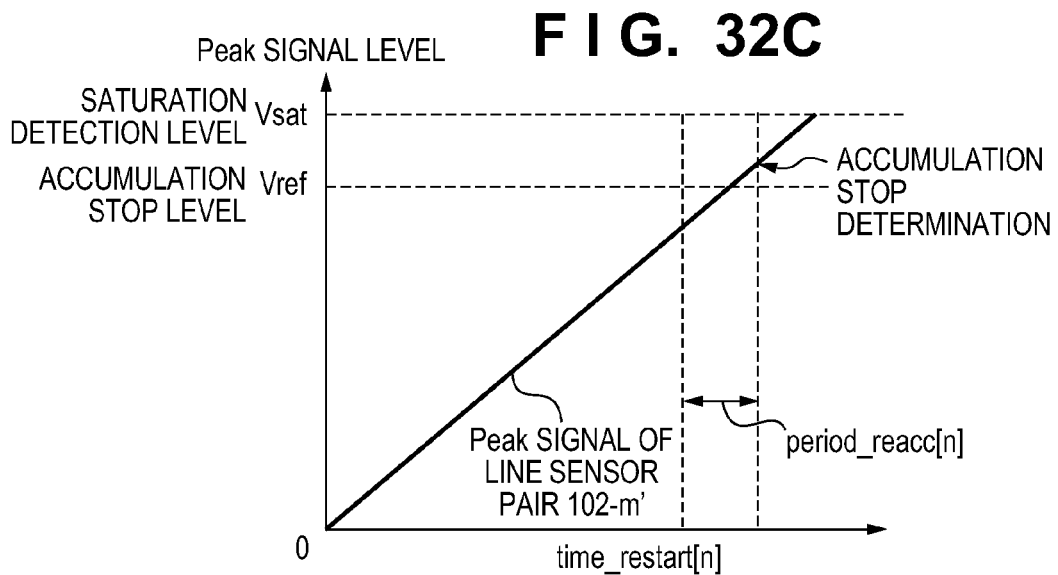

On the contrary, as shown in FIG. 32C, if the luminance of the object projected on the line sensor pair 102-m' is lower than the object luminance in FIG. 32A, the following applies. That is to say, even if monitoring is not performed during the sole monitoring period "period_reacc[n]" for the line sensor pair 102-n', the peak signal thereof will not reach the saturation detection level Vsat, and it is determined to stop the accumulation at an unsaturated signal level at the time of monitoring of the line sensor pair 102-m'.

Here, with consideration given to the monitoring period for a plurality of line sensor pairs, an arbitrary redundant time R is added to the value calculated with the first term of the above equation. For example, the redundant time R is calculated as follows.

$$\beta = \text{period\_monitor} \times L$$

L is the number of the line sensor pairs that have not finished accumulation at the timing of obtaining the reaccumulation timing. That is to say, saturation is prevented not only during the sole monitoring period but also during the monitoring period in the regular circulative operation.

If another line sensor pair (line sensor pair 102-i') is waiting for the reaccumulation at the timing of obtaining the reaccumulation timing, the reaccumulation timing is determined with consideration given also to the sole monitoring period for the line sensor pair 102-i'. This also applies to the case where a plurality of line sensor pairs are waiting for reaccumulation.

In another example of obtaining the reaccumulation timing "time_restart[n]", signal monitoring information of all line sensor pairs excluding the line sensor pair 102-n' can also be used. For example, the degree of the signal level of all line sensor pairs can be checked by performing circulative monitoring on all line sensor pairs while gradually lowering the accumulation stop level Vref at the timing of obtaining the reaccumulation timing. The reaccumulation timing "time_restart[n]" is determined using this information.

After determining the reaccumulation timing "time_restart [n]" for the line sensor pair 102-n' in step S3019, the line sensor pair 102-n' enters a reaccumulation waiting state, then the processing proceeds to step S2708, the next monitoring target line sensor pair is determined, and the circulative monitoring operation is continued.

If, while the circulative monitoring operation is repeated, it is determined in step S3012 that the next monitoring target candidate line sensor pair 102-n' is waiting for the reaccumulation (sat[n]=1), the processing proceeds to step S3020, as described above. It is then determined whether or not the current time is at the reaccumulation timing for this line sensor pair.

If the timer "timer" for indicating the elapsed time indicates that the current time is after the reaccumulation timing "time_restart[n]", the processing proceeds to step S3021 since the reaccumulation timing has been reached, and the reaccumulation operation is executed.

Steps S3021 to S3025 are the reaccumulation operations that are the same as those in steps S2717 to S2721 in FIG. 27B. If it is not determined, during the sole monitoring period, to stop the accumulation (YES in step S3024), the sole monitoring period is terminated, in step S3028 the saturation flag is set such that sat[n]=0, and the processing advances to the regular circulative operation.

On the other hand, if it is determined, during the sole monitoring period, to stop the accumulation (YES in step S3023), the sole monitoring period is ended, and the stop processing in steps S3025 to S3027 is performed. Here, the same processes as those in steps S2721, S2714, and S2715 in FIG. 27B are performed.

Note that although not clearly shown in the flowchart, if it is determined that all line sensor pairs are saturated and waiting for re-reset, or has finished accumulation, the re-reset operation and the reaccumulation operation for the line sensor pairs in a waiting state are performed even in the case where the re-reset timing has not been reached. If a plurality of line sensor pairs are in a waiting state, the re-reset timing for these line sensor pairs is determined based on the signal monitoring information that is obtained from the respective sole monitoring periods or the like.

Further, if a forcible accumulation stop command is transmitted from the CPU 100, in step S2706 the processing forcibly proceeds to step S2712, and the stop processing is performed. In step S2713, the processing forcibly proceeds to step S2714, and the accumulation end flag is set such that end[n]=1. Note that also in the case where a forcible accumulation stop command is transmitted from the CPU 100 during the sole monitoring period, the processing forcibly proceeds from step S3023 to step S3025, and the stop processing is performed.

Figure 30A:
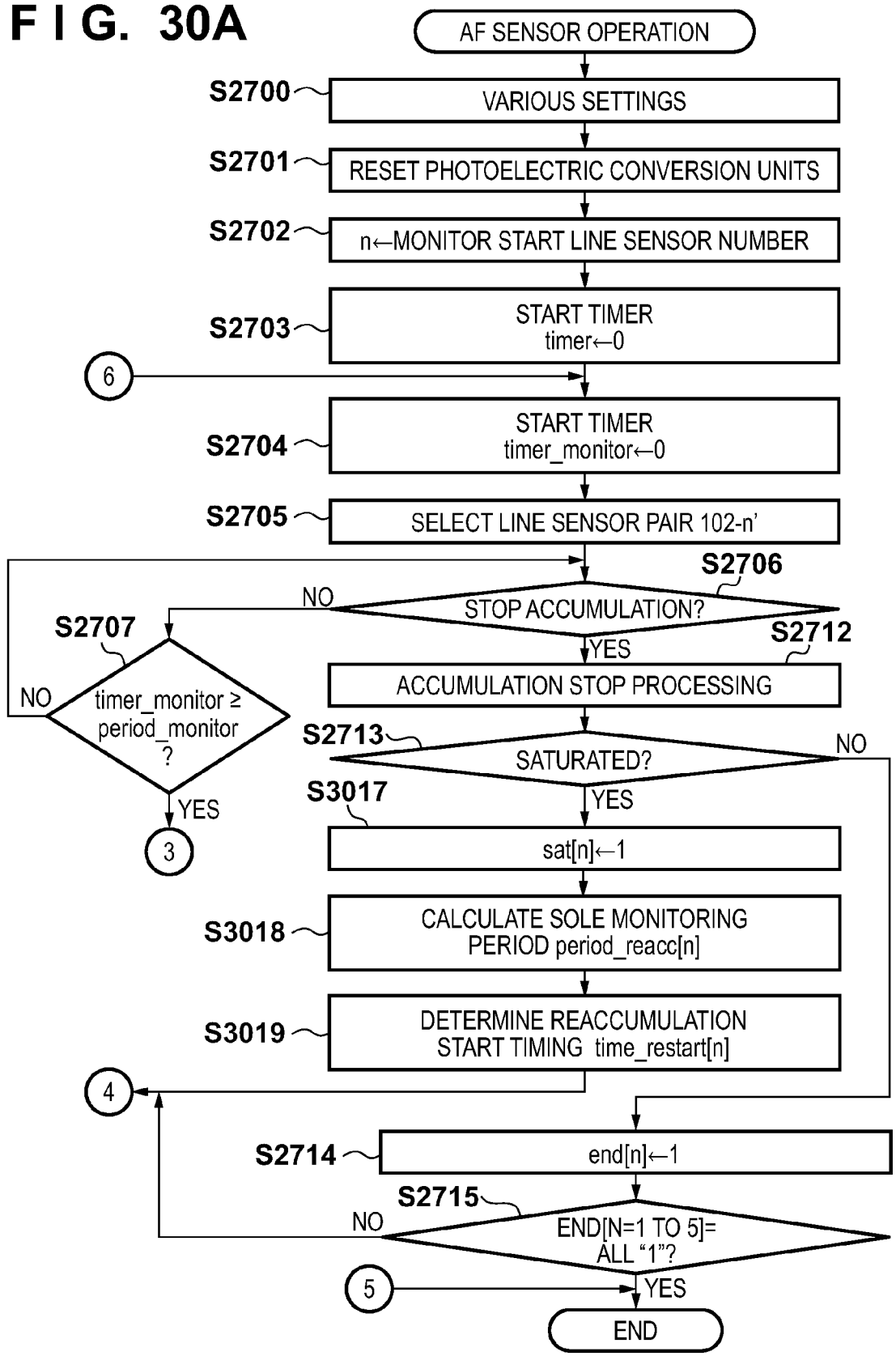
Figure 33:
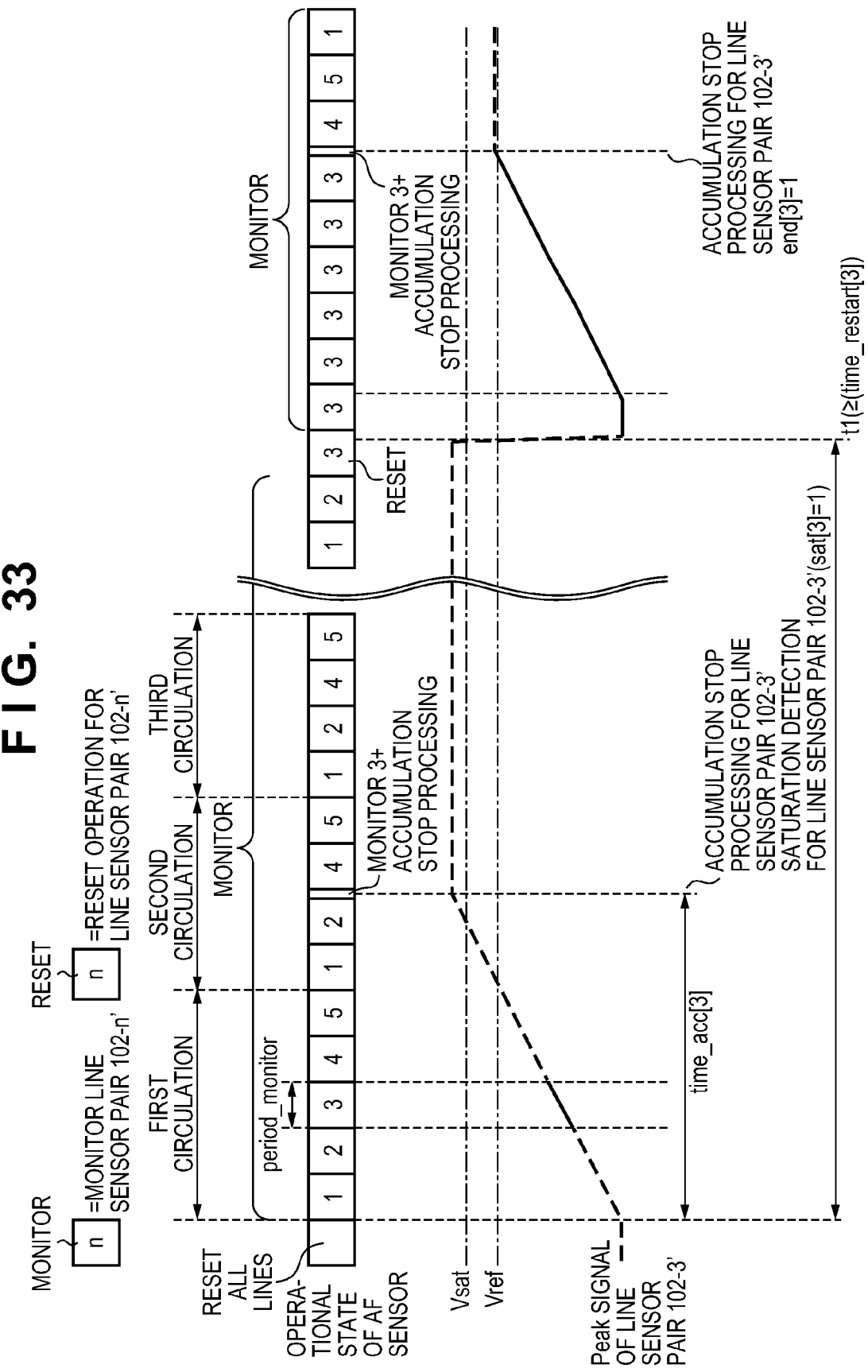
FIG. 33 is a time chart for illustrating exemplary sole monitoring processing according to the sixth embodiment.

An exemplary operation of the AF sensor 101 according to the above-described flowchart in FIGS. 30A and 30B will be described in detail using FIGS. 33 and 34.

It is assumed here that only an object image projected on the line sensor pair 102-3' is bright, and object images projected on the line sensor pairs other than the line sensor pair 102-3' are sufficiently dark.

The same processing as that in FIG. 28 is performed until the accumulation stop processing for the line sensor pair 102-3' in the second monitoring circulation. Next, since the peak signal of the line sensor pair 102-3' exceeds the saturation determination level Vsat, it is determined that the peak signal is saturated (step S2713), and the saturation flag is set such that sat[3]=1 (step S3017). Next, the sole monitoring period "period_reacc[3]" is calculated (step S3018). Furthermore, the reaccumulation start timing "time_restart[3]" is determined (step S3019). Thereafter, the line sensor 102-3' enters a reaccumulation waiting state, and the second monitoring circulation is performed for the line sensor pair 102-4' and the line sensor pair 102-5' in accordance with the flowchart in FIGS. 30A and 30B.

In the third and subsequent monitoring circulation, the monitoring operation for the line sensor pair 102-3' is not carried out until the elapsed time reaches the reaccumulation start timing "time_restart[3]". The line sensor pair 102-1', the line sensor pair 102-2', the line sensor pair 102-4', and the line sensor pair 102-5' are circulated and monitored.

After a lapse of time, at the time point t1, which is after the reaccumulation start timing "time_restart[3]" (step S3020), the reaccumulation operation for the line sensor pair 102-3' is performed (steps S3021, S3022). The sole monitoring period in which only the line sensor pair 102-3' is monitored starts after the reaccumulation operation (steps S3023, S3024). In FIG. 33, the accumulation stop processing is performed during this time period, and the accumulation end flag is set such that end[n]=1 (steps S3025, S3026).

Figure 34:
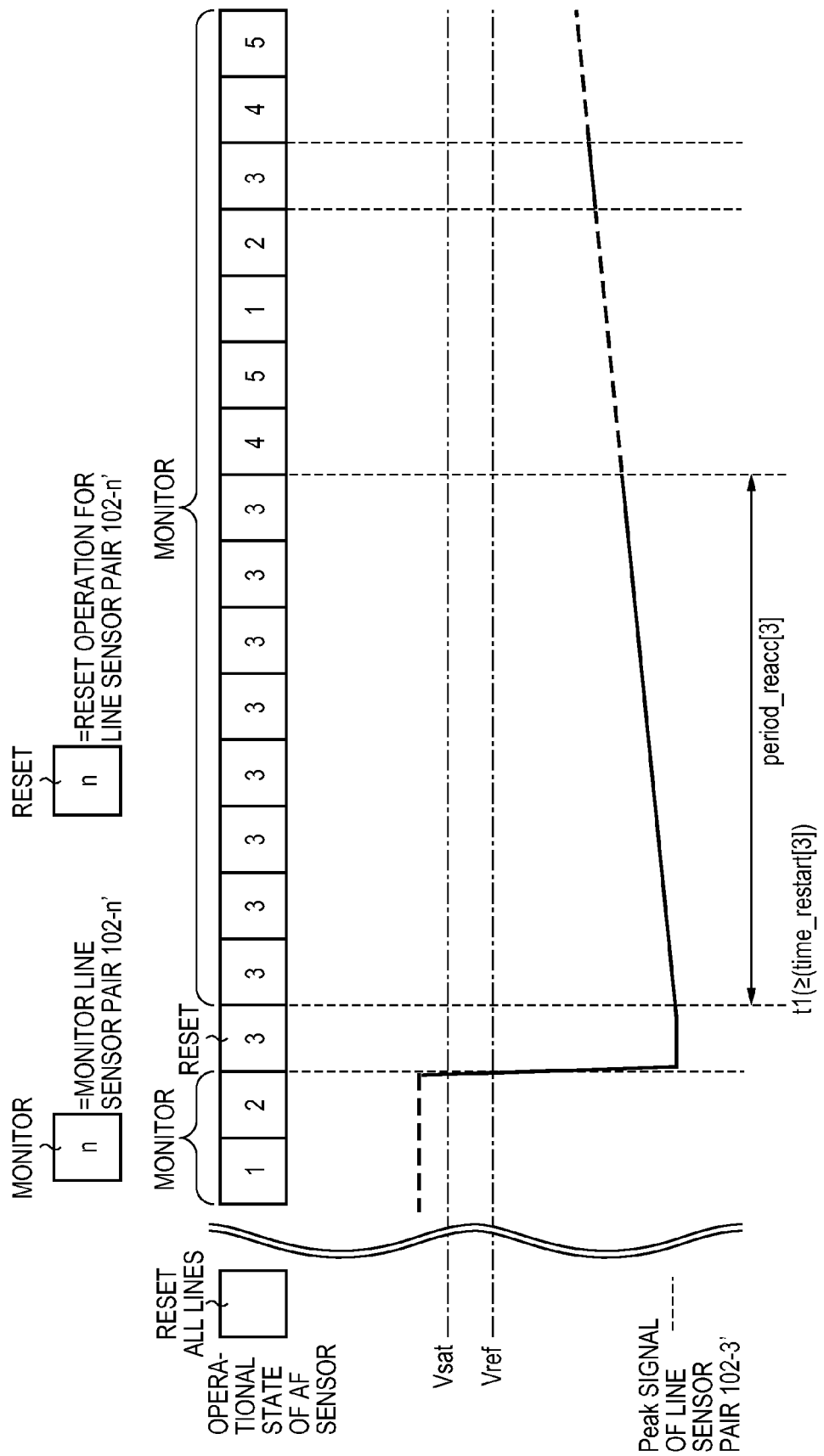
FIG. 34 is a time chart for illustrating exemplary sole monitoring processing according to the sixth embodiment in the case where the object luminance varies.

FIG. 34 shows the case where it is not determined to stop the accumulation during the sole monitoring period, due to a movement of the object or a change in the luminance. As shown in FIG. 34, if it is not determined to stop accumulation during the sole monitoring period, the sole monitoring period is terminated, and the processing advances to the regular circulative operation. At this time, the accumulation end flag end[n]=1 is not set, and accordingly the circulative operation is performed so as to cover the line sensor pair 102-3'.

These operations are repeated, and if the accumulation end flags "end[n]" (n=1 to 5) of all line sensor pairs become 1, the AF sensor operation is terminated. The CPU 100 reads out the signals of the line sensor pairs when necessary, and the focus detection calculation is performed using these signals.

Figure 35:
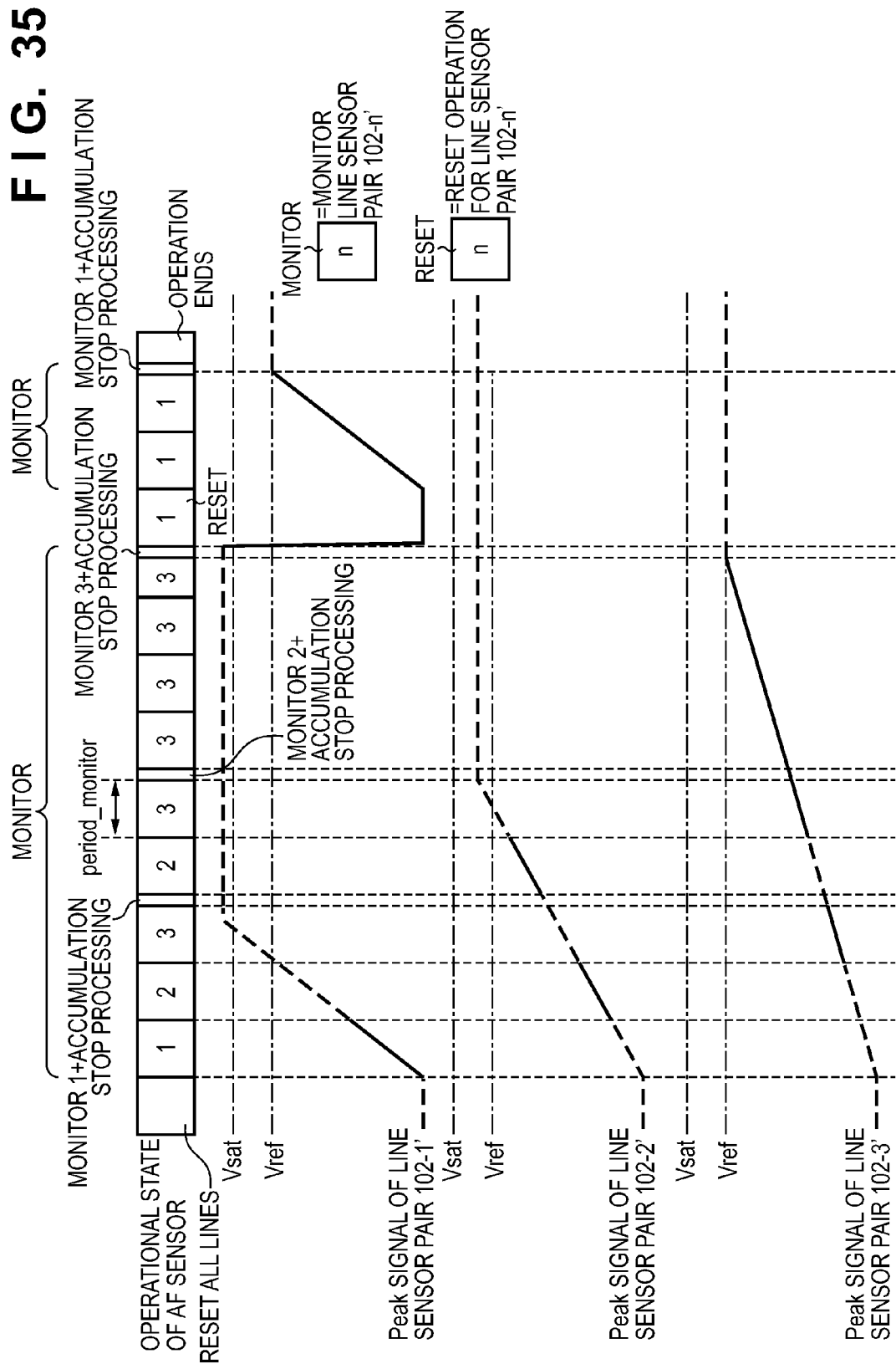
FIG. 35 is a diagram for illustrating an operation time of the AF sensor with respect to a plurality of different object luminances according to the sixth embodiment.

The effect of the operations in the sixth embodiment will now be described using FIG. 35, as compared with the operations in the fifth embodiment. In FIG. 35, a setting is configured so as to permit the accumulation in the line sensor pairs 102-1' to 102-3', as in FIG. 31. The luminances of the object projected on the respective line sensor pairs are also the same as those in FIG. 31.

In FIG. 35, re-reset in the line sensor pair 102-1' as in FIG. 31 is not immediately started, but is waited for. During this waiting period, the line sensor pairs 102-2' and 102-3' are not saturated, and the accumulation stop processing is performed for these line sensor pairs. Thereafter, since the accumulation has stopped in the line sensors other than the line sensor pair 102-1', the re-reset and reaccumulation operation for the line sensor pair 102-1' is performed even though the re-reset timing has not been reached.

The approximate operation time of the AF sensor 101 is the total time of the time taken until the signal level of the line sensor pair 102-3' becomes larger than or equal to the accumulation stop level Vref and the time taken until the signal level of the line sensor pair 102-1' becomes larger than or equal to the accumulation stop level Vref. Thus, the operation time is shortened, as compared with that in the example in FIG. 31.

As described above, according to the sixth embodiment, control is performed such that the re-reset and reaccumulation operation for the saturated line sensor pair is performed at a timing at which other line sensor pairs are not saturated during the sole monitoring period for this saturated line sensor pair. As a result, a signal of the line sensor pair on which an object having a super-high luminance is projected can also be accumulated without being saturated, while the operation responsiveness of the AF sensor is maintained.

Note that although the above embodiments have been described regarding the case of using five line sensor pairs, the number of line sensor pairs is not limited thereto.

Although the above embodiments have been described regarding the configuration in which two line sensors are used and a pair of signals having a phase difference is output, the present invention is not limited thereto. For example, a configuration may be employed in which two images that have passed through different exit pupils are formed on one elongated line sensor.

Seventh Embodiment

Figure 36:
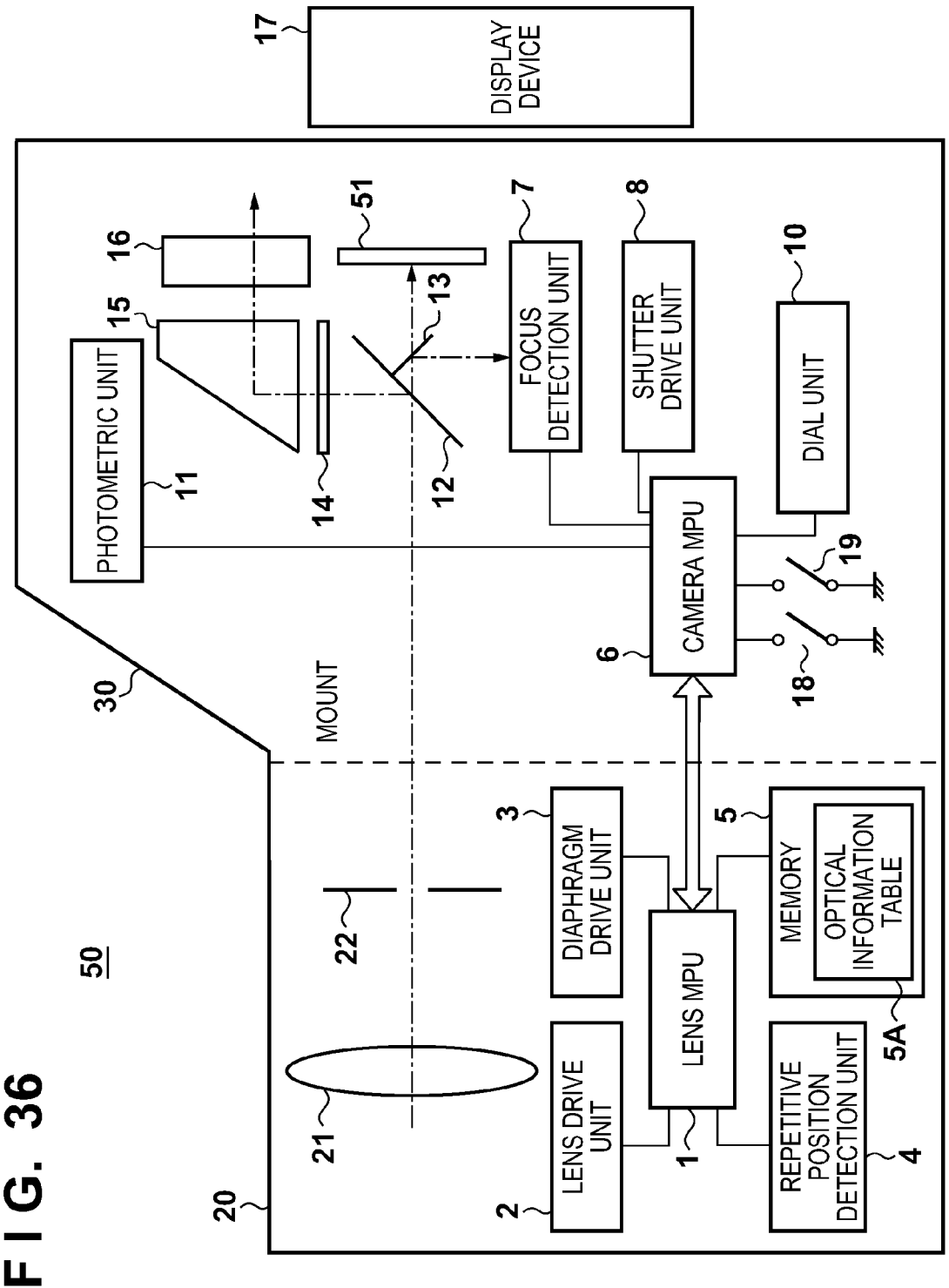
FIG. 36 is a block diagram showing a schematic configuration of an image capturing apparatus according to a seventh embodiment.

Next, a seventh embodiment of the present invention will be described. FIG. 36 is a block diagram showing a schematic configuration of an image capturing apparatus equipped with a focus detection apparatus according to the seventh embodiment of the present invention. The image capturing apparatus in the seventh embodiment is a lens-interchangeable single-lens reflex camera (hereinafter referred to simply as a "camera") 50. The camera 50 is constituted by a camera body 30 and a taking lens unit 20 that is configured to be attachable to and detachable from the camera body 30. The taking lens unit 20 and the camera body 30 are connected to each other via a mount shown by a dotted line in FIG. 36. Note that the present embodiment is not limited to the lens-interchangeable camera and also applicable to a camera in which a lens unit is integrated with the camera body.

The taking lens unit 20 includes a taking lens 21, a diaphragm 22, a lens microprocessing unit (MPU) 1, a lens drive unit 2, a diaphragm drive unit 3, a repetitive position detection unit 4, and a memory 5. The taking lens 21 and the diaphragm 22 constitute a photographic optical system.

The lens MPU 1 performs all calculation and control related to operations of the taking lens unit 20. The lens drive unit 2 is a drive unit for driving the taking lens 21 in accordance with the control by the lens MPU 1. The diaphragm drive unit 3 is a drive unit for driving the diaphragm 22 in accordance with the control by the lens MPU 1. The repetitive position detection unit 4 is a detection unit for detecting the repetitive position of a lens-barrel. The memory 5 stores an optical information table 5A, which is necessary optical information for automatic focus adjustment.

The camera body 30 includes a camera MPU 6, a focus detection unit 7, a shutter drive unit 8, a dial unit 10, a photometric unit 11, a main mirror 12, a sub-mirror 13, a focusing plate 14, a pentamirror 15, a finder 16, a display device 17, an image sensor 51, a switch SW1_18, and a switch SW2_19.

The camera MPU 6 performs all calculation and control related to operations of the camera body 30. The camera MPU 6 is connected to the lens MPU 1 via a signal line in the mount to acquire lens position information from the lens MPU 1, drive the lens, and acquire optical information unique to movement of lens and to attached interchangeable lens.

The camera MPU 6 also contains a ROM (not shown) that stores a program for controlling the operation of the camera body 30, a RAM (not shown) that stores variables, and an EEPROM (Electronically Erasable Programmable Read Only Memory) that stores various parameters. Focus detection processing, which will be described later, is executed by the program stored in the ROM.

The focus detection unit 7 includes a focus detection sensor, which will be described later, and performs focus detection with the phase difference detection method. The focus detection unit 7 notifies the camera MPU 6 of completion of reading of a signal from the focus detection sensor. The shutter drive unit 8 is a drive unit for driving a shutter (not shown). The dial unit 10 is an operation unit for changing various settings of the camera 50, and can switch the continuous photographic speed, the shutter speed, the f-number, and the photographic mode, for example, as a result of the user operating the dial unit 10.

The photometric unit 11 includes a photometric sensor, and performs photometric processing via the photometric sensor (not shown) based on light beams from the pentamirror 15, in accordance with a half-pressing operation on a release button (not shown). The photometric sensor is constituted by a photoelectric conversion element such as a photodiode, a circuit for processing a signal thereof, and the like, and outputs a signal related to the luminance level of an object, and this output signal is input to the camera MPU 6.

The main mirror 12 has a function of reflecting upward most of the incident light beams that come via the taking lens unit 20, and forming an object image on the focusing plate 14. The object image on the focusing plate 14 is reflected and converted into an upright image by the pentamirror 15, and is guided to the finder 16. Thus, the main mirror 12 functions as an optical finder. Note that a part of the light that is transmitted through the pentamirror 15 is guided to the photometric unit 11. Further, a part of the incident light beams is transmitted through the main mirror 12, and the transmitted light is guided to the focus detection unit 7 via the sub-mirror 13. Then, when the camera 50 is in a photographing state, the main mirror 12 and the sub-mirror 13 withdraw from the optical path, the incident light beams from the object that enter via the taking lens unit 20 is caused to form an image on the image sensor 51, and this image is subjected to photoelectric conversion into an object image signal and is then output.

The display device 17 is constituted by an LCD or the like, and displays information regarding the photographic mode of the camera, a preview image obtained before photographing, a check image after photographing, and the like.

The switch SW1_18 is turned on in response to a first stroke operation (e.g., half-pressing) to the release button (not shown), and the switch SW2_19 is turned on in response to a second stroke operation (e.g., full-pressing) to the release button (not shown).

Next, a schematic configuration of the focus detection apparatus including the focus detection unit 7 will be described using FIG. 37. As described above, a part of the incident light from the taking lens unit 20 is transmitted through the main mirror 12, reflected downward at the sub-mirror 13 that is located in the rear side, and is guided to the focus detection unit 7. The focus detection unit 7 is constituted by a visual field mask 72, an infrared cut filter 73, a field lens 74, a diaphragm 75, a secondary imaging lens 76, a focus detection sensor 77, and a plurality of reflecting mirrors 78a to 78c.

The focus detection sensor 77 for focus detection includes a pair of line sensors, each being constituted by photoelectric conversion elements such as photodiodes, for performing photoelectric conversion on a pair of object images formed by the light beams that have passed through different exit pupil areas in the taking lens unit 20, a circuit for processing a signal of the line sensors, and the like. The focus detection sensor 77 outputs a pixel signal, and the output image signal is input to the camera MPU 6. Hereinafter, the pair of image signals that are output from the pair of line sensors will be referred to as an image A and an image B. The camera MPU 6 also has an abnormal pixel detection unit 61 and a correlation calculation unit 62.

Next, a basic operation in the camera 50 in FIG. 36 will be described using the flowchart shown in FIG. 38. Upon the camera 50 being powered on, the memory content and the initial state of the execution program are detected, and a image sensing preparation operation is executed. In step S11, the camera MPU 6 recognizes that the user has operated a button (not shown) and configured a setting on the camera. In step S12, the camera MPU 6 determines whether or not the switch SW1_18 has been turned on.

If the switch SW1_18 has been turned on, the processing proceeds to step S14. On the other hand, if the switch SW1_18 has not been turned on, the processing proceeds to step S13, and determines whether the power is in an on or off state. If the power is in an off state, the series of image sensing operation is terminated. If the power is in an on state, the processing returns to the operation in step S11. In step S14, the camera MPU 6 performs focus detection processing, which will be described later, in response to the switch SW1_18 being turned on.

After the later-described focus detection processing, in step S15, the camera MPU 6 determines whether or not the switch SW2_19 has been turned on, and if it is determined that the switch SW2_19 has been turned on, in step S16 the image sensing processing is performed. On the other hand, if it is determined that the switch SW2_19 has not been turned on, the processing returns to step S11.

Figure 38:
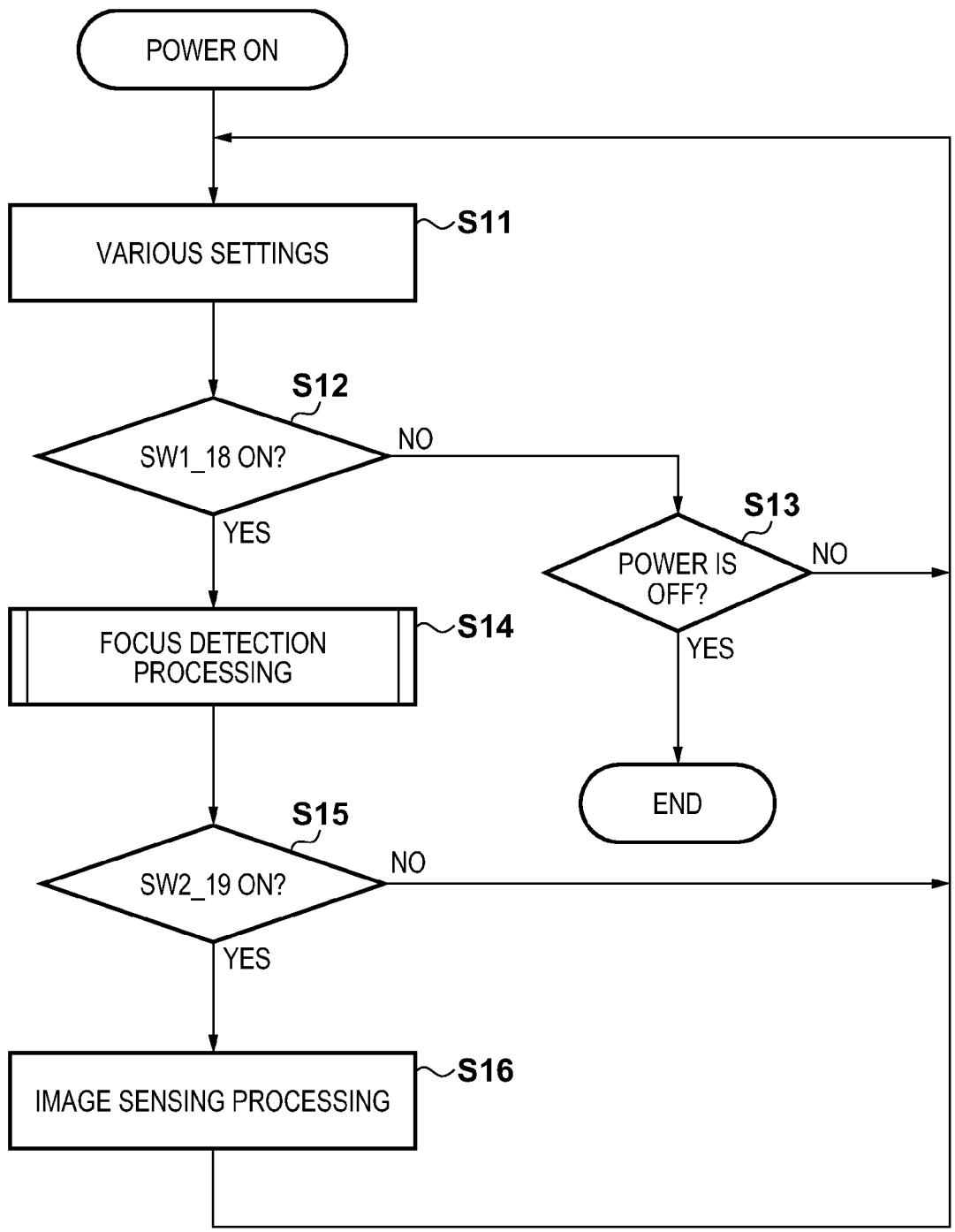
FIG. 38 is a flowchart showing a basic operation of the image capturing apparatus according to an embodiment.
Figure 39:
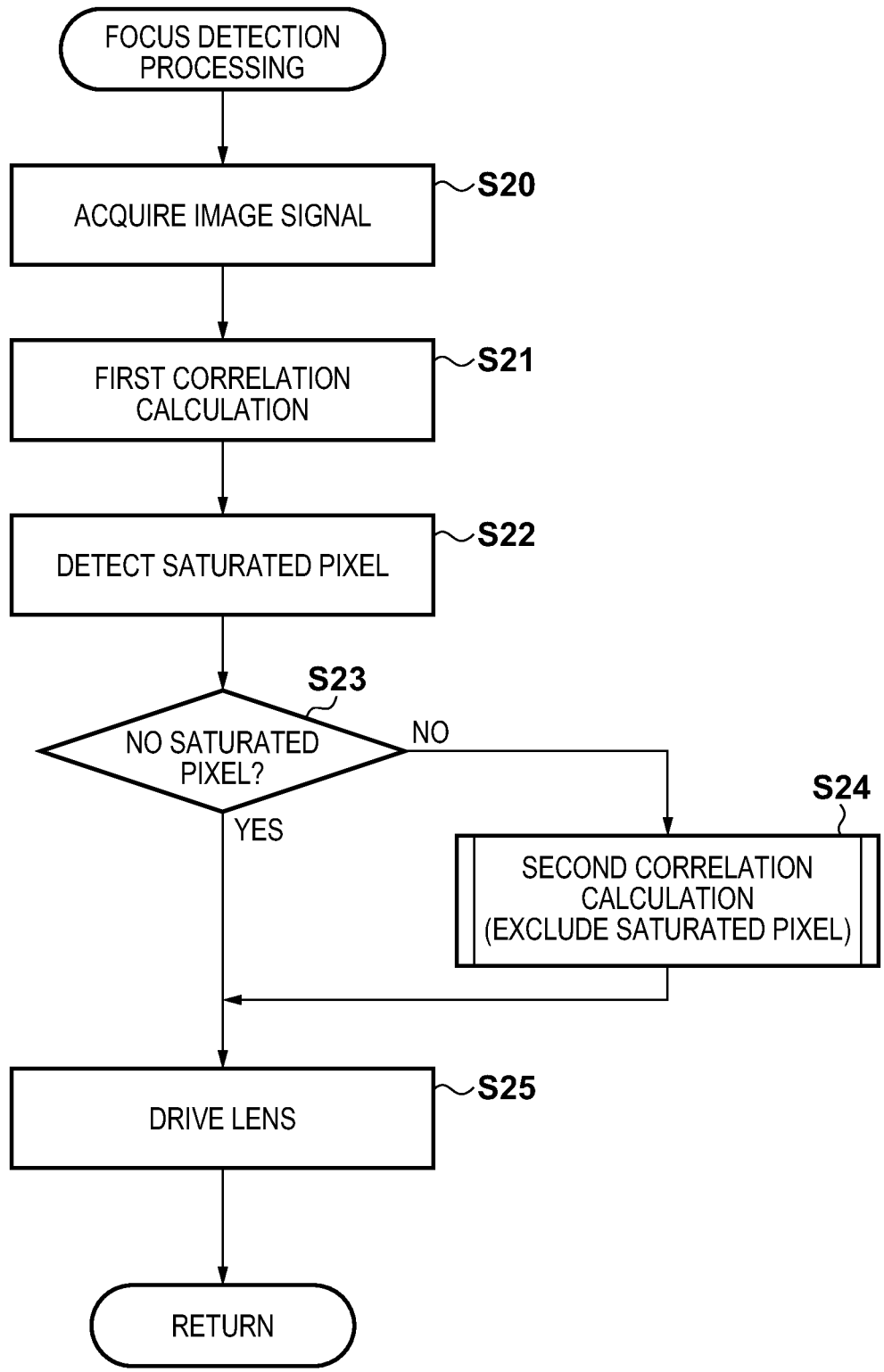
FIG. 39 is a flowchart showing focus detection processing according to an embodiment.

FIG. 39 is a flowchart showing the focus detection processing that is performed in step S14 in FIG. 38 in the seventh embodiment. In step S20, the camera MPU 6 outputs a signal accumulation instruction to the focus detection sensor 77. The focus detection sensor 77 starts a signal accumulation operation based on the instruction. After the accumulation operation ends, the focus detection sensor 77 outputs the image signals obtained by the pair of line sensors as an image A and an image B to the camera MPU 6.

Figure 40:
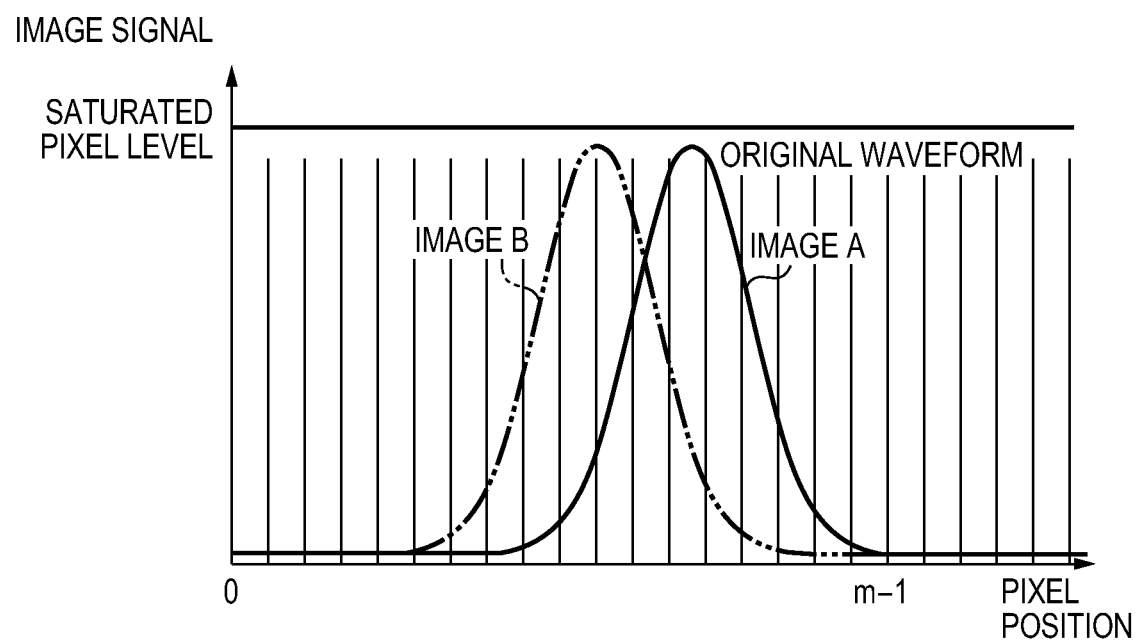
FIG. 40 is a diagram showing an exemplary image signal that has not reached a saturation level.

Exemplary image A and image B that are output in step S20 in FIG. 39 are shown in FIG. 40. The image A and the image B have a phase difference of −2 to −3 bits. Here, the case where the image A is present on the right of the image B is defined as a negative phase difference. Both signal levels of the image A and the image B shown in FIG. 40 do not exceed the saturation level. If a pixel that exceeds the saturation level exists in the image A or the image B, the pixel signal that exceeds the saturation level is clipped at the saturated level and then output.

Next, in step S21, the camera MPU 6 performs first correlation calculation based on the image A and the image B at the correlation calculation unit 62. The first correlation calculation will now be described in detail. Note that in the following description, a waveform obtained by relatively shifting an image signal obtained from the focus detection sensor will be referred to as a "shifted waveform". First, the method for calculating the shifted waveform and the correlation amount of the image A and the image B in the first correlation calculation will be described using FIGS. 41A to 41C.

FIGS. 41A, 41B, and 41C show a shifted waveform when the shift amount is 0, a shifted waveform when the shift amount is −1 bit, and a shifted waveform when the shift amount is −2 bits, respectively. Here, the shift amount is controlled by fixing the image B and shifting the image A to the left or right. The correlation amount C(k) when the shift amount is k bits can be calculated using the correlation calculation equation (1).

$$C(k) = \sum_{i=4}^{m-5} |A(i-k) - B(i)| \quad (1)$$

In this example, the maximum shift amount is set to ±4 bits, and nine shifted waveforms are stored in the RAM. With consideration given to the maximum shift amount with which shifting is possible, the calculation range is set to a range obtained by excluding, from calculation, initial and last 4 bits of the total pixel number m of the output image A and image B. Then, a difference area (hatched area in FIGS. 41A to 41C) between the image A and the image B with the respective shifted waveforms is regarded as the correlation amount C, and the shift amount with which the correlation amount C of each shifted waveform is smallest corresponds to the phase difference between the image A and the image B.

Figure 42:
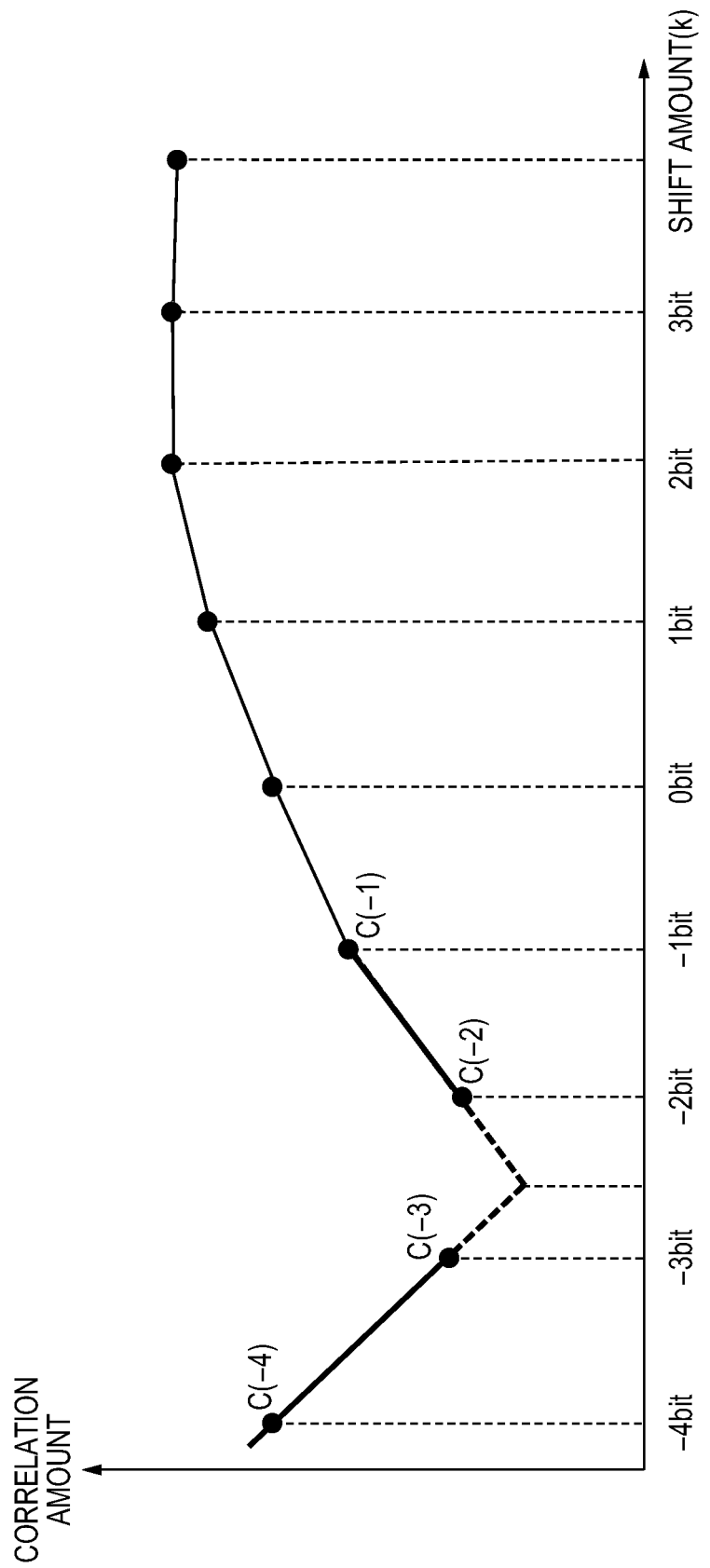
FIG. 42 is a diagram showing correlation amounts corresponding to respective shift amounts in the first correlation calculation.

FIG. 42 shows the correlation amount C obtained by thus shifting the pixel signals in FIG. 41A by ±4 bits. The correlation amount C(−2) when the shift amount k=−2 bits is the smallest value, while the minimum value is between k=−2 to −3 bits as shown by a dotted line. Therefore, the resolution of the phase difference detection is increased by performing interpolation calculation based on the information about the correlation amount when the shift amount k=−2 bits or thereabout. Here, four correlation amounts C when the shift amounts k=−1 to −4 bits are used to perform the interpolation calculation.

Figure 37:
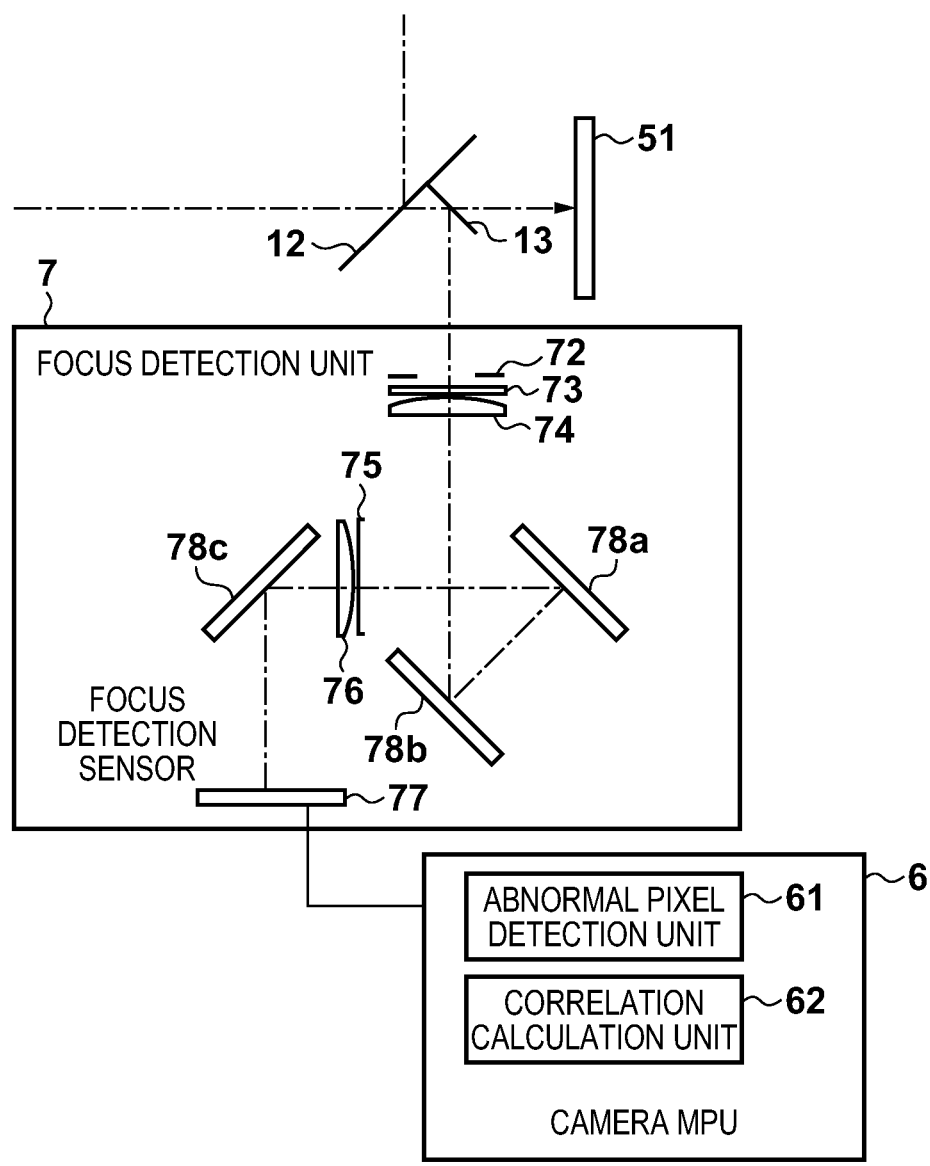
FIG. 37 is a block diagram showing a schematic configuration of a focus detection apparatus including the focus detection unit in FIG. 36.

In step S22, the camera MPU 6 detects an abnormal pixel (saturated pixel, defective pixel) in the pair of image signals acquired in step S20, namely the image A and the image B, with the abnormal pixel detection unit 61 shown in FIG. 37 provided with a means for detecting the abnormal signal. Note that the abnormal pixel is a saturated pixel in the following description.

In step S23, it is determined whether or not a saturated pixel exists, based on the information detected in step S22. If a saturated pixel does not exist, the processing proceeds to step S25. On the other hand, if a saturated pixel exists, the processing proceeds to step S24, and second correlation calculation in which the saturated pixel signal is excluded is performed. Note that the details of the second correlation calculation will be described later.

In step S25, the lens drive amount is calculated based on the information of the phase difference calculated in step S21 or step S24, and is transmitted to the lens MPU 1. The lens MPU 1 performs lens drive control based on the transmitted lens drive amount, and the series of focus detection processing is terminated.

Figure 43:
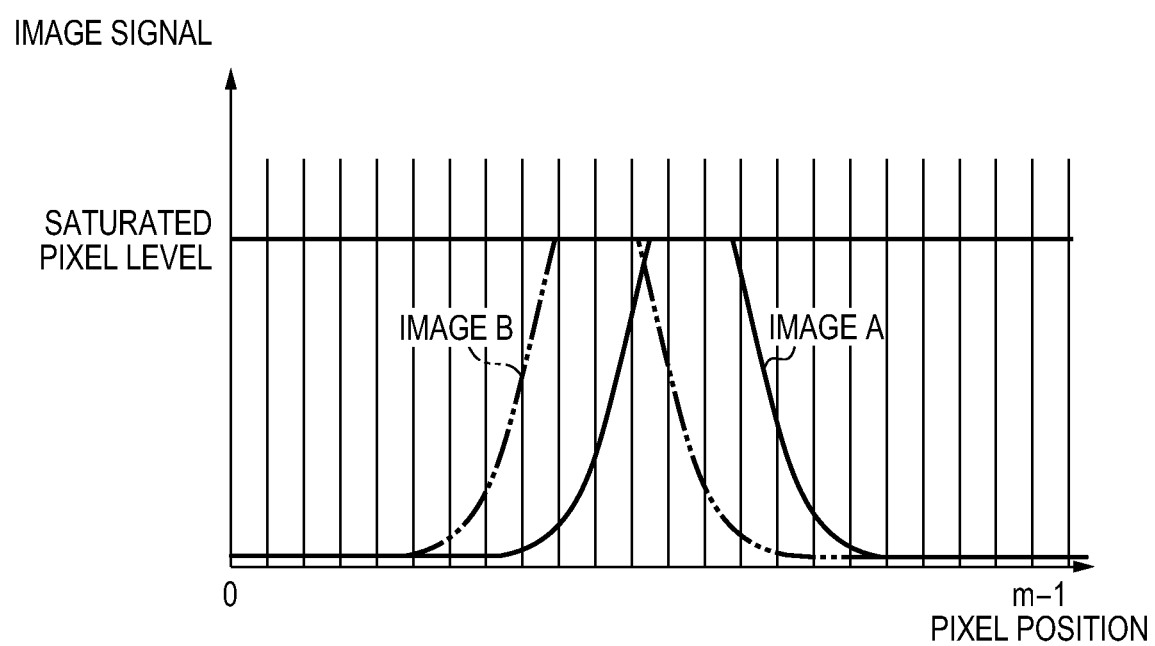
FIG. 43 is a diagram showing an exemplary image signal that involves a pixel that has reached the saturation level.

Next, prior to the description of the second correlation calculation performed in step S24, a correlation calculation error in the case where a saturated pixel exists will be described by lowering the saturation level of the image signals shown in FIG. 40. FIG. 43 shows a case where a part of pixels of the image signals shown in FIG. 40, namely the image A and the image B, exceeds the saturation level as a result of the saturation level being lowered. Of course the same phenomenon occurs when the saturation level is not changed while the signal level is amplified by a gain, for example.

Figure 44:
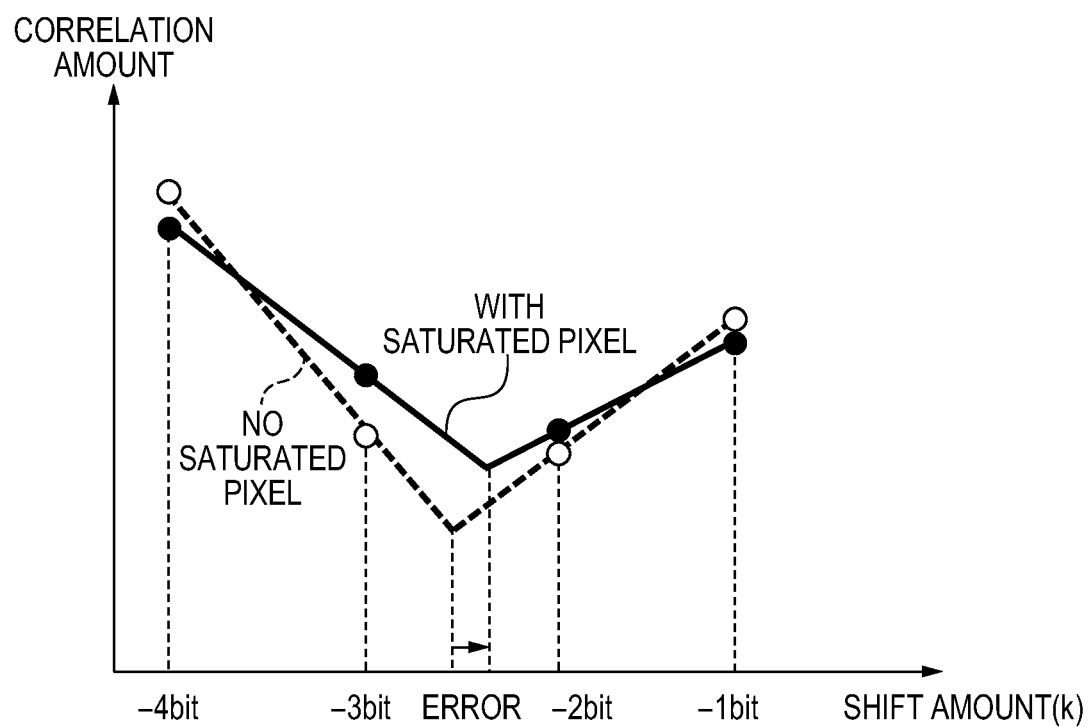
FIG. 44 is a diagram showing correlation amounts in an image signal that does not involve a saturated pixel and an image signal that involves a saturated pixel.

FIG. 44 shows the result of comparison between the correlation amounts C calculated using the above equation (1) regarding the image signal without a saturated pixel (FIG. 40) and the image signal with a saturated pixel (FIG. 43). In the example shown in FIG. 44, the correlation amount C is smallest when the shift amount k=−2 bits, regardless of the presence of a saturated pixel. However, a difference occurs in the result of interpolation calculation, depending on whether or not a saturated pixel exists. This difference occurs because the saturated pixel signal is clipped at the saturation level, and causes an error when the phase difference is calculated. For this reason, in order to reduce this error, the second correlation calculation is performed in which the saturated pixel signal is excluded.

Figure 45:
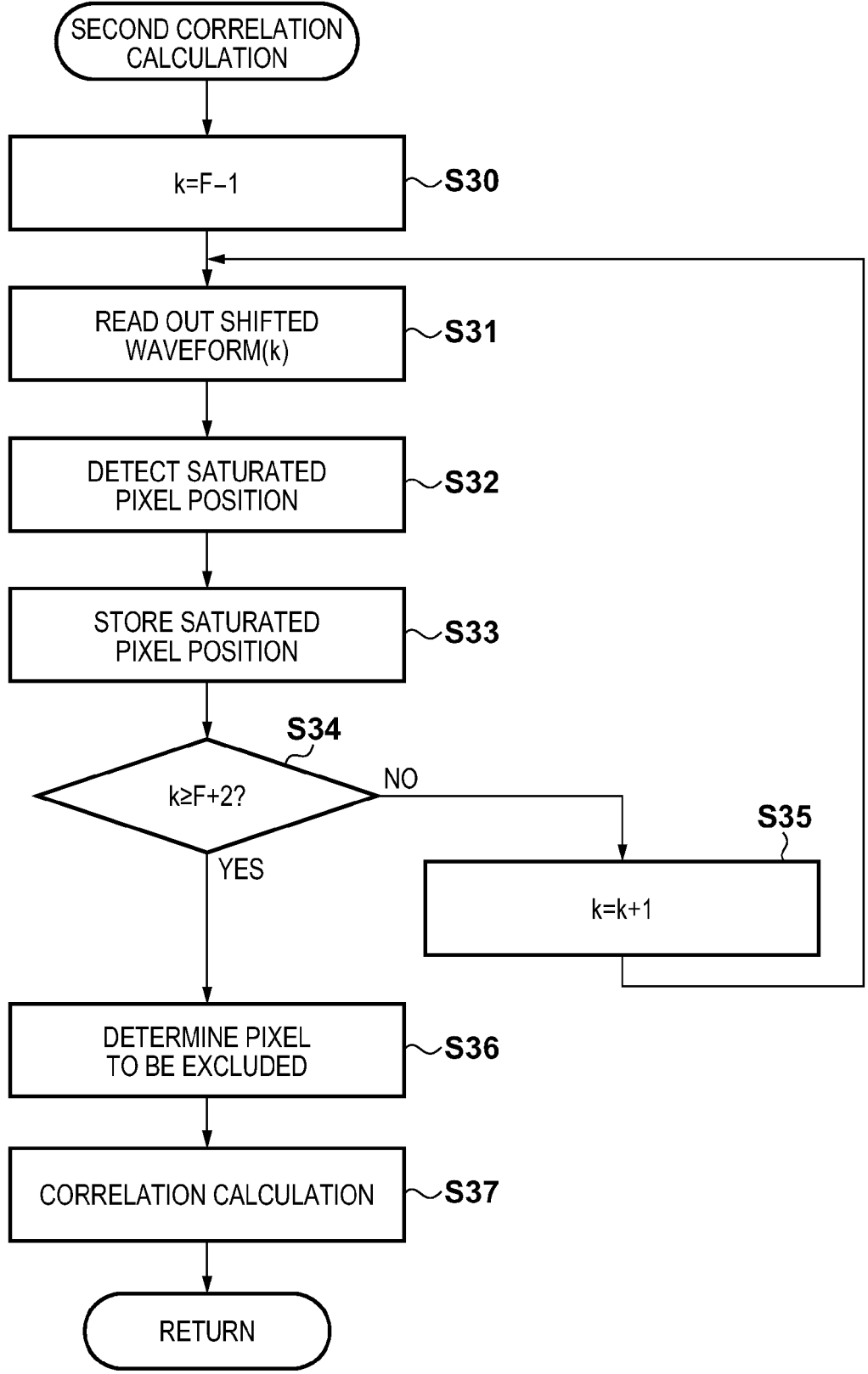
FIG. 45 is a flowchart showing second correlation calculation processing.

The second correlation calculation will now be described in detail using the flowchart in FIG. 45. In the first correlation calculation, the correlation amount when the shift amount k=−4 to +4 bits, namely regarding nine shifted waveforms is calculated: meanwhile, in the second correlation calculation, the correlation amount is calculated after excluding the saturated pixel signal from four shifted waveforms near the smallest correlation amount C, using the result of the first correlation calculation.

In step S30, the range of the shift amount used in the second correlation calculation is determined based on a phase difference P detected by the first correlation calculation. Initially, the shift amount of the shifted waveform regarding which the processing is performed first is set to k=F−1. F is a value that is rounded to a smaller integer than the detected phase difference P. Taking FIG. 42 as an example, F is between the phase differences P=−2 bits and −3 bits, and accordingly F=−3.

In step S31, the shifted waveform (k) of the shift amount k acquired in the first correlation calculation is read out from the RAM. In step S32, it is determined whether each of the pixels in the image A and the image B is a saturated pixel, based on the shifted waveform (k) that was read out in step S31, and the position of the saturated pixel is detected. Here, the saturation determination is performed by comparing each pixel signal with the value of the saturation level that is stored in advance in the RAM.

In step S33, the position of the pixel that is found to be a saturated pixel in the determination in step S32 is stored in the RAM. In step S34, it is determined whether or not k is not smaller than F+2, and if so, the processing proceeds to step S36. That is to say, the processing proceeds to next step S36 in the case where the saturated pixel detection processing is performed for the shifted waveforms at four shift amounts.

On the other hand, if k is smaller than F+2, a shifted waveform regarding which the saturated pixel detection needs to be performed still remains, and accordingly, in step S35, the shifted amount is set such that k=k+1, and the detection processing is performed regarding the shifted waveform at the next shift amount.

In step S36, the pixel position stored as the saturated pixel position in step S33 is read out from the RAM, and the pixel signal at the pixel position stored as the saturated pixel position regarding at least one of the four shifted waveforms is set to 0. Thus, the pixel signal at this pixel position is excluded in the correlation calculation that is performed later.

Processing for determining the pixel to be excluded in step S36 will now be described in detail using FIGS. 46A to 46D and 47. FIGS. 46A to 46D show four shifted waveforms used in the second correlation calculation. Note that the horizontal axis indicates the pixel position, and the vertical axis indicates the image signal.

The shifted waveforms in FIGS. 46A to 46D are those when the shifted amounts are F−1, F, F+1, and F+2 that are the results of the first correlation calculation and stored in the RAM in step S21 in FIG. 39, and are the shifted waveforms when the shift amounts k=−4, −3, −2, and −1 bits (first shift amount) since F=−3 here. FIG. 46A is the shifted waveform when the shift amount k=−1 bit, and the saturated pixels are present at the pixel positions 9 to 12 in either the image A or the image B. In this case, the camera MPU 6 stores the four pixels at the pixel positions 9, 10, 11, and 12 as the saturated pixel positions in the RAM.

FIG. 46B is the shifted waveform when the shift amount k=−2 bits (second shift amount), and three pixels at the pixel positions 9, 10, and 11 are stored in the RAM due to determination similar to that in FIG. 46A. FIG. 46C is the shifted waveform when the shift amount k=−3 bits, and three pixels at the pixel positions 9, 10, and 11 are stored in the RAM due to determination similar to the above. FIG. 46D is the shifted waveform when the shift amount k=−4 bits, and four pixels at the pixel positions 8, 9, 10, and 11 are stored in the RAM due to determination similar to the above.

FIG. 47 shows a table of the saturated pixel positions in the shifted waveforms shown in FIGS. 46A to 46D. In FIG. 47, the pixel positions corresponding to the saturated pixel and pixels to be excluded, which will be described later, are indicated by "x". Thus, the number of saturated pixels in either the image A or the image B differs depending on the shifted waveform.

The correlation amount C in the second correlation calculation is a value obtained by adding the difference of the paired image signals of the respective pixels, as indicated in the correlation calculation equation (1). If only the saturated pixels, or only the saturated pixels and the pixels that are paired with the saturated pixels are excluded, the number of pixels used in the calculation differs depending on the shifted waveform, and the number of pixels to be added up accordingly differs. Therefore, the reference of the correlation amount that indicates the phase difference differs, resulting in inability to obtain a correct calculation result.

For this reason, if a pixel position (i) is stored as the saturated pixel position regarding any of the shifted waveforms in FIGS. 46A to 46D, the pixel position (i) is set as the excluded pixel regarding the other shifted waveforms as well. In this case, the excluded pixels may be normal pixels. That is to say, regarding the four shifted waveforms used in the second correlation calculation, five pixels at the pixel positions 8, 9, 10, 11, and 12 are set as the excluded pixels, as shown in FIG. 47. Accordingly, for example, although the pixels at the pixel positions 9, 10, 11, and 12 are saturated pixels regarding the shifted waveform in FIG. 46A, the pixel at the pixel position 8, which is a normal pixel, is also handled similarly to a saturated pixel.

In step S37, the correlation amounts C is obtained for the four shifted waveforms in which the pixel signals at the positions corresponding to pixels determined as saturated pixels in step S36 are set to 0, using the above equation (1) as in the first correlation calculation, the shift amount with which the correlation amount C is the minimum value is obtained based on the respective correlation amounts C, and the result thereof serves as the result of the second correlation calculation. Then, an intersecting point of the line connecting the correlation amounts C(F−1) and C(F) and the line connecting the correlation amounts C(F+1) and C(F+2) is set as the minimum value of the correlation amount, and the phase difference is calculated.

As described above, if a saturated pixel exists in either the image A or the image B in step S36, the pixel signal of this pixel is set to 0. Thus, when the correlation amount C is calculated in step S37, the pixel signals in the first term and the second term that are paired in the above equation (1) are 0, and consequently the saturated pixel signals can be excluded from the correlation amount C.

Furthermore, since the pixels at the saturated pixel positions regarding any of the shifted waveforms are excluded from the four shifted waveforms in step S36, the calculation range and the number of pixels used in the calculation are uniform when the correlation amounts C regarding the four shifted waveforms are calculated in step S37, and the phase difference can thereby be detected accurately.

Furthermore, the number of pixels to be excluded as the saturated pixels in step S36 can be reduced by narrowing down the shift range used in the second correlation calculation, based on the first correlation calculation result. Accordingly, it is possible to avoid deterioration of the focus detection accuracy due to a reduction in the number of pixels used in the correlation calculation.

The seventh embodiment has been described regarding the case where the pixels at the pixel positions corresponding to pixels determined as the saturated pixels in the determination in at least one of the four shifted waveforms are set as the pixels to be excluded, as shown in FIG. 47. That is to say, the number of excluded pixels including normal pixels need only be determined so as to be minimized such that the number of excluded pixels is the same in all shifted waveforms.

Eighth Embodiment

Next, an eighth embodiment of the present invention will be described. The eighth embodiment will describe the focus detection processing in the case where the focus detection pixels are discretely arranged in the image sensor.

Figure 48:
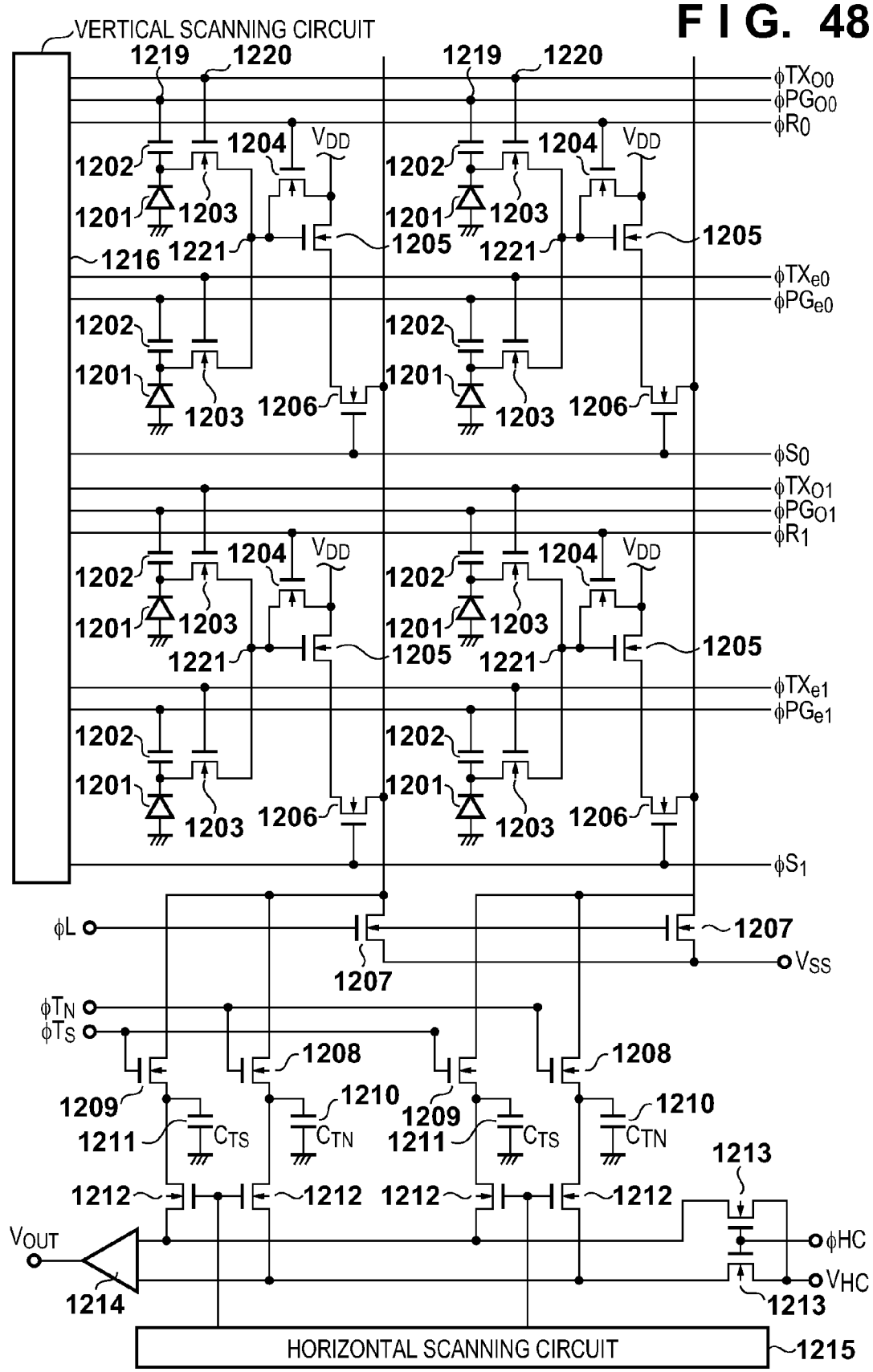
FIG. 48 is a circuit diagram showing an exemplary configuration of an image sensor according to an eighth embodiment.

FIG. 48 is a circuit diagram showing a schematic configuration of the image sensor 51 according to the eighth embodiment. FIG. 48 shows an area of 2 columns×4 rows of pixels in a two-dimensional CMOS area sensor, but in practice, a large number of pixels shown in FIG. 48 are arranged such that a high-resolution image can be acquired. Here, a description will be given of an image sensor for a digital still camera in which the pixel pitch is 2 µm, the number of valid pixels is 3000 columns×2000 rows=6 million pixels, and the image sensing area size is 6 mm wide×4 mm high.

In FIG. 48, reference numeral 1201 denotes a photoelectric conversion unit in a photoelectric conversion element that is constituted by a MOS transistor gate and a depletion layer below the gate, reference numeral 1202 denotes a photogate, reference numeral 1203 denotes a transfer switch MOS transistor, and reference numeral 1204 denotes a reset MOS transistor. Reference numeral 1205 denotes a source follower amplifier MOS transistor, reference numeral 1206 denotes a horizontal selection switch MOS transistor, and reference numeral 1207 denotes a source follower load MOS transistor. Reference numeral 1208 denotes a dark output transfer MOS transistor, reference numeral 1209 denotes a light output transfer MOS transistor, reference numeral 1210 denotes a dark output accumulation capacitor $C_{TN}$, and reference numeral 1211 denotes a light output accumulation capacitor $C_{TS}$. Reference numeral 1212 denotes a horizontal transfer MOS transistor, reference numeral 1213 denotes a horizontal output line reset MOS transistor, reference numeral 1214 denotes a differential output amplifier, reference numeral 1215 denotes a horizontal scanning circuit, and reference numeral 1216 denotes a vertical scanning circuit.

Figure 49:
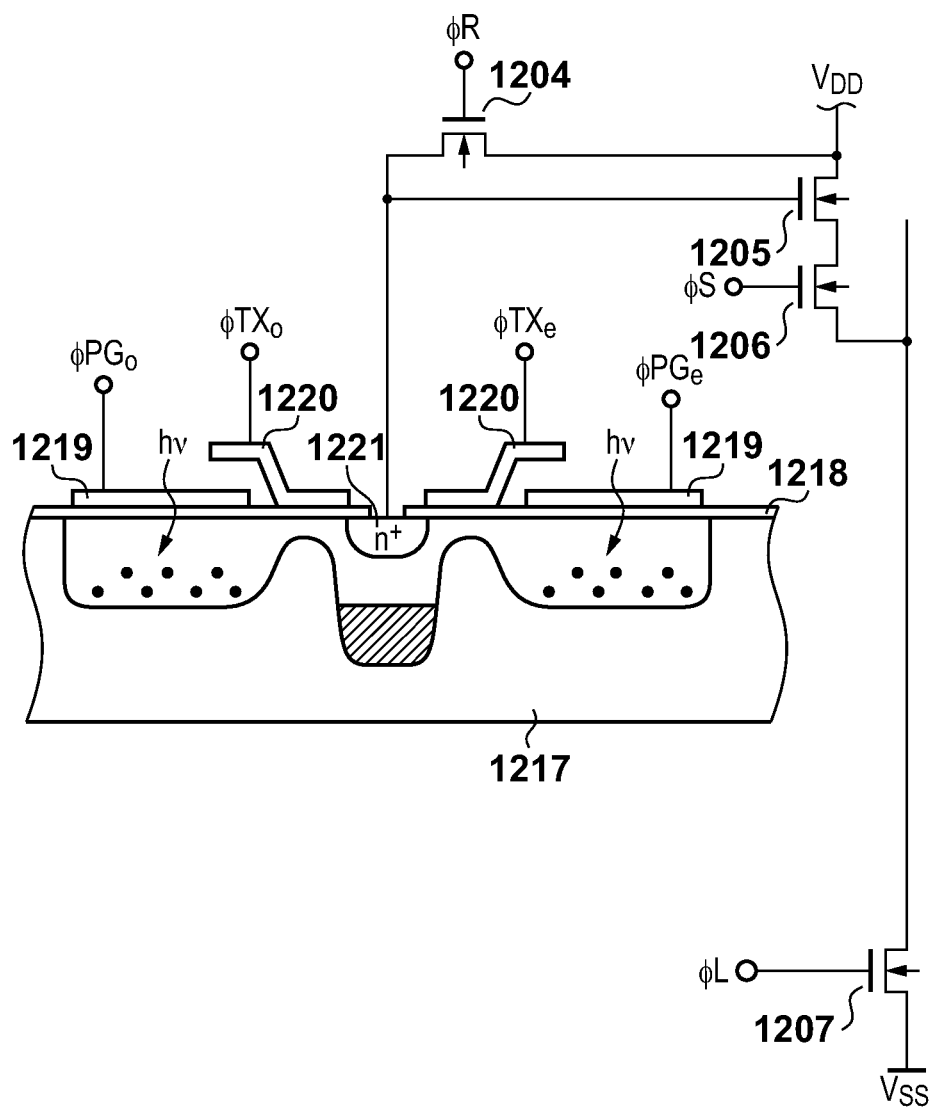
FIG. 49 is a cross-sectional view of an interconnect unit that involves two pixels in an image sensor according to the eighth embodiment.

FIG. 49 shows a cross-sectional view of an interconnect unit that involves two pixels arranged in the y direction in FIG. 48. In FIG. 49, reference numeral 1217 denotes a p-type well, reference numeral 1218 denotes a gate oxide film, reference numeral 1219 denotes a first-layer poly-Si, reference numeral 1220 denotes a second-layer poly-Si, and reference numeral 1221 denotes an n+floating diffusion (FD) unit. The FD unit 1221 is connected to two photoelectric conversion units via two transfer MOS transistors. Although refinement and improvement in sensitivity by means of a reduction in capacity of the FD unit 1221 are achieved by integrating drains of two transfer MOS transistors 1203 and the FD unit 1221 in FIG. 49, the FD unit 1221 may be connected to the drains via an aluminum (Al) wiring.

Figure 50:
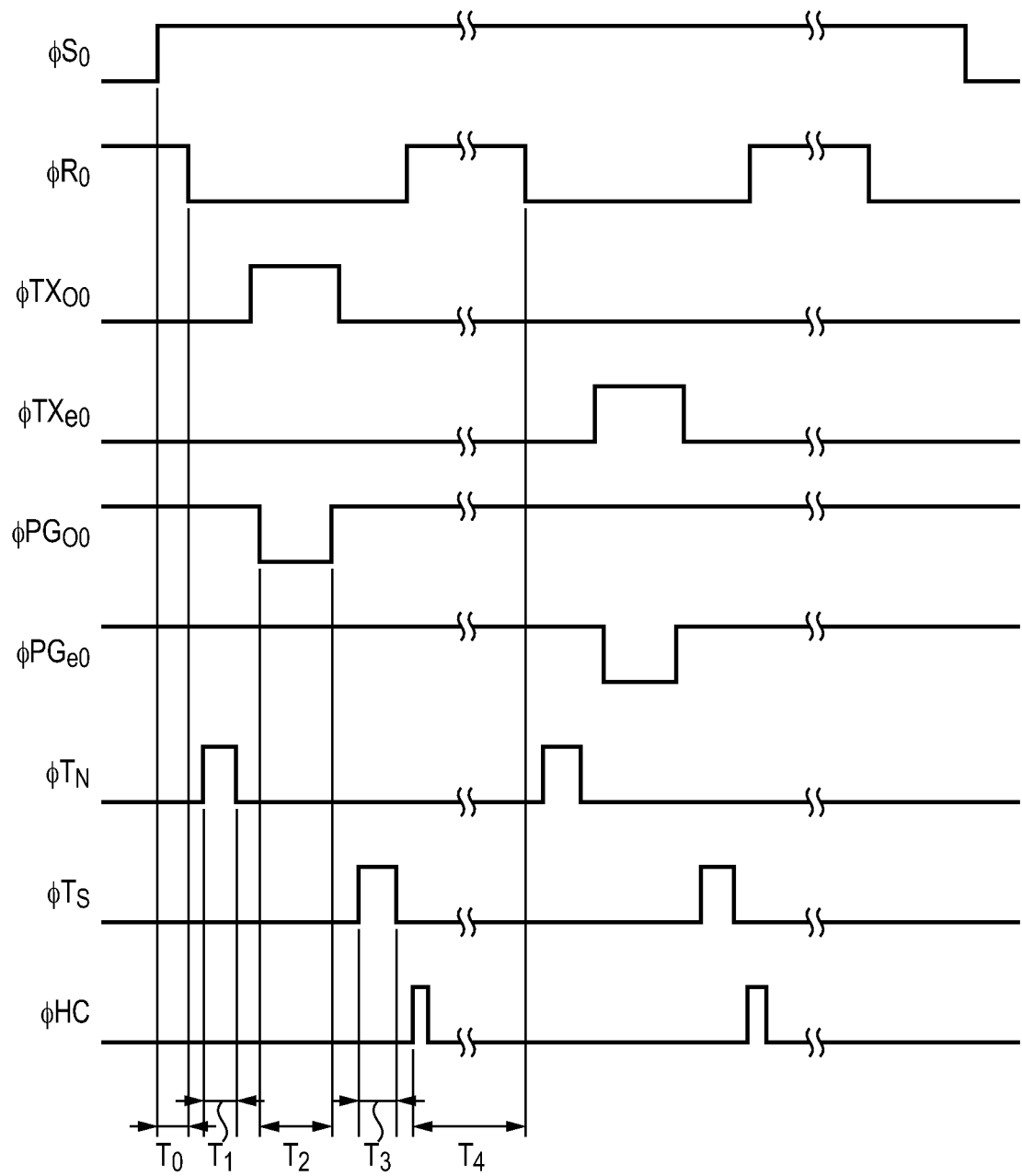
FIG. 50 is a timing chart for driving the image sensor according to the eighth embodiment.

Next, the operation in the case where all pixels independently perform output in the image sensor 51 shown in FIGS. 48 and 49 will be described using a timing chart in FIG. 50.

Initially, a vertical output line is reset by setting a control pulse $\phi L$ to high in accordance with timing output from the vertical scanning circuit 1216. Further, the reset MOS transistor 1204 is turned on by setting control pulses $\phi R_0$, $\phi PG_{O0}$, and $\phi PG_{e0}$ to high, and the first-layer poly-Si 1219 of the photogate 1202 is set to high. At time $T_0$, the selection switch MOS transistor 1206 is turned on by setting a control pulse $\phi S_0$ to high to select pixels in the first and second lines. Next, the resetting of the FD unit 1221 is stopped by setting the control pulse $\phi R_0$ to low such that the FD unit 1221 is in a floating state and the gate and the source of the source follower amplifier MOS transistor 1205 are in a through state. Thereafter, at time $T_1$, a control pulse $\phi T_N$ is set to high to cause the dark voltage of the FD unit 1221 to be output to the accumulation capacitor $C_{TN}$ 1210 in a source follower operation.

Next, in order to output photoelectric conversion charge from the pixels in the first line, firstly, the transfer switch MOS transistor 1203 is caused to be conductive by setting a control pulse $\phi TX_{O0}$ for the first line to high. Thereafter, at time $T_2$, the control pulse $\phi PG_{O0}$ is set to low. At this time, a voltage relationship which raises a potential well that expands below the photogate 2 and completely transfers a photogenerated carrier to the FD unit 1221 is preferable. Accordingly, if complete transfer is possible, the control pulse $\phi TX$ does not need to be a pulse and may alternatively be certain fixed potential.

At time $T_2$, as a result of the charge from the pixels in the first line of the photodiode being transferred to the FD unit 1221, the potential of the FD unit 1221 changes in accordance with light. At this time, since the source follower amplifier MOS transistor 1205 is in a floating state, the potential of the FD unit 1221 is output to the accumulation capacitor $C_{TS}$ 1211 by setting the control pulse $\phi T_S$ to high at time $T_3$. At this point in time, the dark output and the light output of the pixels in the first line are accumulated in the accumulation capacitors $C_{TN}$ 1210 and $C_{TS}$ 1211, respectively. At time $T_4$, a control pulse $\phi HC$ is temporarily set to high to cause the horizontal output line reset MOS transistor 1213 to be conductive and reset the horizontal output line, and the dark output and the light output of the pixels are caused to be output to the horizontal output line by means of a scan timing signal of the horizontal scanning circuit 1215 during the horizontal transfer period. At this time, a signal with an excellent S/N ratio after eliminating random noise and fixed pattern noise of pixels can be obtained by obtaining differential output $V_{OUT}$ of the accumulation capacitors $C_{TN}$ 1210 and $C_{TS}$ 1211 using the differential amplifier 1214.

Further, the dark output and the light output of the pixels in the first line are accumulated simultaneously in the accumulation capacitors $C_{TN}$ 1210 and $C_{TS}$ 1211 that are connected to the respective vertical output lines. Accordingly, the charges accumulated in the accumulation capacitors $C_{TN}$ 1210 and $C_{TS}$ 1211 are sequentially read out onto the horizontal output line and output from the differential amplifier 1214 by sequentially turning on the horizontal transfer MOS transistor 1212.

The eighth embodiment is described regarding a configuration in which the differential output $V_{OUT}$ is performed within a chip. However, the same effect can be obtained even if the differential output $V_{OUT}$ is not performed within the chip and a conventional CDS (Correlated Double Sampling) circuit is used outside.

After the light output is output from the pixels in the first line to the accumulation capacitor $C_{TS}$ 1211, the control pulse $\phi R_0$ is set to high to cause the reset MOS transistor 1204 to be conductive, and the FD unit 1221 is reset to a power supply $V_{DD}$. After horizontal transfer of the charge in the first line ends, the pixels in the second line are read out. To read out the second line, initially, the control pulse $\phi TX_{e0}$ and the control pulse $\phi PG_{e0}$ are driven, similarly to the reading of the first line. Next, the dark output and the light output are accumulated in the accumulation capacitors $C_{TN}$ 1210 and $C_{TS}$ 1211 by supplying a high pulse to the control pulses $\phi T_N$ and $\phi T_S$, and the dark output and the light output are obtained.

As a result of the above-described driving, the first and second lines can be read out independently. Thereafter, independent output from all pixels can be performed by causing the vertical scanning circuit 1216 to perform scanning and similarly reading out 2n+1, 2n+2 (n=1, 2 . . . ). That is to say, in the case where n=1, initially, the control pulse $\phi S_1$ is set to high, then $\phi R_1$ is set to low, and subsequently the control pulses $\phi T_N$ and $\phi TX_{01}$ are set to high. Then, the dark output and the light output are read out from each pixel in the third line by setting the control pulse $\phi PG_{01}$ to low, setting the control pulse $\phi T_S$ to high, and temporarily setting the control pulse $\phi HC$ to high. Subsequently, the dark output and the light output are read out from each pixel in the fourth line by applying the control pulses $\phi TX_{e1}$ and $\phi PG_{e1}$ and other control pulses in the above-described manner.

FIGS. 51A to 53B are diagrams for illustrating structures of the image capturing pixel and the focus detection pixel. The eighth embodiment employs a Bayer arrangement in which two diagonal pixels in four pixels constituted by two rows×two columns are pixels having G (green) spectral sensitivity, and the other two pixels are a pixel having R (red) spectral sensitivity and a pixel having B (blue) spectral sensitivity. A focus detection pixel having a later-described structure is arranged within the Bayer arrangement.

Figure 51B:
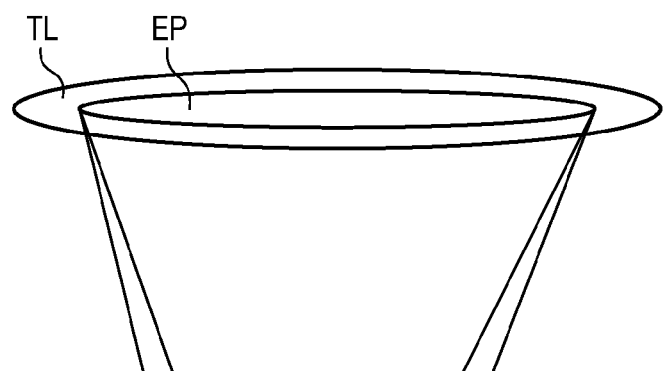
FIGS. 51A and 51B are diagrams illustrating a structure of image capturing pixels according to the eight embodiment.
Figure 51A:
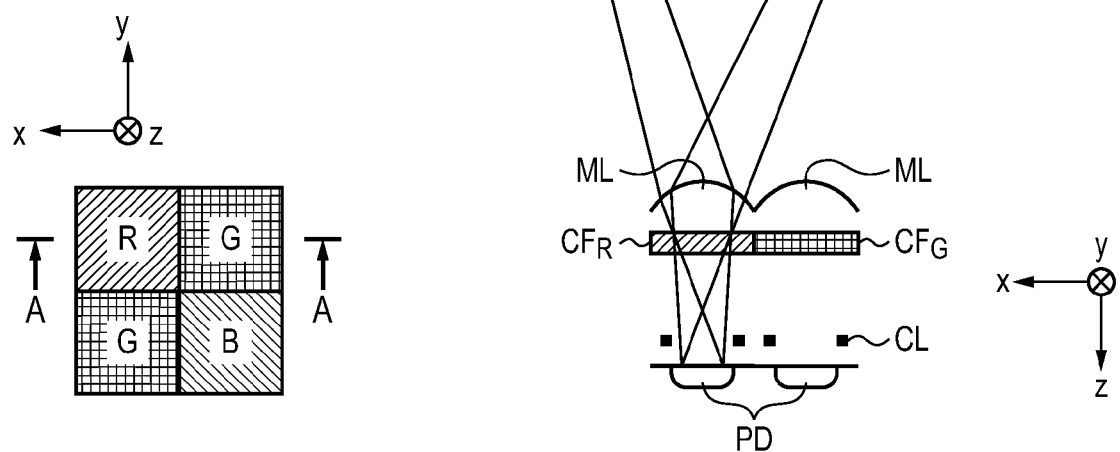

FIGS. 51A and 51B show the arrangement and structure of the image capturing pixels. FIG. 51A is a plan view of two rows×two columns of the image capturing pixels. As known well, in the Bayer arrangement, two G pixels are arranged orthogonally, and an R pixel and a B pixel are arranged as the other two pixels. This structure of two rows×two columns is repeatedly arranged.

FIG. 51B shows an A-A cross-sectional view of FIG. 51A. Reference character ML denotes an on-chip microlens that is arranged at the forefront of each pixel, reference character $CF_R$ denotes an R (red) color filter, and reference character $CF_G$ denotes a G (green) color filter. Reference character PD (Photo Diode) is a schematic view of the photoelectric conversion elements of the image sensor 51. Reference character CL (Contact Layer) denotes a wiring layer for forming signal lines for transmitting various signals in the image sensor 51. Reference character TL (Taking Lens) denotes a schematic view of the taking lens 21.

Here, the on-chip microlens ML and the photoelectric conversion element PD of the image capturing pixel are configured to take in light beams that have passed through the taking lens TL as effectively as possible. In other words, an exit pupil EP of the taking lens TL and the photoelectric conversion element PD are conjugate with each other due to the microlens ML, and the effective area of the photoelectric conversion element is designed to be large. Note that although FIG. 51B describes light beams that enter the R pixel, the G pixel and B pixel have the same structure. Thus, the exit pupil EP corresponding to each of the image capturing RGB pixels has a large diameter, and improves the S/N ratio of the image signals by efficiently taking in the light beams from the object.

Figure 52B:
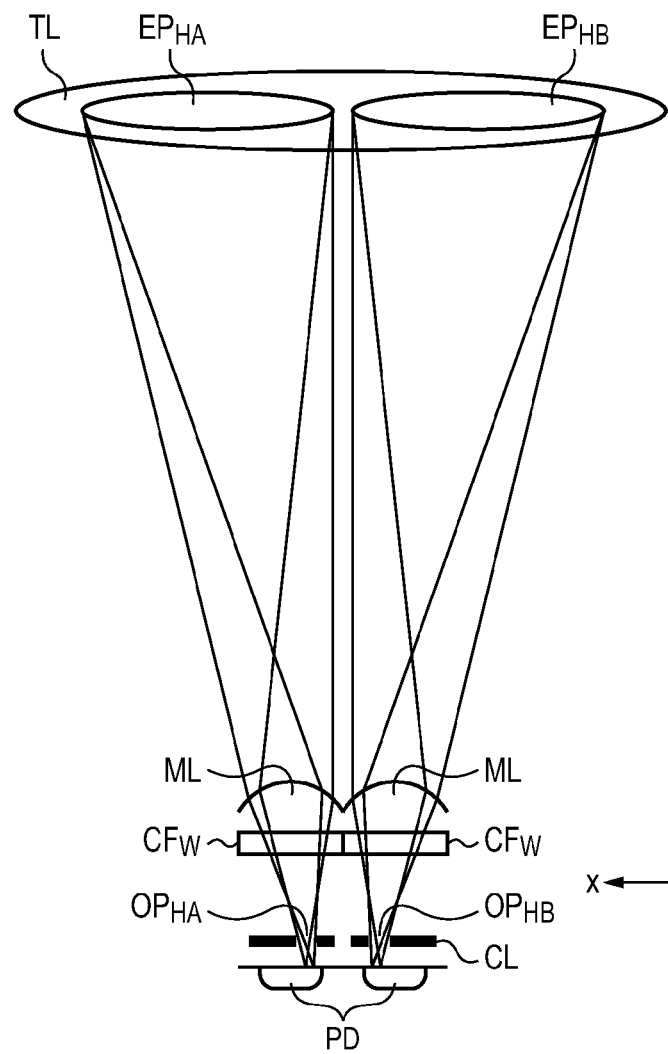
FIGS. 52A and 52B are a plan view and a cross-sectional view that illustrate a structure of focus detection pixels for performing pupil division in the horizontal direction of a taking lens according to the eighth embodiment.
Figure 52A:
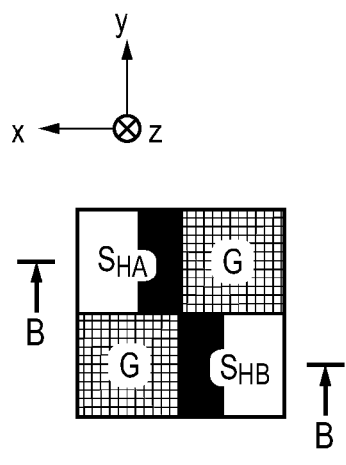

FIGS. 52A and 52B show a plan view and a cross-sectional view of the focus detection pixel for performing pupil division of the taking lens TL in the x direction shown in the drawings. FIG. 52A is a plan view of pixels in two rows×two columns including the focus detection pixels. In the case of obtaining an image signal for recording or viewing, a main component of luminance information is acquired using the G pixel. This is because a human is sensitive to luminance information due to its image recognition characteristics, and deterioration of image quality is likely to be perceived if the G pixel is defective. On the other hand, although the R pixel and the B pixel are for acquiring color information (color difference information), a human is insensitive to color information due to its visual characteristics, and accordingly deterioration of image quality is unlikely to be perceived even if pixels for acquiring color information are more or less defective. For this reason, in the eighth embodiment, the G pixels in the pixels in two rows×two columns remains as the image capturing pixels, and the R pixel and the B pixel are replaced with the focus detection pixels at a certain ratio. In FIG. 52A, reference characters $S_{HA}$ and $S_{HB}$ denote a pair of focus detection pixels.

FIG. 52B shows a B-B cross-sectional view of FIG. 52A. The microlens ML and the photoelectric conversion element PD have the same structure as that of the image capturing pixel shown in FIG. 51B. In the eighth embodiment, since the signal of the focus detection pixel is not used in image generation, a transparent film $CF_W$ (white) is arranged in place of a color filter for color separation. Further, since pupil division is performed in the image sensor 51, the aperture in the wiring layer CL is deviated in the x direction with respect to the center line of the microlens ML. Specifically, the aperture $OP_{HA}$ of the pixel $S_{HA}$ is deviated in the −x direction with respect to the center line of the microlens ML, and accordingly receives light beams that have passed through an exit pupil area $EP_{HA}$ on the +x side of the taking lens TL. Similarly, the aperture $OP_{HB}$ of the pixel $S_{HB}$ is deviated in the +x direction with respect to the center line of the microlens ML, and accordingly receives light beams that have passed through an exit pupil area $EP_{HB}$ on the −x side of the taking lens TL.

The pixels $S_{HA}$ having the above-described configuration are regularly arranged in the x direction, and an image A is formed, as described later, using the output from this pixel group. The pixels $S_{HB}$ are also regularly arranged in the x direction, and an image B is formed, as described later, using the output from this pixel group. Further, a defocusing amount of the object image having a luminance distribution in the x direction can be detected by detecting the relative positions of the acquired image A and image B.

Note that although the aforementioned pixels $S_{HA}$ and $S_{HB}$ can perform focus detection with respect to an object having a luminance distribution in the x direction of the image sensing area, e.g., a line in the y direction (vertical line), but cannot perform focus detection with respect to a line in the x direction (horizontal line) having a luminance distribution in the y direction. For this reason, the eighth embodiment is also provided with pixels for performing pupil division in the y direction of the taking lens so as to be also able to perform focus detection with respect to the latter.

Figure 53A:
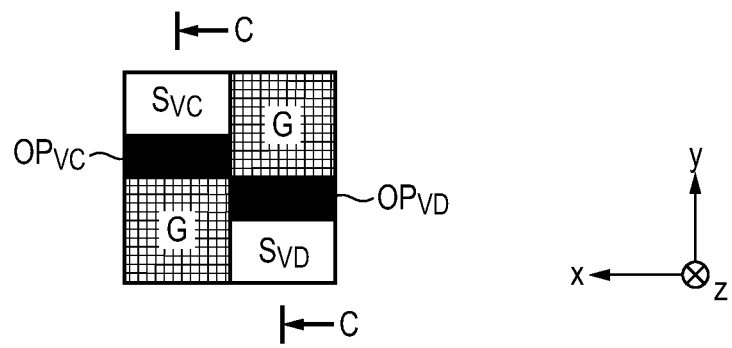
FIGS. 53A and 53B are a plan view and a cross-sectional view that illustrate a structure of a focus detection pixels for performing pupil division in the vertical direction of the taking lens according to the eighth embodiment.
Figure 53B:
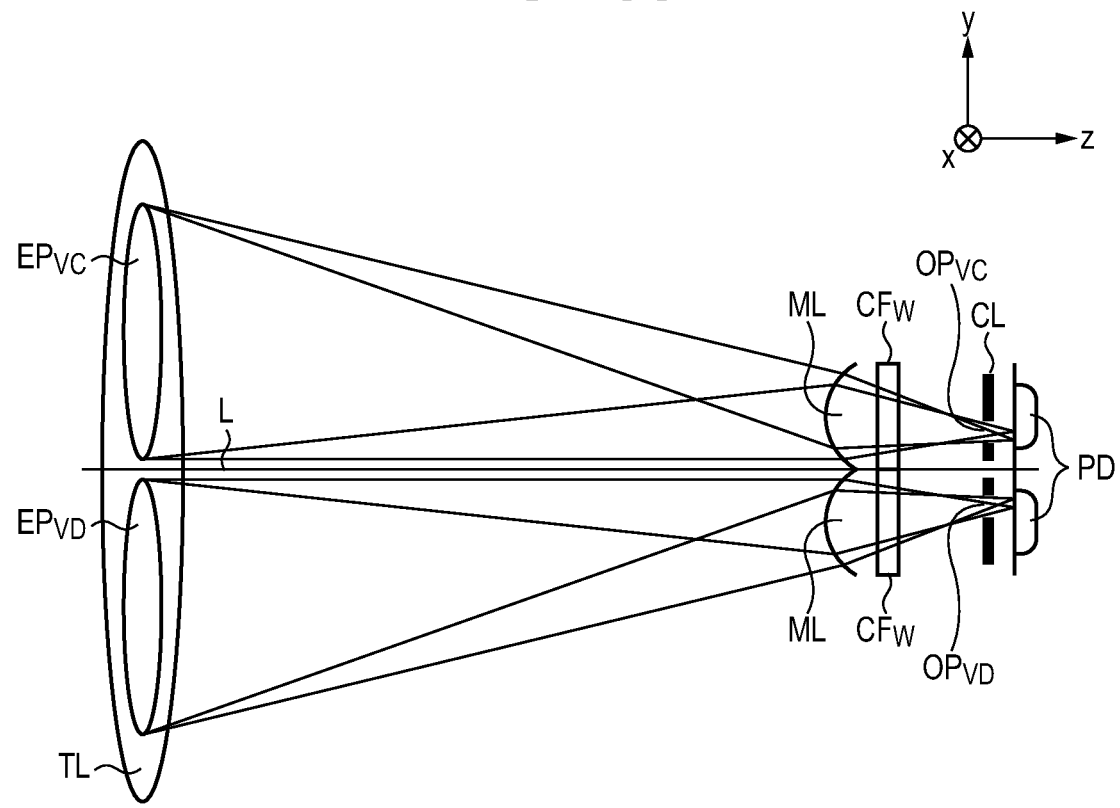

FIGS. 53A and 53B show a plan view and a cross-sectional view of the focus detection pixel for performing pupil division of the taking lens TL in the y direction shown in the drawings. FIG. 53A is a plan view of pixels in two rows×two columns including the focus detection pixels, and in this drawing, the G pixels are left as the image capturing pixels, and the R pixel and the B pixel are replaced with the focus detection pixels at a certain ratio, as in FIG. 52A. Reference characters $S_{VC}$ and $S_{VD}$ denote a pair of these focus detection pixels in FIG. 53A.

The cross-section C-C in FIG. 53A is shown in FIG. 53B. The pixels in FIG. 52B have the structure for performing pupil division in the x direction, while the pixels in FIG. 53B have the same structure except that the direction of pupil division is the y direction. That is to say, the aperture $OP_{VC}$ of the pixel $S_{VC}$ is deviated in the −y direction with respect to the center line of the microlens ML, and accordingly receives light beams that have passed through an exit pupil area $EP_{VC}$ on the +y side of the taking lens TL. Similarly, the aperture $OP_{VC}$ of the pixel $S_{TD}$ is deviated in the +y direction with respect to the center line of the microlens ML, and accordingly receives light beams that have passed through an exit pupil area $EP_{VD}$ on the −y side of the taking lens TL.

The pixels $S_{VC}$ having the above-described configuration are regularly arranged in the y direction, and an image C is formed, as described later, using the output from this pixel group. The pixels $S_{VD}$ are also regularly arranged in the y direction, and an image D is formed, as described later, using the output of this pixel group. Further, a defocusing amount of the object image having a luminance distribution in the y direction can be detected by detecting the relative positions of the acquired image C and image D.

Figure 54:
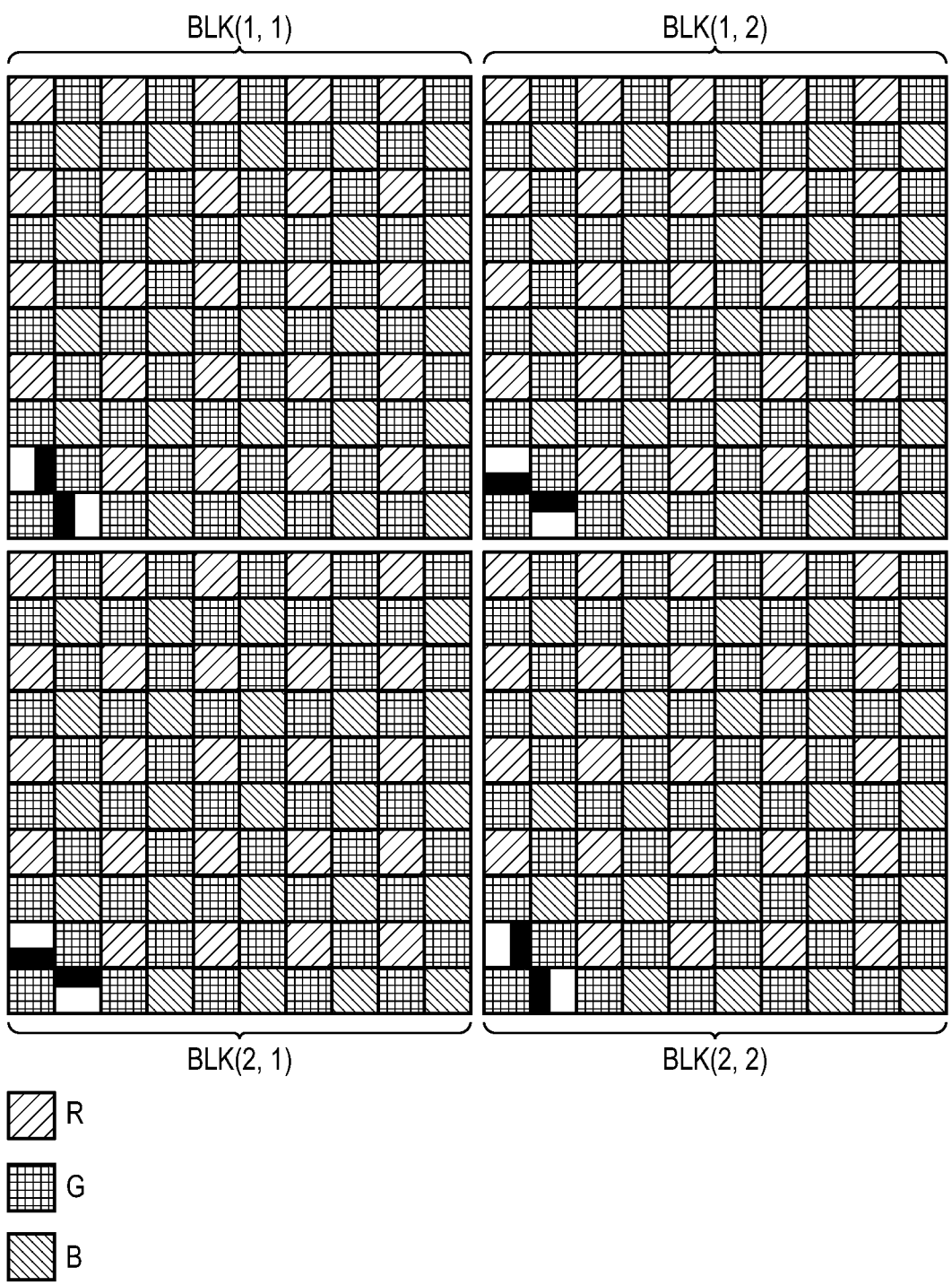
FIG. 54 is a diagram for explaining a smallest unit of a pixel arrangement in the image sensor according to the eighth embodiment.

FIGS. 54 to 58 are diagrams illustrating an arrangement rule of the image capturing pixels and the focus detection pixels that have been described with reference to FIGS. 51A, 51B, 52A, 52B, 53A, and 53B. FIG. 54 is a diagram for illustrating an arrangement rule in a minimum unit in the case where the focus detection pixels are discretely arranged among the image capturing pixels. In FIG. 54, 10 rows×10 columns=100 pixels are defined as one block. The block at the upper left end is BLK(i, j)=BLK(1, 1), and the downward direction and the rightward direction indicate positive directions. In the block BLK(1, 1), the R pixel and B pixel at the lower left end are replaced with a pair of the focus detection pixels $S_{HA}$ and $S_{HB}$ that perform pupil division in the horizontal direction.

In a block BLK(1, 2) that is adjacent to the BLK(1, 1) on the right, similarly the R pixel and B pixel at the lower left end are replaced with a pair of the focus detection pixels $S_{VC}$ and $S_{VD}$ that perform vertical pupil division. The pixel arrangement of a block BLK(2, 1) that is adjacent to the first block BLK(1, 1) on the lower side is the same as that of the block BLK(1, 2). The pixel arrangement of a block BLK(2, 2) that is adjacent to the block BLK (2, 1) on the right is the same as that of the block BLK(1, 1).

In this case, if the arrangement rule in FIG. 54 is expressed in a universal manner, in the block BLK(i, j), the focus detection pixels whose pupil division direction is horizontal are arranged if i+j is an even number, and the focus detection pixels whose pupil division direction is vertical are arranged if i+j is an odd number. 2×2=4 blocks in FIG. 54, i.e., an area of 20 rows×20 columns=400 pixels are defined as a cluster, which serves as an arrangement unit that is superordinate to the block.

Figure 55:
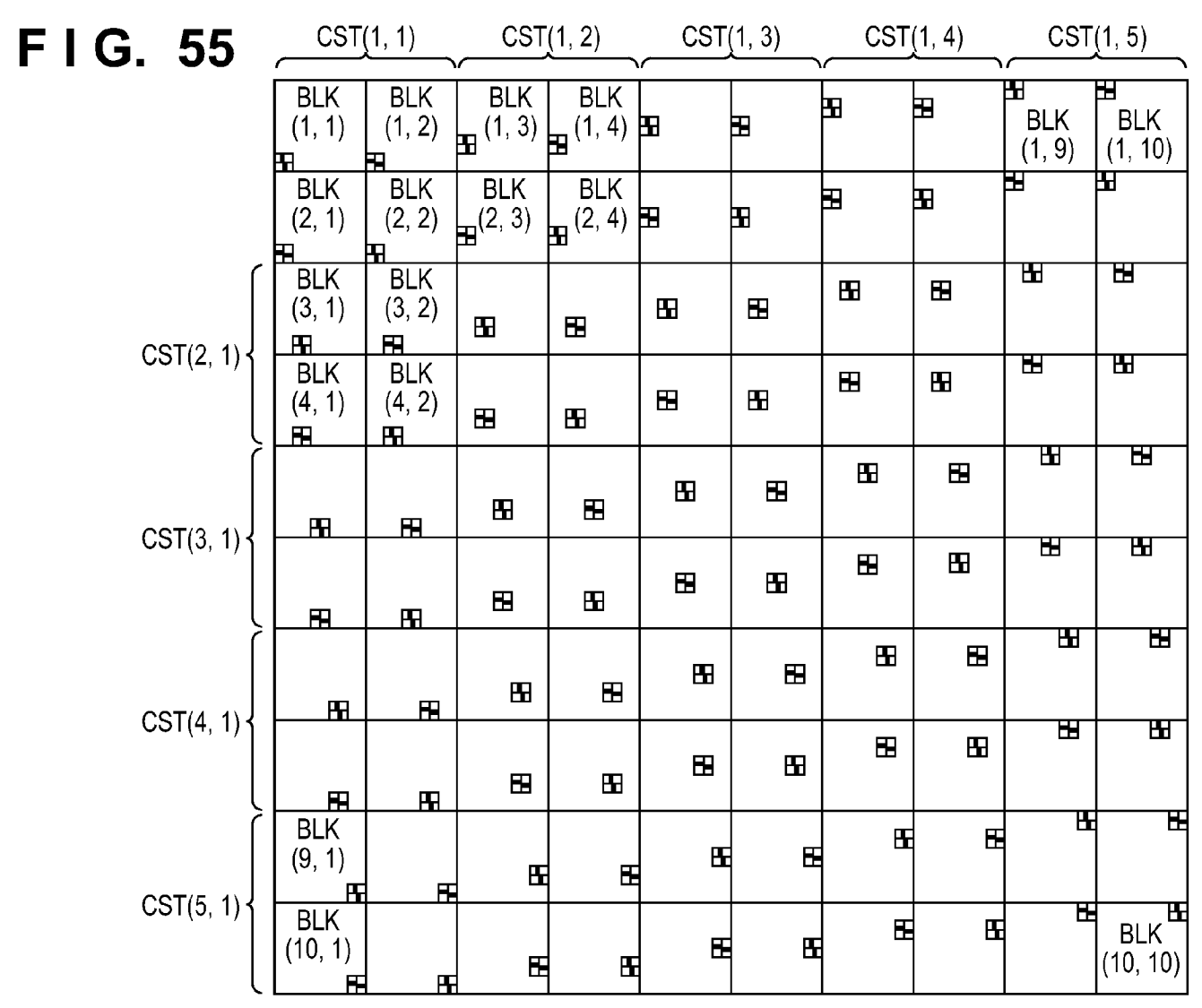

FIG. 55 is a diagram for illustrating an arrangement rule in units of the clusters. In FIG. 55, the cluster at the upper left end constituted by 20 rows×20 columns=400 pixels is CST(u, w)=CST(1, 1), where the downward direction and the rightward direction indicate positive directions. In the cluster CST (1, 1), the R pixel and B pixel at the lower left end in each block are replaced with the focus detection pixels $S_{HA}$ and $S_{HB}$, or $S_{VS}$ and $S_{VD}$.

In a cluster CST(1, 2) that is adjacent to the cluster CST (1, 1) on the right, the focus detection pixels within each block are arranged at positions shifted upward by two pixels with respect to the cluster CST(1, 1). In a cluster CST(2, 1) that is adjacent to the first cluster CST (1, 1) on the lower side, the focus detection pixels within each block are arranged at positions shifted rightward by two pixels with respect to the cluster CST(1, 1). The arrangement in FIG. 55 is obtained by repeatedly applying the above-described rule.

Here, coordinates of each focus detection pixel are defined by coordinates of the upper left pixel in four pixels, which serve as one unit (pair) and include the G pixels shown in FIGS. 52A and 52B or 53A and 53B. The upper left coordinates of each block is (1, 1), and the downward direction and the rightward direction indicate positive directions. In this case, the arrangement rule shown in FIG. 55 can be expressed in a universal manner as follows. In the cluster CST(u, w), the horizontal coordinate of a focus detection pixel pair within each block is 2×u−1, and the vertical coordinate thereof is 11−2×w. 5×5=25 clusters in FIG. 55, i.e., an area of 100 rows×100 columns=10 thousand pixels are defined as a field, which serves as an arrangement unit that is superordinate to the cluster.

Figure 56:
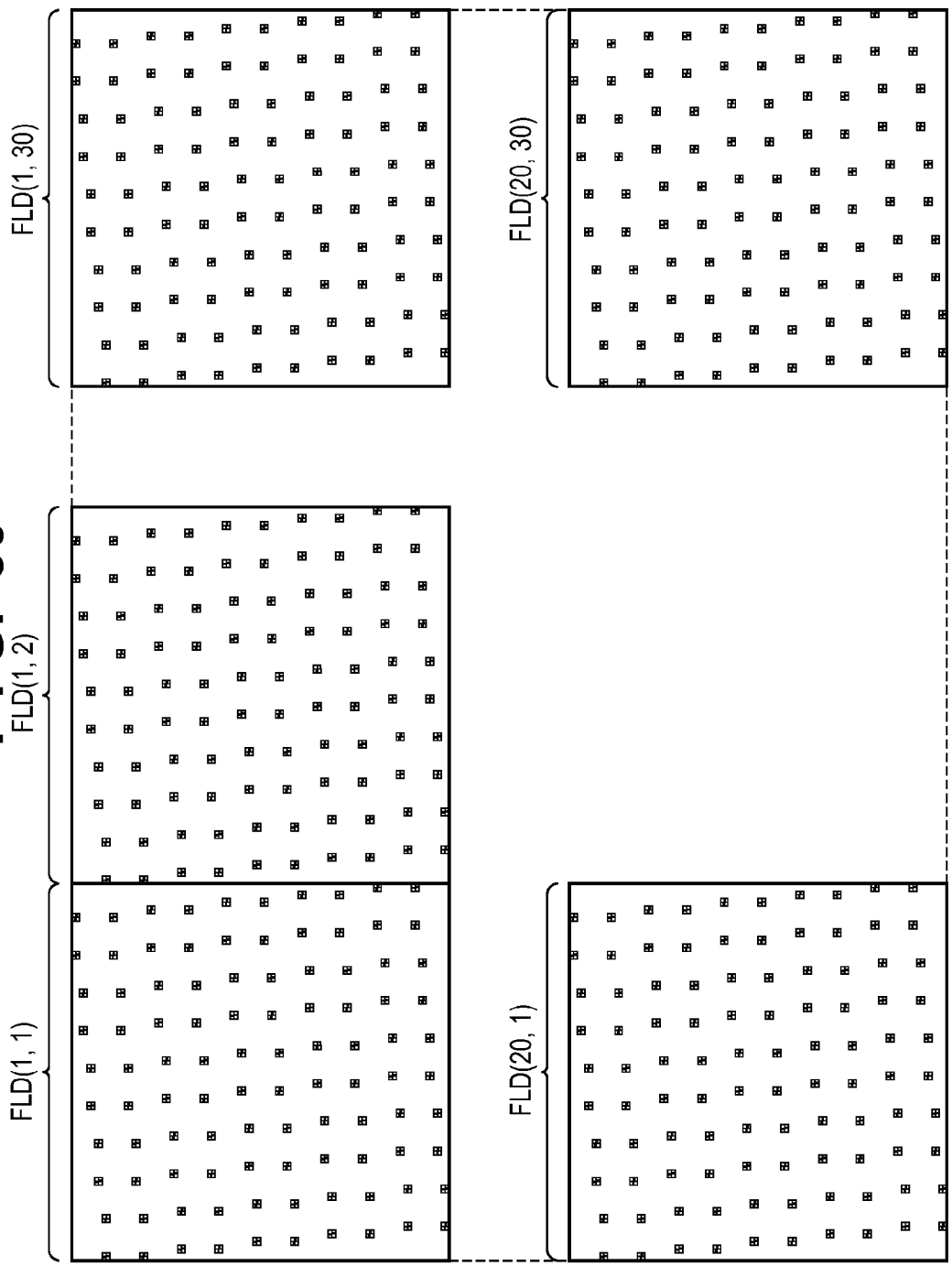
FIG. 56 is a diagram illustrating a pixel arrangement in an entire area of the image sensor according to the eighth embodiment.

FIG. 56 is a diagram for illustrating an arrangement rule in units of the fields. In FIG. 56, the field at the upper left end constituted by 100 rows×100 columns=10 thousand pixels is FLD(q, r)=FLD(1, 1), and the downward direction and the rightward direction indicate positive directions. In the eighth embodiment, all fields FLD(q, r) have the same arrangement as that of the field FLD(1, 1). Therefore, if 30 fields FLD(1, 1) and 20 fields FLD(1, 1) are arranged in the horizontal direction and the vertical direction, respectively, an image capturing area of 3000 rows×2000 columns=6 million pixels is constituted by 600 fields. Thus, the focus detection pixels can be uniformly distributed over the entire image capturing area.

Figure 57:
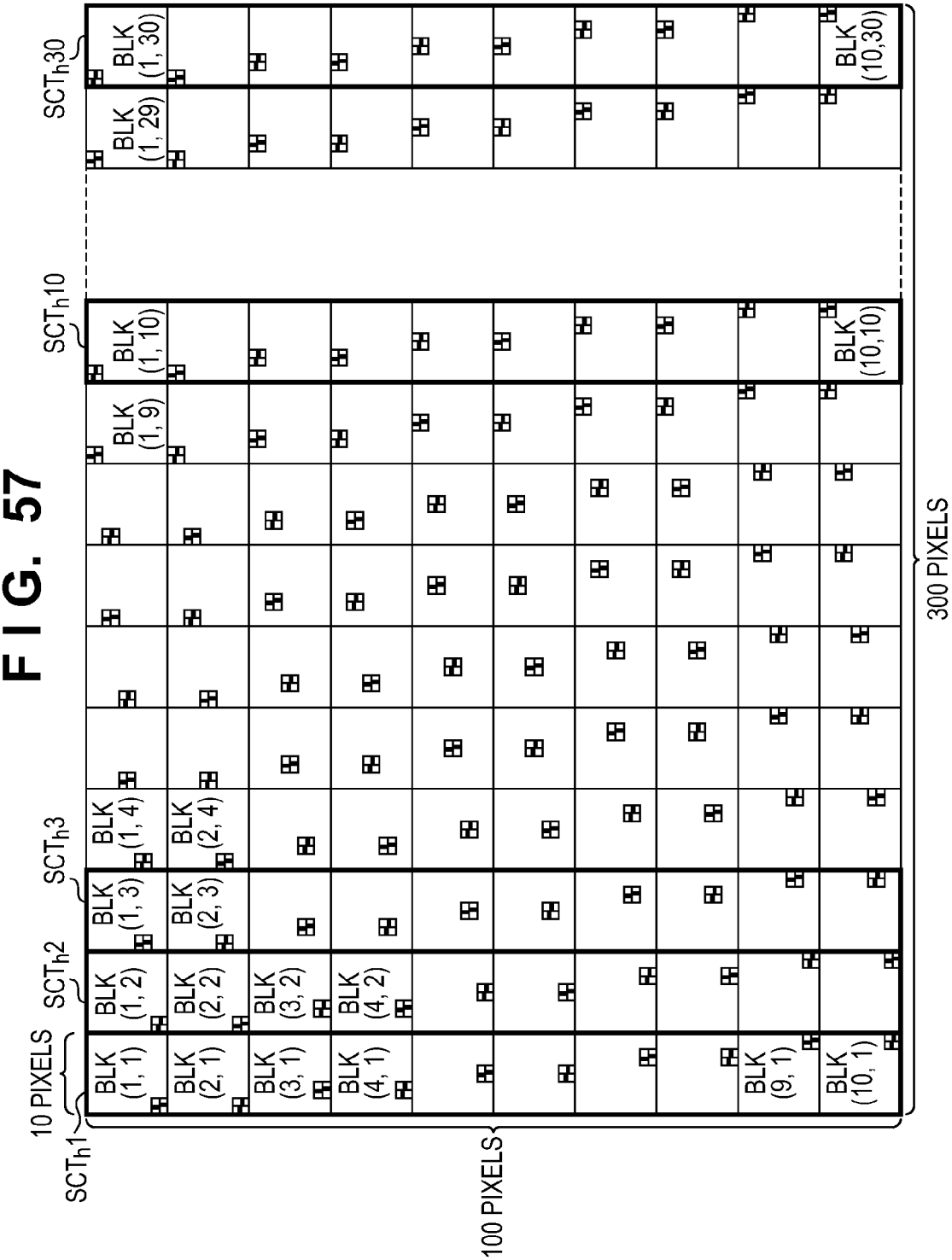
FIG. 57 is a diagram illustrating a pixel grouping method at the time of horizontal focus detection according to the eighth embodiment.

Next, pixel groups and a signal addition method at the time of focus detection will be described using FIGS. 57 and 58. FIG. 57 is a diagram illustrating a method for grouping pixels in the case where horizontal focus detection for an object image formed by the photographic optical system is performed. Horizontal focus detection refers to performing phase difference calculation using the focus detection pixels $S_{HA}$ and $S_{HB}$ for dividing the exit pupil of the photographic optical system in the lateral direction (the left-right direction), which has been described with reference to FIGS. 52A and 52B.

In the pixel arrangement shown in FIG. 57, which is the same as the one shown in FIG. 55, at the time of focus detection, one block in the horizontal direction×10 blocks in the longitudinal direction, namely a total of 10 blocks are regarded as one group and is defined as a section $SCT_h k$. In the eighth embodiment, 30 sections (k=1 to 30) arranged in the horizontal direction constitute one focus detection area (AF area). That is to say, an area of 100 rows×300 columns=30 thousand pixels is one focus detection area. Here, one section includes five focus detection pixels $S_{HA}$ for performing horizontal pupil division and five focus detection pixels $S_{HB}$ for performing vertical pupil division. For this reason, in the eighth embodiment, outputs of the five focus detection pixels $S_{HA}$ are added up to form one AF pixel for the image A for the phase difference calculation. Similarly, outputs of the five focus detection pixels $S_{HB}$ are added up to form one AF pixel for the image B for the phase difference calculation.

Figure 58:
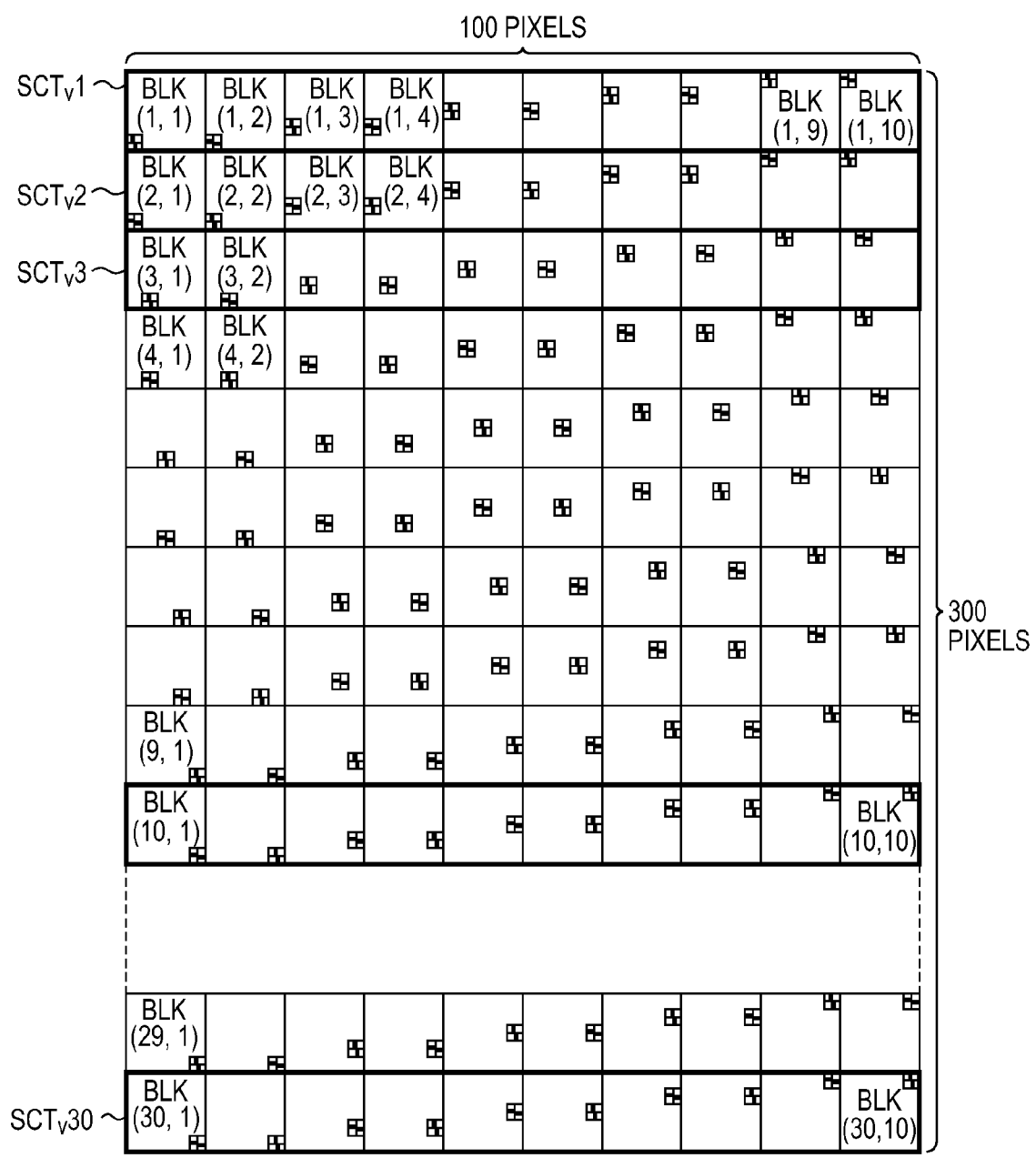
FIG. 58 is a diagram illustrating a pixel grouping method at the time of vertical focus detection according to the eighth embodiment.

FIG. 58 is a diagram illustrating a method for grouping pixels in the case where vertical focus detection for an object image formed by the photographic optical system is performed. Vertical focus detection refers to performing the focus detection with the phase difference method using the focus detection pixels $S_{VC}$ and $S_{TD}$ for dividing the exit pupil of the photographic optical system in the longitudinal direction, which has been described with reference to FIGS. 53A and 53B. That is to say, it corresponds to the technique described with reference to FIG. 57 with the angle being rotated 90 degrees.

In the pixel arrangement shown in FIG. 58, which is also the same as the one shown in FIG. 55, at the time of focus detection, 10 blocks in the vertical direction×one block in the longitudinal direction, namely a total of 10 blocks are regarded as one group and is defined as a section $SCT_v k$. In the eighth embodiment, 30 sections (k=1 to 30) arranged in the vertical direction constitutes one focus detection area. That is to say, an area of 300 rows×100 columns=30 thousand pixels is one focus detection area. This focus detection area is also defined as an AF area as in FIG. 57. Here, one section includes five pixels $S_{VC}$ for performing pupil division in the longitudinal direction on one side and five pixels $S_{VD}$ for performing pupil division on the other side. For this reason, in the eighth embodiment, outputs of five focus detection pixels $S_{VC}$ are added up to form one AF pixel for the image C for the phase difference calculation. Similarly, outputs of the five focus detection pixels $S_{VD}$ are added up to form one AF pixel for the image D for the phase difference calculation.

Figure 59:
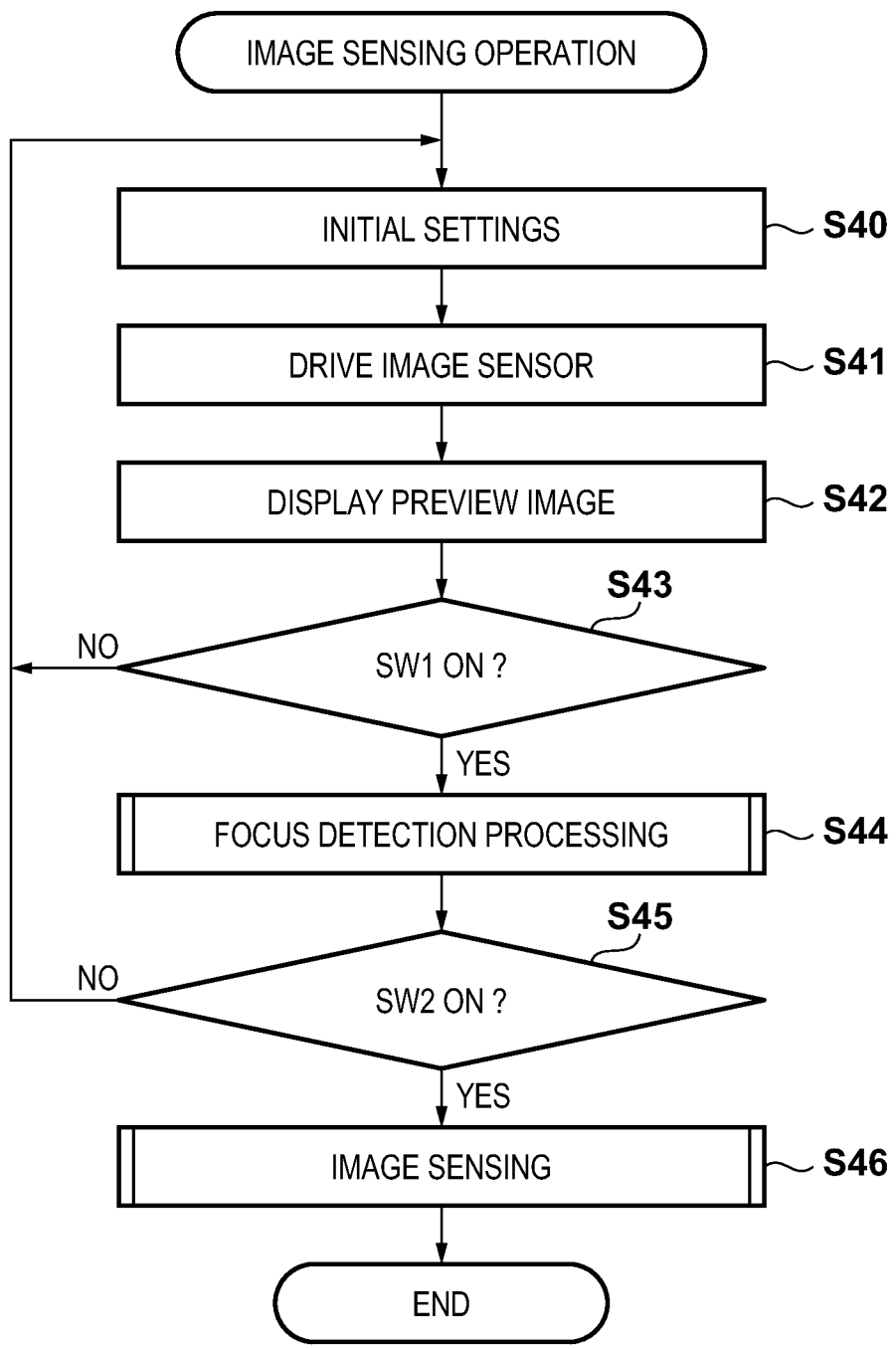
FIG. 59 is a flowchart showing an image sensing operation of the image capturing apparatus according to the eighth embodiment.

FIGS. 59 to 61 are flowcharts for illustrating the image sensing operation and the focus detection processing that are related to the eighth embodiment. A description will now be given of the image sensing operation according to the eighth embodiment in accordance with the flowcharts in FIGS. 59 to 61 with reference to FIGS. 48 to 58 that have already been described based on the premise of live-view photography.

FIG. 59 is a flowchart showing the image sensing operation of the camera in the eighth embodiment. Upon the photographer turning on a power switch of the camera 50, in step S40 the memory content and an execution program are initialized, and an image sensing preparation operation is executed. Furthermore, a target exposure value is set. In step S41, an image sensing operation of the image sensor 51 is started. The exposure time is controlled so as to achieve a target exposure value that was set in step S40, and a low resolution moving preview image is output. In step S42, the read moving image is displayed on the display device 17 provided on the back face of the camera, and the photographer visually check this preview image to determine the composition for capturing the image.

In step S43, it is determined whether or not the switch SW1_18 is turned on, and if not, the processing returns to step S41. Then, the operations from the driving of the image sensor 51 to preview image display in step S42 are repeatedly executed. If it is determined in step S43 that the switch SW1_18 is turned on, the processing proceeds to step S44, and the focus detection processing is executed. The focus detection processing to be performed here will now be described with reference to FIG. 60.

FIG. 60 is a flowchart showing the focus detection processing in the eighth embodiment. In step S50, initially, the camera MPU 6 outputs a signal accumulation instruction to the image sensor 51. The image sensor 51 starts a signal accumulation operation based on the instruction. After the accumulation operation ends, the focus detection pixels are read out. In the eighth embodiment, the AF pixels have a configuration in which the outputs of the plurality of focus detection pixels are added up, as described with reference to FIGS. 57 and 58. The image sensor 51 outputs, to the camera MPU 6, a pair of image signals obtained from the AF pixels as the image A and the image B, or as the image C and the image D.

Next, in step S21, the first correlation calculation is performed as in the seventh embodiment. Note that a waveform obtained by shifting an image signal acquired from an AF pixel of the image sensor 51 is referred to as a shifted waveform. Initially, a correlation amount C(k) is calculated from each shifted waveform using the above-described correlation calculation equation (1) to calculate a phase difference between the image signals.

Next, in step S51, the camera MPU 6 detects an abnormal pixel (e.g., saturated pixel, defective pixel) in the pair of image signals acquired in step S50. Here, a saturated pixel is detected as the abnormal pixel.

In the eighth embodiment, the AF pixels have a configuration in which outputs of the plurality of focus detection pixels are added up. As for the saturated pixel that is defined here, if at least one saturated pixel is included in the focus detection pixels included in each of the sections $SCT_hk$ and $SCT_vk$, the focus detection pixels in this section $SCT_hk$ or $SCT_vk$ are handled as saturated pixels. Processes in subsequent steps S23 to S25 are the same as those described above in the seventh embodiment with reference to FIG. 39, and the description thereof will be omitted.

After the focus detection processing illustrated in FIG. 60 ends, the processing returns to the flowchart in FIG. 59. In step S45, the camera MPU 6 determines whether or not the switch SW2_19 is turned on, and if it is determined that the switch SW2_19 has been turned on, in step S46 the image sensing processing is performed. On the other hand, if it is determined that the switch SW2_19 is not turned on, the processing returns to step S40.

FIG. 61 is a flowchart of the image sensing processing that is performed in step S46. Upon the switch SW2_19 being turned on, in step S60, the diaphragm 22 is driven so as to achieve the target exposure value that was set in step S40 in FIG. 59, and mechanical shutter opening control for determining the exposure time of the image sensor 51 is performed. In step S61, a high resolution still image is read out, i.e., all pixels are read out. In step S62, a defective pixel in the read image signal is interpolated. Here, since the output of the focus detection pixels does not contain RGB color information for forming a normal image and these pixels correspond to a defective pixel in terms of acquisition of an image, an image signal is generated by performing interpolation based on information of the neighbor image capturing pixels.

In step S63, image processing such as γ correction and edge enhancement for the image is performed, and in step S64, the captured image is recorded in a memory (not shown). In step S65, the captured image is displayed on the display device 17, and the processing returns to the image sensing operation processing in FIG. 59.

As described above, according to the eighth embodiment, the same effect as that in the seventh embodiment can be achieved even in the case where the focus detection pixels are discretely arranged in the image sensor.

Note that it is assumed in the above-described eighth embodiment that the focus detection pixels are multiple pairs of pixels in which light is blocked in different areas of the pixels. However, each focus detection pixel may have a plurality of divided photoelectric conversion areas, and signals may be read out independently from the photoelectric conversion areas.

Although the seventh and eighth embodiments have been described above regarding the case of detecting a saturated pixel as the abnormal pixel, the abnormal pixel in the present invention is not limited to the saturated pixel, and other kind of defective pixels may be detected as the abnormal pixel.

Although four shifted waveforms are used when obtaining the phase difference in the above-described seventh and eighth embodiment, the number of shifted waveforms in the present invention is not limited to four, and the phase difference can be derived by using a plurality of shifted waveforms.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2013-045907, 2013-045906 and 2013-045905, all filed on Mar. 7, 2013, and No. 2013-137475, filed on Jun. 28, 2013, which are hereby incorporated by reference herein in their entirety.

What is claimed is:

1. A focus detection apparatus comprising:
 a sensor unit provided with a plurality of sensor pairs each of which receives a light beam from an object, accumulates charge, and outputs a pair of image signals for focus detection in a phase difference detection method;
 a control unit configured to detect a level of a predetermined signal based on the accumulated charge in each sensor pair, and control charge accumulation time in accordance with the level of the predetermined signal; and
 a setting unit configured to set a priority of each sensor pair in accordance with the object,
 wherein the setting unit sets the priority of a first sensor pair higher than the priority of a second sensor pair, the first sensor pair and the second sensor pair being included in the plurality of sensor pairs,
 wherein the control unit detects the level of the predetermined signal of the first sensor pair in prior to the level of the predetermined signal of the second sensor pair.

2. The focus detection apparatus according to claim 1, wherein the control unit circulates through the sensor pairs and detects the level of the predetermined signal in each sensor pair.

3. The focus detection apparatus according to claim 1, wherein the control unit detects the level of the predetermined signal in the first sensor pair at a higher frequency than the frequency of detection of the level of the predetermined signal in the second sensor pair.

4. The focus detection apparatus according to claim 1, wherein the control unit detects the level of the predetermined signal in the first sensor pair at an earlier timing than the timing of detection of the level of the predetermined signal in the second sensor pair.

5. The focus detection apparatus according to claim 1, wherein the control unit limits detection of the level of the predetermined signal in the second sensor pair until a predetermined time period elapses after charge accumulation in the sensor pairs is started.

6. The focus detection apparatus according to claim 1, wherein the control unit resets charge in the first sensor pair at a later timing than the timing of resetting charge in the second sensor pair.

7. The focus detection apparatus according to claim 1, wherein the control unit performs control for stopping charge accumulation in a detection target sensor pair if the level of the predetermined signal in the detection target sensor pair reaches a predetermined value.

8. The focus detection apparatus according to claim 1, wherein the predetermined signal indicates a largest value or a contrast value of a signal that is based on charge accumulated in a detection target sensor pair.

9. The focus detection apparatus according to claim 1, further comprising a selection unit configured to select a first focus detection area from among a plurality of focus detection areas that correspond to the respective sensor pairs, based on a predetermined condition,
wherein the setting unit sets the priority of the sensor pair corresponding to the first focus detection area selected by the selection unit so as to be higher than the priority of the other sensor pairs.

10. The focus detection apparatus according to claim 9, wherein the selection unit selects the focus detection area corresponding to a main object as the first focus detection area.

11. The focus detection apparatus according to claim 9, wherein the selection unit selects the focus detection area selected by a photographer as the first focus detection area.

12. The focus detection apparatus according to claim 9, wherein the selection unit selects the focus detection area having a higher luminance as the first focus detection area.

13. The focus detection apparatus according to claim 9, wherein the setting unit sets a higher priority for the sensor pair that is closer, in terms of distance on the sensor unit, to the sensor pair corresponding to the first focus detection area.

14. An image capturing apparatus comprising:
an image sensing unit configured to convert light that has passed through a photographic optical system into an electric signal; and
the focus detection apparatus according to claim 1.

15. A method for controlling a focus detection apparatus including a sensor unit provided with a plurality of sensor pairs each of which receives a light beam from an object, accumulates charge, and outputs a pair of image signals for focus detection in a phase difference detection method, the method comprising:
a detection step of detecting a level of a predetermined signal based on accumulated charge in each sensor pair;
a control step of controlling charge accumulation time in accordance with the level of the predetermined signal; and
a setting step of setting a priority of each sensor pair in accordance with the object,
wherein in the setting step, the priority of a first sensor pair is set higher than the priority of a second sensor pair, the first sensor pair and the second sensor pair being included in the plurality of sensor pairs,
wherein in the detection step, the level of the predetermined signal of the first sensor pair is detected in prior to the level of the predetermined signal of the second sensor pair.

* * * * *